US010996524B2

(12) United States Patent
Kubota et al.

(10) Patent No.: US 10,996,524 B2
(45) Date of Patent: May 4, 2021

(54) DISPLAY DEVICE, DISPLAY MODULE INCLUDING THE DISPLAY DEVICE, AND ELECTRONIC DEVICE INCLUDING THE DISPLAY DEVICE OR THE DISPLAY MODULE

(71) Applicant: Semiconductor Energy Laboratory Co., Ltd., Atsugi (JP)

(72) Inventors: Yusuke Kubota, Atsugi (JP); Daisuke Kubota, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 34 days.

(21) Appl. No.: 16/578,616

(22) Filed: Sep. 23, 2019

(65) Prior Publication Data
US 2020/0019027 A1    Jan. 16, 2020

Related U.S. Application Data

(63) Continuation of application No. 15/076,132, filed on Mar. 21, 2016, now Pat. No. 10,429,704.

(30) Foreign Application Priority Data

Mar. 26, 2015  (JP) .................................. 2015-065357

(51) Int. Cl.
*G02F 1/1343* (2006.01)
*G02F 1/1362* (2006.01)

(52) U.S. Cl.
CPC .. *G02F 1/134363* (2013.01); *G02F 1/134309* (2013.01); *G02F 1/136227* (2013.01);
(Continued)

(58) Field of Classification Search
CPC ... G02F 2001/134381; G02F 1/134309; G02F 1/134363; G02F 2001/134372; G02F 1/1343–134363
See application file for complete search history.

(56) References Cited

U.S. PATENT DOCUMENTS

| 5,731,856 A | 3/1998 | Kim et al. |
| 5,744,864 A | 4/1998 | Cillessen et al. |

(Continued)

FOREIGN PATENT DOCUMENTS

| CN | 001787706 A | 6/2006 |
| CN | 101325201 | 12/2008 |

(Continued)

OTHER PUBLICATIONS

Taiwanese Office Action (Application No. 109138098) dated Nov. 27, 2020.

(Continued)

*Primary Examiner* — Michael H Caley
*Assistant Examiner* — Jonathan Y Jung
(74) *Attorney, Agent, or Firm* — Robinson Intellectual Property Law Office; Eric J. Robinson

(57) ABSTRACT

A display device with low power consumption and high display quality is provided. The display device includes first and second electrodes. One pixel includes a region in which the distance between the first electrode and the second electrode is constant and a region in which the distance varies; this structure allows the switching operation of liquid crystal to start in a predetermined region, thereby improving the stability of the operation of the liquid crystal. A pixel region is divided into two regions in which the liquid crystals are aligned in the two respective directions when switching is performed, whereby viewing angle characteristics are improved. Furthermore, the supply of a potential to a third electrode suppresses alignment disorder of the liquid crystal and improves the display quality.

19 Claims, 56 Drawing Sheets

(52) U.S. Cl.
CPC ............ *G02F 2001/134372* (2013.01); *G02F 2001/134381* (2013.01); *G02F 2001/136295* (2013.01)

(56) References Cited

U.S. PATENT DOCUMENTS

| | | | |
|---|---|---|---|
| 6,137,557 | A | 10/2000 | Hebiguchi et al. |
| 6,266,116 | B1 | 7/2001 | Ohta et al. |
| 6,294,274 | B1 | 9/2001 | Kawazoe et al. |
| 6,459,464 | B1 | 10/2002 | Nakasima et al. |
| 6,563,174 | B2 | 5/2003 | Kawasaki et al. |
| 6,727,522 | B1 | 4/2004 | Kawasaki et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,206,054 | B2 | 4/2007 | Kim |
| 7,211,825 | B2 | 5/2007 | Shih et al. |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 7,910,490 | B2 | 3/2011 | Akimoto et al. |
| 7,932,521 | B2 | 4/2011 | Akimoto et al. |
| 8,274,077 | B2 | 9/2012 | Akimoto et al. |
| 8,355,109 | B2 | 1/2013 | Kubota et al. |
| 8,395,740 | B2 | 3/2013 | Kubota et al. |
| 8,441,425 | B2 | 5/2013 | Ishitani et al. |
| 8,466,463 | B2 | 6/2013 | Akimoto et al. |
| 8,629,069 | B2 | 1/2014 | Akimoto et al. |
| 8,669,550 | B2 | 3/2014 | Akimoto et al. |
| 8,790,959 | B2 | 7/2014 | Akimoto et al. |
| 8,796,069 | B2 | 8/2014 | Akimoto et al. |
| 8,981,374 | B2 | 3/2015 | Kubota et al. |
| 9,099,562 | B2 | 8/2015 | Akimoto et al. |
| 9,134,576 | B2 | 9/2015 | Hirosawa |
| 9,177,969 | B2 | 11/2015 | Kubota et al. |
| 9,268,177 | B2 | 2/2016 | Chen et al. |
| 9,331,108 | B2 | 5/2016 | Kubota et al. |
| 9,377,652 | B2 | 6/2016 | Choi et al. |
| 9,659,977 | B2 | 5/2017 | Kubota et al. |
| 9,823,528 | B2 | 11/2017 | Tsai et al. |
| 9,917,116 | B2 | 3/2018 | Kubota et al. |
| 10,008,608 | B2 | 6/2018 | Ishitani et al. |
| 10,424,674 | B2 | 9/2019 | Ishitani et al. |
| 2001/0046027 | A1 | 11/2001 | Tai et al. |
| 2002/0008799 | A1 | 1/2002 | Ota et al. |
| 2002/0056838 | A1 | 5/2002 | Ogawa |
| 2002/0132454 | A1 | 9/2002 | Ohtsu et al. |
| 2003/0184693 | A1* | 10/2003 | Kadotani .......... G02F 1/134363 349/110 |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0099570 | A1* | 5/2005 | Matsumoto ....... G02F 1/134363 349/141 |
| 2005/0128413 | A1* | 6/2005 | Son .................. G02F 1/134363 349/143 |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0132055 | A1 | 6/2006 | Kwak |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0239191 | A1 | 10/2008 | Kasuga |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2008/0308805 | A1 | 12/2008 | Akimoto et al. |
| 2009/0068773 | A1 | 3/2009 | Lai et al. |
| 2009/0073325 | A1 | 3/2009 | Kuwabara et al. |
| 2009/0091672 | A1 | 4/2009 | Seok et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2009/0295747 | A1 | 12/2009 | Hsieh et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0195028 | A1* | 8/2010 | Kubota ............. G02F 1/134363 349/106 |
| 2010/0296019 | A1* | 11/2010 | Taniguchi ......... G02F 1/134336 349/44 |
| 2011/0104851 | A1 | 5/2011 | Akimoto et al. |
| 2011/0121290 | A1 | 5/2011 | Akimoto et al. |
| 2012/0069282 | A1 | 3/2012 | Okazaki et al. |
| 2015/0340513 | A1 | 11/2015 | Akimoto et al. |
| 2016/0266448 | A1 | 9/2016 | Lee et al. |

(56) References Cited

U.S. PATENT DOCUMENTS

| | | | |
|---|---|---|---|
| 2017/0242307 A1* | 8/2017 | Chen | G02F 1/134309 |
| 2019/0237583 A1 | 8/2019 | Ishitani et al. | |

FOREIGN PATENT DOCUMENTS

| | | |
|---|---|---|
| CN | 101794047 A | 8/2010 |
| CN | 202142534 U | 2/2012 |
| EP | 1737044 A | 12/2006 |
| EP | 2192437 A | 6/2010 |
| EP | 2226847 A | 9/2010 |
| EP | 2437112 A | 4/2012 |
| EP | 2713200 A | 4/2014 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 10-142635 A | 5/1998 |
| JP | 11-505377 | 5/1999 |
| JP | 2000-044236 A | 2/2000 |
| JP | 2000-150900 A | 5/2000 |
| JP | 2002-014374 A | 1/2002 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-096055 A | 4/2007 |
| JP | 2007-123861 A | 5/2007 |
| JP | 2010-152348 A | 7/2010 |
| JP | 2014-112195 A | 6/2014 |
| JP | 2014-199428 A | 10/2014 |
| TW | 200949654 | 12/2009 |
| TW | 201341912 | 10/2013 |
| TW | 201415132 | 4/2014 |
| TW | 201508928 | 3/2015 |
| TW | I529456 | 4/2016 |
| WO | WO-2004/114391 | 12/2004 |
| WO | WO-2010/137427 | 12/2010 |

OTHER PUBLICATIONS

Asakuma.N et al., "Crystallization and Reduction of SOL-GEL-Derived Zinc Oxide Films by Irradiation With Ultraviolet Lamp", Journal of SOL-GEL Science and Technology, 2003, vol. 26, pp. 181-184.

Asaoka.Y et al., "29.1: Polarizer-Free Reflective LCD Combined With Ultra Low-Power Driving Technology", SID Digest '09 : SID Internatinonal Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composited for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and Sc2O3—A2O3-BO

(56) References Cited

OTHER PUBLICATIONS

Systems [A; Fe, Ga, or, Al; B: Mg, Mn, Fe, Ni, Cu,or Zn] at Temperatures Over 1000< C", Journal of Solid State Chemistry, 1985, vol. 60, pp. 382-384.
Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m =7, 8, 9, and 16) in the In2O3—ZnGa2O4—ZnO Systems", Journal of Solid State Chemistry, Apr. 1, 1995, vol. 116, No. 1, pp. 170-178.
Kitzerow.H et al., "Observation of Blue Phases in Chiral Networks", Liquid Crystals, 1993, vol. 14, No. 3, pp. 911-916.
Kurokawa.Y et al., "UHF RFCPUS on Flexible and Glass Substrates for Secure RFID Systems", Journal of Solid-State Circuits , 2008, vol. 43, No. 1, pp. 292-299.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Lee.H et al., "Current Status of, Challenges to, and Perspective View of AM-OLED ", IDW '06 : Proceedings of the 13th International Display Workshops, Dec. 7, 2006, pp. 663-666.
Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.
Meiboom.S et al., "Theory of the Blue Phase of Cholesteric Liquid Crystals", Phys. Rev. Lett. (Physical Review Letters), May 4, 1981, vol. 46, No. 18, pp. 1216-1219.
Miyasaka.M, "Suftla Flexible Microelectronics on Their Way to Business", SID Digest '07 : SID International Symposium Digest of Technical Papers, 2007, vol. 38, pp. 1673-1676.
Mo.Y et al., "Amorphous Oxide TFT Backplanes for Large Size AMOLED Displays", IDW '08 : Proceedings of the 6th International Display Workshops, Dec. 3, 2008, pp. 581-584.
Nakamura.M et al., "The phase relations in the In2O3—Ga2ZnO4—ZnO system at 1350° C", Journal of Solid State Chemistry, Aug. 1, 1991, vol. 93, No. 2, pp. 298-315.
Nakamura.M, "Synthesis of Homologous Compound with New Long-Period Structure", NIRIM Newsletter, Mar. 1, 1995, vol. 150, pp. 1-4.
Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.
Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.
Nomura.K et al., "Room-Temperature Fabrication of Transparent Flexible Thin-Film Transistors Using Amorphous Oxide Semiconductors", Nature, Nov. 25, 2004, vol. 432, pp. 488-492.
Nomura.K et al., "Thin-Film Transistor Fabricated in Single-Crystalline Transparent Oxide Semiconductor", Science, May 23, 2003, vol. 300, No. 5623, pp. 1269-1272.
Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.
Oh.M et al., "Improving the Gate Stability of ZnO Thin-Film Transistors With Aluminum Oxide Dielectric Layers", J. Electrochem. Soc. (Jouranl of the Electrochemical Society), 2008, vol. 155, No. 12, pp. H1009-H1014.
Ohara.H et al., "21.3:4.0 IN. QVGA AMOLED Display Using In—Ga—Zn-Oxide TFTs With a Novel Passivation Layer", SID Digest '09 : SID International Symposium Digest of Technical Papers, May 31, 2009, pp. 284-287.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Orita.M et al., "Amorphous transparent conductive oxide InGaO3(ZnO)m (m<4):a Zn4s conductor", Philosophical Magazine, 2001, vol. 81, No. 5, pp. 501-515.
Orita.M et al., "Mechanism of Electrical Conductivity of Transparent InGaZnO4", Phys. Rev. B (Physical Review. B), Jan. 15, 2000, vol. 16, No. 3, pp. 1811-1816.
Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.
Park.J et al., "Dry etching of ZnO films and plasma-induced damage to optical properties", J. Vac, Sci. Technol. B (Journal of Vacuum Science & Technology B), Mar. 1, 2003, vol. 21, No. 2, pp. 800-803.
Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.
Park.J et al., "High performance amorphous oxide thin film transistors with self-aligned top-gate structure", IEDM 09: Technical Digest of International Electron Devices Meeting, Dec. 7, 2009, pp. 191-194.
Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.
Park.S et al., "Challenge to Future Displays: Transparent AM-OLED Driven by Peald Grown ZnO TFT", IMID '07 Digest, 2007, pp. 1249-1252.
Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Prins.M et al., "A Ferroelectric Transparent Thin-Film Transistor", Appl. Phys. Lett. (Applied Physics Letters) , Jun. 17, 1996, vol. 68, No. 25, pp. 3650-3652.
Sakata.J et al., "Development of 4.0-IN. AMOLED Display With Driver Circuit Using Amorphous In—Ga—Zn-Oxide TFTs", IDW '09 : Proceedings of the 16th International Display Workshops, 2009, pp. 689-692.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Tsuda.K et al., "Ultra Low Power Consumption Technologies for Mobile TFT-LCDs ", IDW '02 : Proceedings of the 9th International Display Workshops, Dec. 4, 2002, pp. 295-298.

(56) References Cited

OTHER PUBLICATIONS

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Chinese Office Action (Application No. 201610177481.2) dated May 8, 2020.

Taiwanese Office Action (Application No. 105108827) dated May 21, 2020.

Chinese Office Action (Application No. 201610177481.2) dated Feb. 22, 2021.

* cited by examiner

FIG. 27A
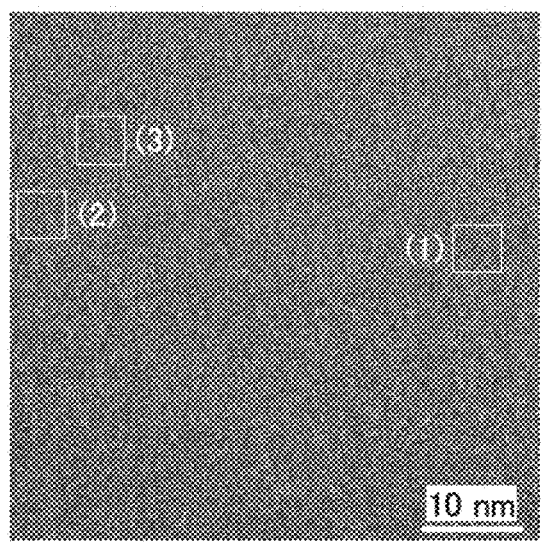
FIG. 27B  FIG. 27C  FIG. 27D
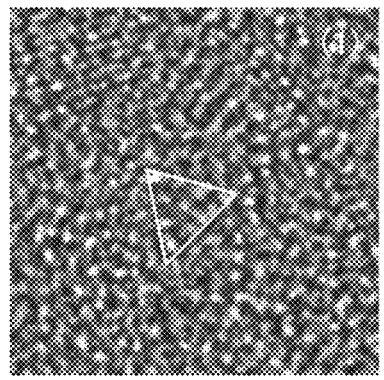 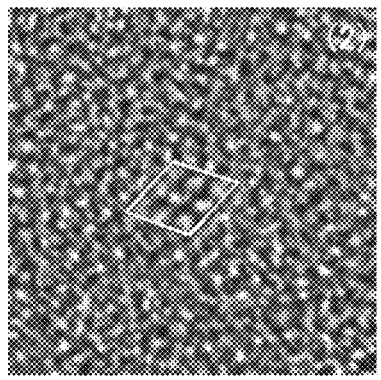 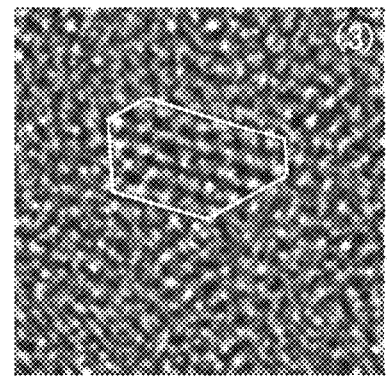

FIG. 29A
FIG. 29B
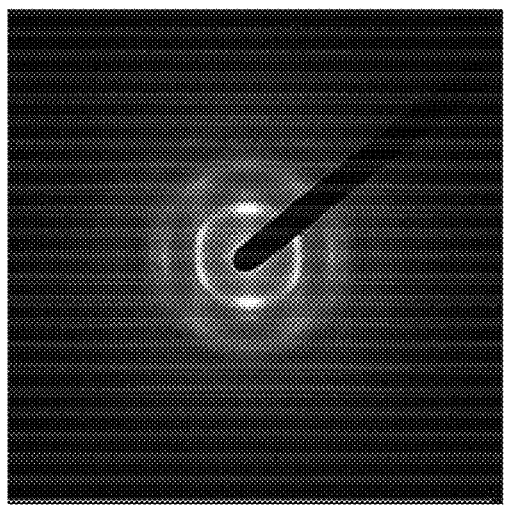
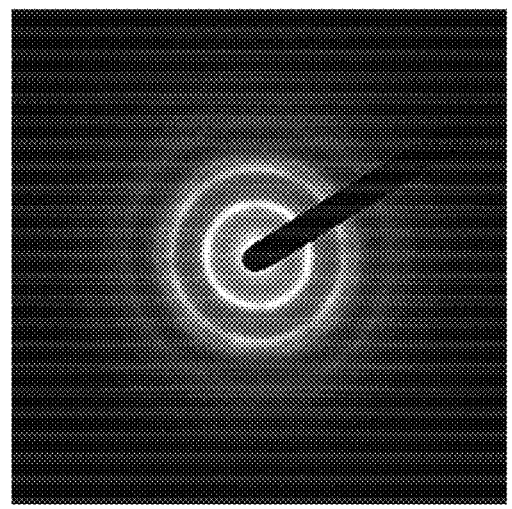

Structure of InMZnO$_4$

DISPLAY DEVICE, DISPLAY MODULE INCLUDING THE DISPLAY DEVICE, AND ELECTRONIC DEVICE INCLUDING THE DISPLAY DEVICE OR THE DISPLAY MODULE

BACKGROUND OF THE INVENTION

1. Field of the Invention

One embodiment of the present invention relates to a display device, particularly a liquid crystal display device including a liquid crystal element.

Note that one embodiment of the present invention is not limited to the above technical field. The technical field of one embodiment of the invention disclosed in this specification and the like relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a memory device, a driving method thereof, or a manufacturing method thereof.

In this specification and the like, the display device refers to any device having a display function. The display device may include a semiconductor element such as a transistor, a semiconductor circuit, an arithmetic device, a memory device, and the like. The display device also includes a driver circuit for driving a plurality of pixels, and the like. The display device also includes a control circuit, a power supply circuit, a signal generation circuit, and the like which are provided over another substrate.

2. Description of the Related Art

Transistors used for most flat panel displays typified by a liquid crystal display device and a light-emitting display device are formed using silicon semiconductors such as amorphous silicon, single crystal silicon, and polycrystalline silicon provided over glass substrates. The transistors formed using such silicon semiconductors are also used for integrated circuits (ICs) and the like. In recent years, attention has been drawn to a technique of forming transistors in which a metal oxide having semiconductor characteristics is used instead of a silicon semiconductor. In this specification, a metal oxide having semiconductor characteristics is referred to as an oxide semiconductor. For example, a technique is disclosed in which a transistor is formed using zinc oxide or an In—Ga—Zn-based oxide as an oxide semiconductor and the transistor is used as a switching element or the like in a pixel of a display device (see Patent Documents 1 and 2).

REFERENCE

Patent Document

[Patent Document 1] Japanese Published Patent Application No. 2007-123861
[Patent Document 2] Japanese Published Patent Application No. 2007-096055

SUMMARY OF THE INVENTION

An object of one embodiment of the present invention is to provide a novel display device without deterioration of display quality. Another object of one embodiment of the present invention is to provide a novel display device with low power consumption. Another object of one embodiment of the present invention is to provide a novel display device. Note that the description of these objects does not disturb the existence of other objects. In one embodiment of the present invention, there is no need to achieve all the objects. Other objects will be apparent from and can be derived from the description of the specification, the drawings, the claims, and the like.

One embodiment of the present invention is a display device including a pixel. The pixel includes a first electrode, a second electrode, a liquid crystal, and a substrate. The first electrode and the second electrode are over the substrate. An electric field parallel to the substrate is generated by potentials supplied to the first electrode and the second electrode. The liquid crystal is driven by the electric field generated between the first electrode and the second electrode. The pixel includes a region in which the distance between the first electrode and the second electrode is constant and a region in which the distance between the first electrode and the second electrode varies.

Another embodiment of the present invention is a display device including a pixel. The pixel includes first to third electrodes, a liquid crystal, a first substrate, and a second substrate. The first electrode and the second electrode are over the first substrate. The third electrode is on a side of the second substrate facing the first substrate. An electric field parallel to the first substrate is generated by potentials supplied to the first electrode and the second electrode. A potential is supplied to the third electrode. The liquid crystal is driven by electric fields generated between the first to third electrodes. The pixel includes a region in which the distance between the first electrode and the second electrode is constant and a region in which the distance between the first electrode and the second electrode varies.

Another embodiment of the present invention is a display device including a pixel. The pixel includes a first electrode, a second electrode, a liquid crystal, a substrate, and a switching element. The first electrode and the second electrode are over the substrate. An electric field parallel to the substrate is generated by potentials supplied to the first electrode and the second electrode. The liquid crystal is driven by the electric field generated between the first electrode and the second electrode. The pixel includes a region in which the distance between the first electrode and the second electrode is constant and a region in which the distance between the first electrode and the second electrode varies.

Another embodiment of the present invention is a display device including a pixel. The pixel includes first to third electrodes, a liquid crystal, a first substrate, a second substrate, and a switching element. The first electrode and the second electrode are over the first substrate. The third electrode is on a side of the second substrate facing the first substrate. An electric field parallel to the first substrate is generated by potentials supplied to the first electrode and the second electrode. A potential is supplied to the third electrode. The liquid crystal is driven by electric fields generated between the first to third electrodes. The pixel includes a region in which the distance between the first electrode and the second electrode is constant and a region in which the distance between the first electrode and the second electrode varies.

Another embodiment of the present invention is a display device in which the switching element is over the first substrate.

Another embodiment of the present invention is a display device in which the switching element is a field-effect transistor.

Another embodiment of the present invention is a display device in which the switching element includes an oxide semiconductor.

Another embodiment of the present invention is an electronic device including the display device and at least one of a switch, a speaker, and a housing.

According to one embodiment of the present invention, a novel display device without deterioration of display quality can be provided. According to another embodiment of the present invention, a novel display device with low power consumption can be provided. According to another embodiment of the present invention, a novel display device can be provided.

BRIEF DESCRIPTION OF THE DRAWINGS

FIGS. 10A-1, 10A-2, 10B-1, 10B-2, and 10C illustrate source line inversion driving and dot inversion driving of a liquid crystal display device having a display function.

FIGS. 27A to 27D are Cs-corrected high-resolution TEM images of a plane of a CAAC-OS.

FIGS. 29A and 29B show electron diffraction patterns of a CAAC-OS.

DETAILED DESCRIPTION OF THE INVENTION

Figure 1:
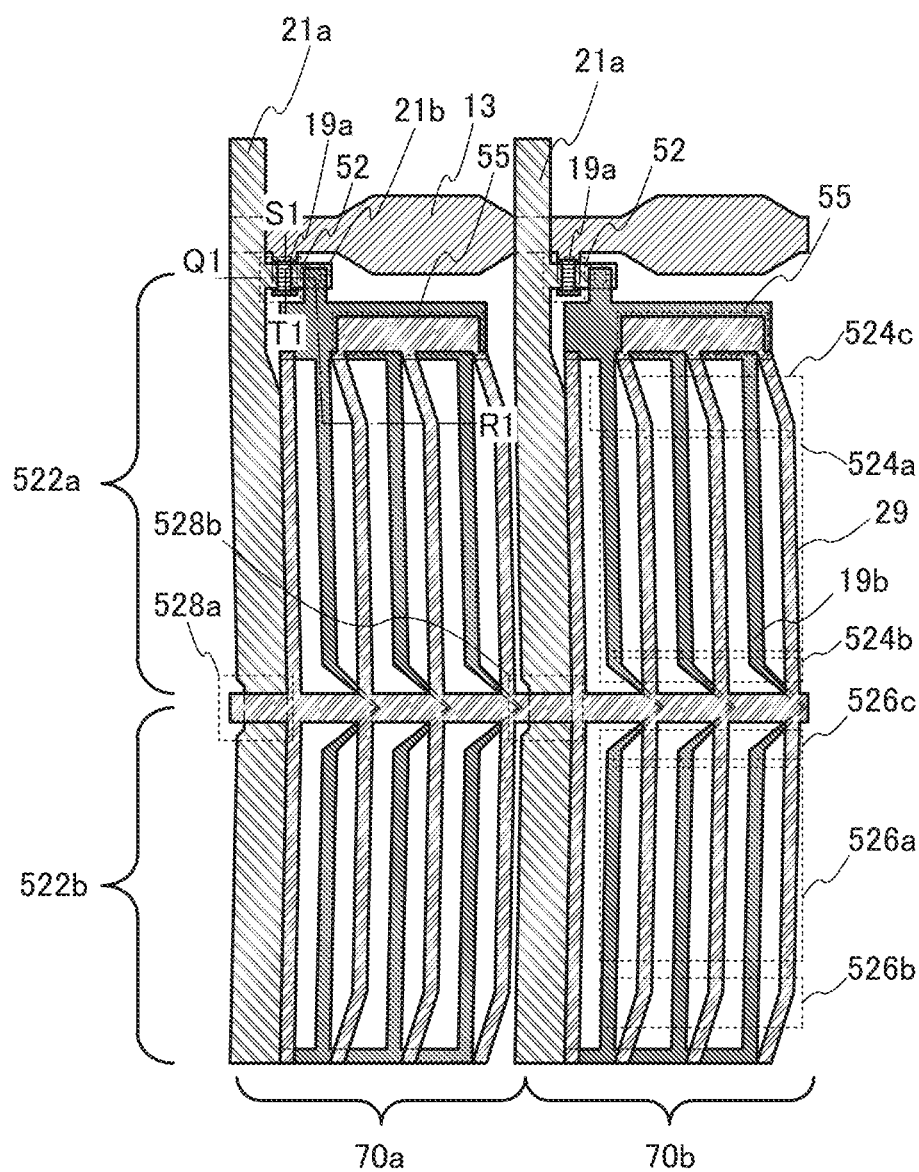
FIG. 1 is a top view illustrating one embodiment of a pixel of a display device.

Embodiments of the present invention will be described below in detail with reference to the drawings. Note that one embodiment of the present invention is not limited to the description below, and it is easily understood by those skilled in the art that various changes and modifications can be made without departing from the spirit and scope of the present invention. Therefore, one embodiment of the present invention is not interpreted as being limited to the description of the embodiments below. In addition, in the following embodiments, the same portions or portions having similar functions are denoted by the same reference numerals or the same hatching patterns in different drawings, and description thereof is not repeated.

In each drawing described in this specification, the size, the film thickness, or the region of each component may be exaggerated for clarity. Therefore, embodiments of the present invention are not limited to such a scale.

In this specification and the like, ordinal numbers such as "first" and "second" are used in order to avoid confusion among components, and the terms do not limit the components numerically. Therefore, for example, the term "first" can be replaced with the term "second," or "third" as appropriate.

In this specification and the like, the terms "film" and "layer" can be interchanged with each other. For example, in some cases, the term "conductive film" can be used instead of the term "conductive layer," and the term "insulating layer" can be used instead of the term "insulating film."

If a "semiconductor" in this specification and the like has a sufficiently low conductivity, for example, the semiconductor can have characteristics of an "insulator." Furthermore, a "semiconductor" and an "insulator" cannot be strictly distinguished from each other in some cases because the border between them is not clear. Accordingly, a "semiconductor" in this specification and the like can be called an "insulator" in some cases. Similarly, an "insulator" in this specification and the like can be called a "semiconductor" in some cases. An "insulator" in this specification and the like can be called a "semi-insulator" in some cases.

If a "semiconductor" in this specification and the like has a sufficiently high conductivity, for example, the semiconductor can have characteristics of a "conductor." Furthermore, a "semiconductor" and a "conductor" cannot be strictly distinguished from each other in some cases because the border between them is not clear. Accordingly, a "semiconductor" in this specification and the like can be called a "conductor" in some cases. Similarly, a "conductor" in this specification and the like can be called a "semiconductor" in some cases.

Note that functions of a "source" and a "drain" of a transistor are sometimes replaced with each other when a transistor of opposite polarity is used or when the direction of current flow is changed in circuit operation, for example. Therefore, the terms "source" and "drain" can be used to denote the drain and the source, respectively, in this specification.

In this specification and the like, patterning is assumed to be performed by a photolithography process. Note that the patterning is not limited to a photolithography process and processes other than the photolithography process can also be employed. In addition, a mask formed in the photolithography process is removed after etching treatment.

In this specification and the like, a silicon oxynitride film refers to a film in which the proportion of oxygen is higher than that of nitrogen. The silicon oxynitride film preferably contains oxygen, nitrogen, silicon, and hydrogen in the ranges of 55 atomic % to 65 atomic %, 1 atomic % to 20 atomic %, 25 atomic % to 35 atomic %, and 0.1 atomic % to 10 atomic %, respectively. Furthermore, a silicon nitride oxide film refers to a film in which the proportion of nitrogen is higher than that of oxygen. The silicon nitride oxide film preferably contains nitrogen, oxygen, silicon, and hydrogen in the ranges of 55 atomic % to 65 atomic %, 1 atomic % to 20 atomic %, 25 atomic % to 35 atomic %, and 0.1 atomic % to 10 atomic %, respectively.

Embodiment 1

In this embodiment, a display device 80 of one embodiment of the present invention will be described with reference to FIG. 1, FIG. 2, FIGS. 3A and 3B, FIGS. 4A to 4C, and FIGS. 5A and 5B.

Figure 3A:
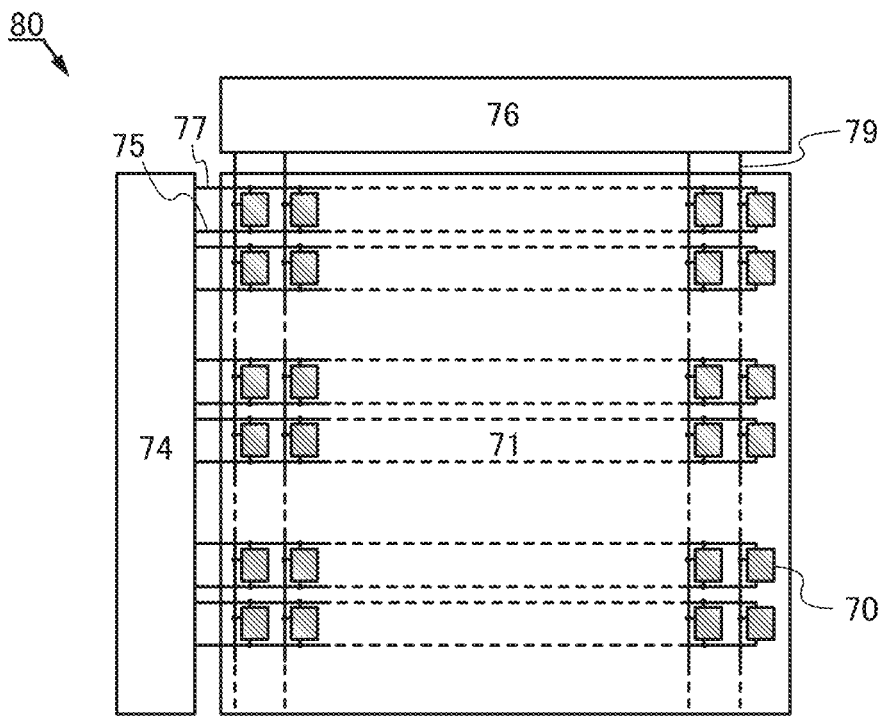
FIGS. 3A and 3B are a top view and a circuit diagram, respectively, which illustrate one embodiment of a display device.

The display device 80 illustrated in FIG. 3A includes a pixel portion 71, a scan line driver circuit 74, a signal line driver circuit 76, m scan lines 77 which are arranged parallel or substantially parallel to each other and whose potentials are controlled by the scan line driver circuit 74, and n signal lines 79 which are arranged parallel or substantially parallel to each other and whose potentials are controlled by the signal line driver circuit 76. The pixel portion 71 includes a plurality of pixels 70 arranged in a matrix. Furthermore, common lines 75 arranged parallel or substantially parallel to each other are provided along the scan lines 77. The scan line driver circuit 74 and the signal line driver circuit 76 are collectively referred to as a driver circuit portion in some cases.

Each of the scan lines 77 is electrically connected to n pixels 70 in the corresponding row among the pixels 70 arranged in m rows and n columns in the pixel portion 71. Each of the signal lines 79 is electrically connected to m pixels 70 in the corresponding column among the pixels 70 arranged in m rows and n columns. Note that m and n are each an integer of 1 or greater. Each of the common lines 75 is electrically connected to n pixels 70 in the corresponding row among the pixels 70 arranged in m rows and n columns.

Figure 3B:
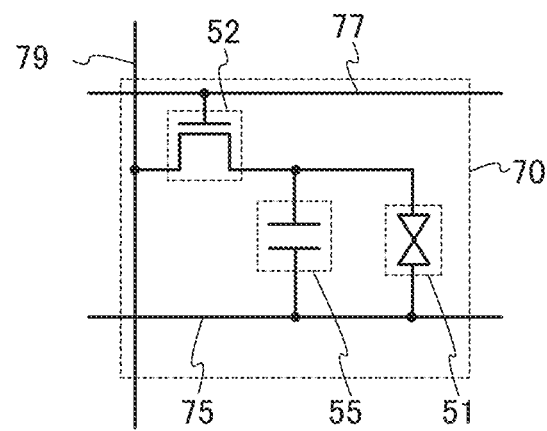

FIG. 3B illustrates an example of the circuit configuration that can be used for the pixel 70 of the display device 80 in FIG. 3A.

The pixel 70 in FIG. 3B includes a liquid crystal element 51, a transistor 52, and a capacitor 55.

One of a pair of electrodes of the liquid crystal element 51 is electrically connected to the signal line 79 through the transistor 52. The potential of the one of the pair of electrodes of the liquid crystal element 51 is set as appropriate in accordance with the specifications of the pixel 70. The other of the pair of electrodes of the liquid crystal element 51 is connected to the common line 75 and supplied with a common potential. The alignment state of liquid crystal included in the liquid crystal element 51 is controlled by data supplied through the transistor 52.

The liquid crystal element 51 controls transmission or non-transmission of light by an optical modulation action of liquid crystal. Note that the optical modulation action of liquid crystal is controlled by an electric field applied to the liquid crystal (including a horizontal electric field, a vertical electric field, and an oblique electric field). As the liquid crystal used for the liquid crystal element 51, thermotropic liquid crystal, low-molecular liquid crystal, high-molecular liquid crystal, polymer-dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

In the case where a horizontal electric field mode is employed, liquid crystal exhibiting a blue phase for which an alignment film is unnecessary may be used. The blue phase is one of liquid crystal phases, which is generated just before a cholesteric phase changes into an isotropic phase when the temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and optical isotropy. In addition, the liquid crystal composition which includes liquid crystal exhibiting a blue phase and a chiral material does not need alignment treatment and has a small viewing angle dependence. An alignment film does not need to be provided, and thus, rubbing treatment is not necessary; accordingly, electrostatic discharge damage caused by the rubbing treatment can be prevented, and defects and damage of a liquid crystal display device in the manufacturing process can be reduced.

Note that a liquid crystal material with positive or negative dielectric constant anisotropy can used for the liquid crystal layer. In some cases, the use of a material with negative dielectric constant anisotropy can suppress an influence of a flexoelectric effect, which is attributed to polarization of liquid crystal molecules included in the liquid crystal material of the liquid crystal layer. A liquid crystal material may be selected as appropriate in accordance with the operation mode of liquid crystal.

The display device 80 including the liquid crystal element 51 can be driven in a twisted nematic (TN) mode, an in-plane switching (IPS) mode, a fringe field switching (FFS) mode, an axially symmetric aligned micro-cell (ASM) mode, an optical compensated birefringence (OCB) mode, a ferroelectric liquid crystal (FLC) mode, an anti-ferroelectric liquid crystal (AFLC) mode, or the like.

The display device 80 may be a normally black liquid crystal display device such as a vertical alignment (VA) mode transmissive liquid crystal display device. As the vertical alignment mode, a multi-domain vertical alignment (MVA) mode, a patterned vertical alignment (PVA) mode, an Advanced Super View (ASV) mode, or the like can be used.

In this embodiment, a horizontal electric field mode typified by an FFS mode will be mainly described.

In the pixel 70 in FIG. 3B, one of a source electrode and a drain electrode of the transistor 52 is electrically connected to the signal line 79, and the other is electrically connected to the one of the pair of electrodes of the liquid crystal element 51. A gate electrode of the transistor 52 is electrically connected to the scan line 77. The transistor 52 has a function of controlling transmission and reception of data signals between the signal line 79 and the capacitor 55 and between the signal line 79 and the liquid crystal element 51.

In the pixel 70 in FIG. 3B, one of a pair of electrodes of the capacitor 55 is connected to the other of the source electrode and the drain electrode of the transistor 52. The other of the pair of electrodes of the capacitor 55 is electrically connected to the common line 75. The potential of the common line 75 is set as appropriate in accordance with the specifications of the pixel 70. The capacitor 55 functions as a storage capacitor for storing written data. In the display device 80 driven in the FFS mode, the one of the pair of electrodes of the capacitor 55 corresponds to part or the whole of the one of the pair of electrodes of the liquid crystal element 51, and the other of the pair of electrodes of the capacitor 55 corresponds to part or the whole of the other of the pair of electrodes of the liquid crystal element 51.

Next, a specific configuration of a pixel included in the display device 80 will be described. FIG. 1 shows a top view of a plurality of pixels 70a and 70b included in the display device 80 driven in the FFS mode.

Figure 2:
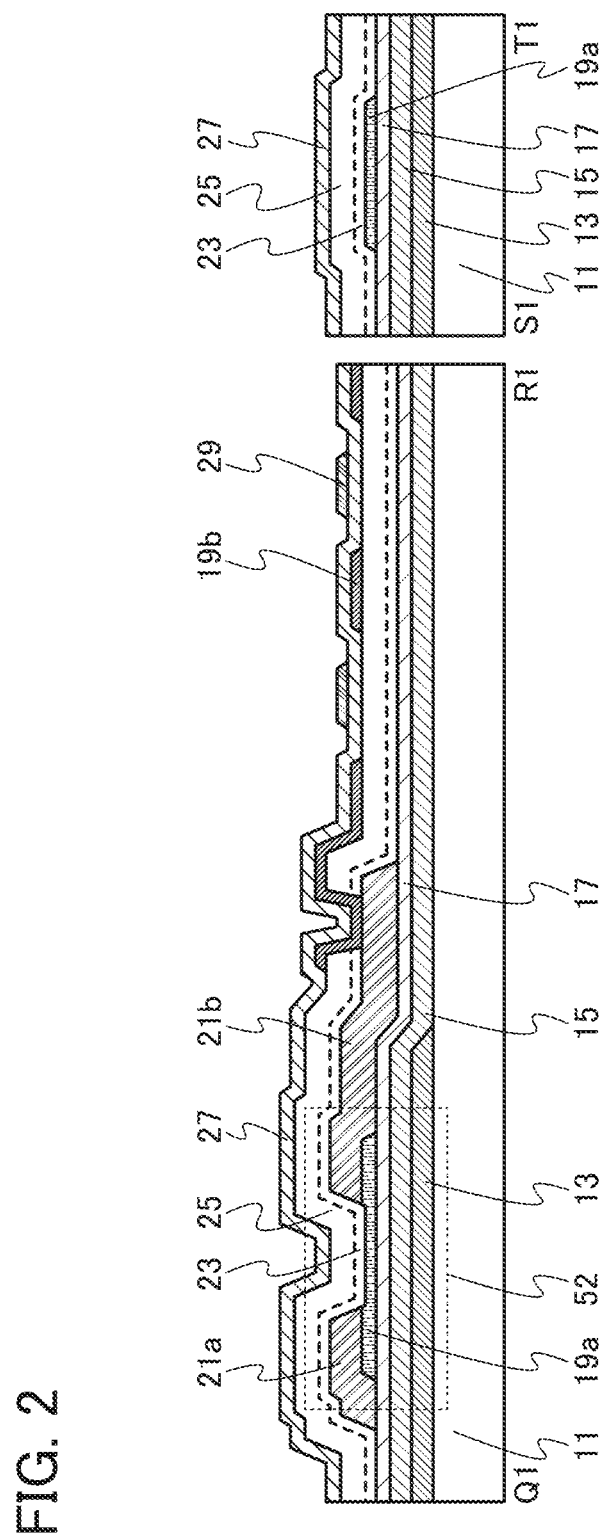
FIG. 2 is a cross-sectional view illustrating one embodiment of a display device.

FIG. 2 shows cross-sectional views taken along dashed-dotted line Q1-R1 and dashed-dotted line S1-T1 in FIG. 1. The transistor 52 in FIG. 2 is a channel-etched transistor. The transistor 52 in the channel length direction is illustrated in the cross-sectional view taken along dashed-dotted line Q1-R1, and the transistor 52 in the channel width direction is illustrated in the cross-sectional view taken along dashed-dotted line S1-T1.

In FIG. 1, a conductive film 13 extends substantially perpendicularly to the signal line 79 (a conductive film 21a) (in the horizontal direction in the drawing). The conductive film 21a extends substantially perpendicularly to the scan line 77 (conductive film 13) (in the vertical direction in the drawing).

The conductive film 13 is electrically connected to the scan line driver circuit 74, and the conductive film 21a is electrically connected to the signal line driver circuit 76 (see FIG. 3A).

The transistor 52 is provided near the intersection of the conductive film 13 and the conductive film 21a. The transistor 52 includes the conductive film 13 functioning as a gate electrode, an oxide semiconductor film 19a which is formed over insulating films 15 and 17 and in which a channel region is formed, and the conductive film 21a and a conductive film 21b which function as a source electrode and a drain electrode. The conductive film 13 also functions as a scan line, and a region of the conductive film 13 which overlaps with the oxide semiconductor film 19a functions as a gate electrode of the transistor 52. The conductive film 21a also functions as a signal line, and a region of the conductive film 21a which overlaps with the oxide semiconductor film 19a functions as a source electrode or a drain electrode of the transistor 52. In the top view in FIG. 1, an end portion of the conductive film 13 is located on the outer side of an end portion of the oxide semiconductor film 19a. Thus, the scan line functions as a light-blocking film for blocking light from a light source such as a backlight. For this reason, the oxide semiconductor film 19a included in the transistor is not irradiated with light, so that a change in the electrical characteristics of the transistor can be suppressed (see FIG. 1 and FIG. 2).

The conductive film 21b is electrically connected to an oxide semiconductor film 19b functioning as a pixel electrode. A common electrode 29 is provided over the oxide semiconductor film 19b with an insulating film 27 positioned therebetween (see FIG. 2).

The common electrode 29 includes a region extending in the direction intersecting with the signal line. The region is connected to regions extending parallel or substantially parallel to the signal line. Therefore, in the plurality of pixels included in the display device 80, the stripe regions of the common electrode 29 have the same potential.

The capacitor 55 is formed in a region in which the oxide semiconductor film 19b and the common electrode 29 overlap with each other. The oxide semiconductor film 19b and the common electrode 29 may transmit light. That is, the capacitor 55 may transmit light.

In the case where the capacitor 55 transmits light, the capacitor 55 can be formed large (in a large area) in the pixel 70. Thus, a display device with a large capacitance as well as a high aperture ratio of typically 50% or higher, preferably 60% or higher can be obtained. For example, in a high-resolution display device such as a high-resolution liquid crystal display device, the area of a pixel is small, and accordingly, the area of a capacitor is also small. For this reason, the amount of charge accumulated in the capacitor is small in the high-resolution display device. However, when the capacitor 55 of this embodiment, which transmits light, is provided in each pixel, enough capacitance can be obtained in the pixel and the aperture ratio can be increased. Typically, the capacitor 55 can be favorably used for a high-resolution display device with a pixel density of 200 pixels per inch (ppi) or higher, 300 ppi or higher, or 500 ppi or higher.

In a liquid crystal display device, an increase in the capacitance of a capacitor can increase the period in which the alignment of liquid crystal molecules in a liquid crystal element can be kept constant while an electric field is applied. That period can be made longer when a still image is displayed; accordingly, the number of times of rewriting image data can be reduced, leading to a reduction in power consumption. Furthermore, the structure of this embodiment can increase the aperture ratio even in a high-resolution display device, which makes it possible to use light from a light source such as a backlight efficiently, so that the power consumption of the display device can be reduced.

The transistor 52 in FIG. 2 has a single-gate structure and includes the conductive film 13 which is provided over a substrate 11 and functions as a gate electrode. The transistor 52 further includes the insulating film 15 which is formed over the substrate 11 and the conductive film 13 functioning as a gate electrode, an insulating film 17 formed over the insulating film 15, the oxide semiconductor film 19a which overlaps with the conductive film 13 functioning as a gate electrode with the insulating film 15 and the insulating film 17 positioned therebetween, and the conductive films 21a and 21b which are in contact with the oxide semiconductor film 19a and function as a source electrode and a drain electrode. An insulating film 23 is formed over the insulating film 17, the oxide semiconductor film 19a, and the conductive films 21a and 21b functioning as a source electrode and a drain electrode. An insulating film 25 is formed over the insulating film 23. The oxide semiconductor film 19b is formed over the insulating film 25. The oxide semiconductor film 19b is electrically connected to one of the conductive films 21a and 21b functioning as a source electrode and a drain electrode (here, the conductive film 21b) through an opening provided in the insulating film 23 and the insulating film 25. The insulating film 27 is formed over the insulating film 25 and the oxide semiconductor film 19b. The common electrode 29 is formed over the insulating film 27.

A film which is formed at the same time as the oxide semiconductor film 19b may be provided over the insulating film 25 so as to overlap with the oxide semiconductor film 19a, in which case the transistor 52 has a double-gate structure in which the oxide semiconductor film 19b is used as a second gate electrode.

A region in which the oxide semiconductor film 19b, the insulating film 27, and the common electrode 29 overlap with one another functions as the capacitor 55. The capacitor 55 can prevent a potential decrease in a period during which the pixel is not selected, whereby display quality can be improved.

In FIG. 1, the pixel 70a and the pixel 70b each include a region 522a and a region 522b. When seen from the above, the oxide semiconductor film 19b and the common electrode 29 in the region 522a are line-symmetric to those in the region 522b with respect to a portion of the common electrode 29 extending parallel to the conductive film 13.

The common electrode is preferably provided at the boundary between the two regions 522a and 522b for the following reason. In such a structure, when liquid crystals are driven by application of electric fields in the two regions, the liquid crystals are line-symmetrically aligned with respect to the common electrode at the boundary between the regions 522a and 522b as an axis.

As in the pixel 70b in FIG. 1, the oxide semiconductor film 19b functioning as a pixel electrode in the region 522a has a region 524a in which a plurality of patterns with slits (a comb-like shape) is arranged parallel to the common electrode 29 and regions 524b and 524c in which the patterns are not parallel to the common electrode 29. In other words, the pixel has the region 524a in which the common electrode 29 and the oxide semiconductor film 19b functioning as a pixel electrode are arranged parallel to each other, the region 524b in which the oxide semiconductor film 19b is bent toward the common electrode 29, and the region 524c in which the common electrode 29 is bent toward the oxide semiconductor film 19b.

The oxide semiconductor film 19b functioning as a pixel electrode in the region 522b has a region 526a in which a plurality of patterns with slits (a comb-like shape) is arranged parallel to the common electrode 29 and regions 526b and 526c in which the patterns are not parallel to the common electrode 29. In other words, the pixel has the region 526a in which the common electrode 29 and the oxide semiconductor film 19b functioning as a pixel electrode are arranged parallel to each other, the region 526b in which the common electrode 29 is bent toward the oxide semiconductor film 19b, and the region 526c in which the oxide semiconductor film 19b is bent toward the common electrode 29.

In the regions 524a and 526a, which are the central portions of the regions 522a and 522b, slits of the pixel electrode and slits of the common electrode are arranged at regular intervals. In the regions 524b, 524c, 526b, and 526c, which are positioned close to the outer peripheries of the regions 522a and 522b, the slits of the pixel electrode and the slits of the common electrode are not arranged at regular intervals, and the intervals gradually decrease toward the outer peripheries of the region 522a and the region 522b.

Effects of such an electrode pattern in the pixel portion will be described below with reference to FIGS. 4A to 4C.

A liquid crystal material has fluidity. When voltage is applied between a pixel electrode and a common electrode, liquid crystal molecules 800 included in the liquid crystal material interact with an electric field generated between the pixel electrode and the common electrode and move, so that the alignment is changed from the initial state.

Figure 4A:
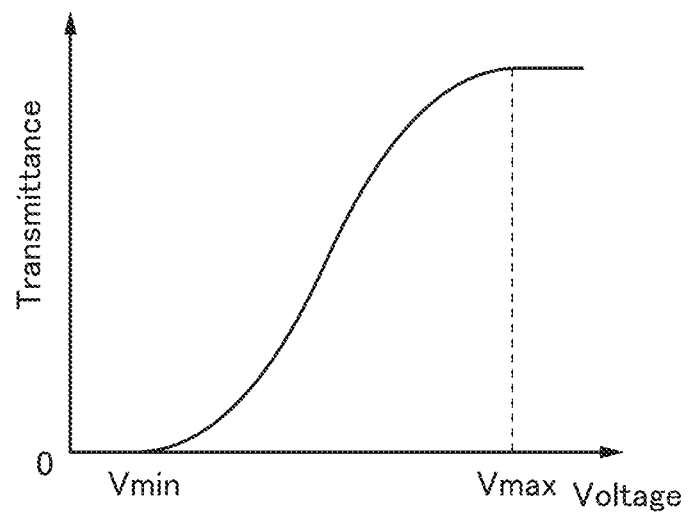
FIGS. 4A to 4C schematically illustrate optical characteristics of a liquid crystal element and one embodiment of the operation of liquid crystal molecules.
Figure 4B:
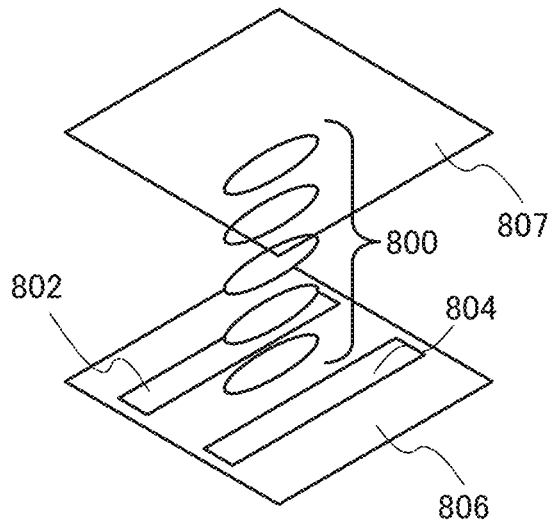
Figure 4C:
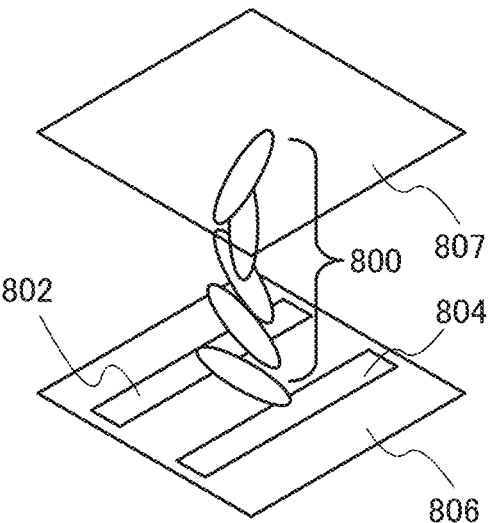

FIGS. 4A to 4C schematically illustrate the response of the liquid crystal material to an electric field. In the example in FIGS. 4A to 4C, the alignment of the liquid crystal molecules 800 is changed by an electric field generated between electrodes 802 and 804 over a substrate 806. The liquid crystal material is positioned between the substrate 806 and a substrate 807 and includes the liquid crystal molecules 800. In FIG. 4A, the horizontal axis represents the voltage between the electrodes 802 and 804, and the vertical axis represents transmittance. FIG. 4B schematically illustrates the alignment of the liquid crystal molecules 800 in the state in which the intensity of the electric field between the electrodes 802 and 804 over the substrate 806 is low, for example, lower than or equal to Vim, in FIG. 4A. The alignment is changed with an increase in the intensity of the electric field; the more intense the electric field is, the larger the rotation angle from the state in FIG. 4B is (FIG. 4C).

The liquid crystal molecule has a rod shape. The liquid crystal molecule can have positive or negative dielectric constant anisotropy. The response of the liquid crystal molecule 800 having such properties to incident polarized light varies depending on the relation between the plane of vibration of the polarized light and the direction in which the liquid crystal molecule is aligned. In other words, the liquid crystal molecule 800 has refractive index anisotropy. The refractive index anisotropy of liquid crystal may result in viewing angle dependence.

In the meantime, a liquid crystal element can be divided into a plurality of regions with different alignment directions. Therefore, when the liquid crystal element is divided into a plurality of regions in the respective alignment states, the refractive index anisotropy in one region can be canceled by the refractive index anisotropy in another region. This method can be utilized to reduce viewing angle dependence. Specifically, the refractive index anisotropy is balanced between one region and another region, whereby viewing angle dependence can be reduced.

Figure 5A:
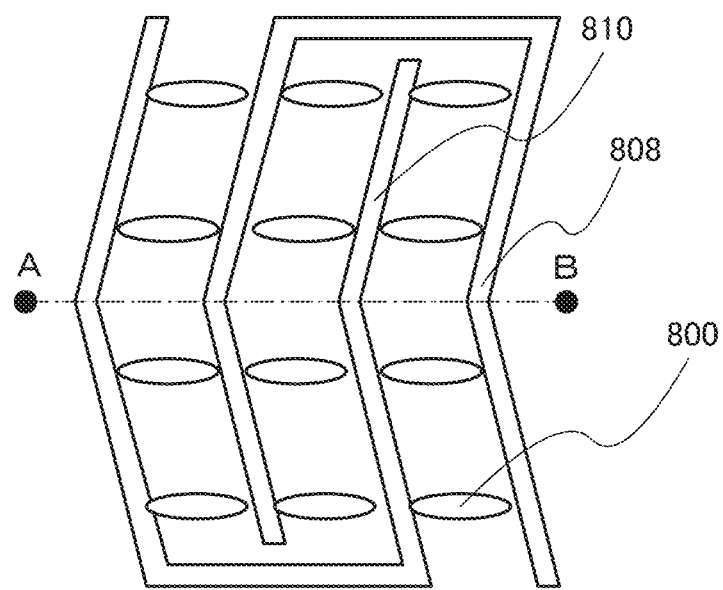
FIGS. 5A and 5B schematically illustrate one embodiment of the operation of liquid crystal molecules.
Figure 5B:
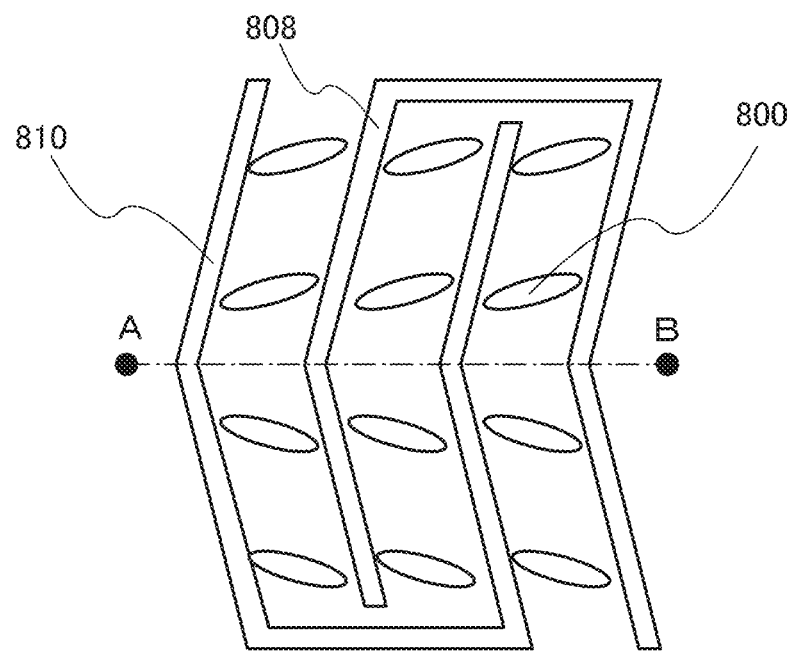

When the electrode pattern is bent at the center line of the pixel, switching of the molecules is performed in two different directions. For example, FIGS. 5A and 5B are top views schematically illustrating a substrate over which a pixel electrode and a common electrode are arranged and the liquid crystal molecules 800 therebetween. In the example in FIGS. 5A and 5B, the liquid crystal molecules 800 above dashed-dotted line A-B and those below dashed-dotted line A-B are aligned in the two respective directions. FIG. 5A illustrates the initial state in which an electric field has not yet been applied between a pixel electrode 808 and a common electrode 810, and FIG. 5B illustrates the state in which an electric field is being applied. As illustrated in FIG. 5B, the tilt angle of the liquid crystal molecules 800 above dashed-dotted line A-B is different from that below dashed-dotted line A-B.

In this structure, the refractive index anisotropy can be balanced as follows: before application of an electric field, the liquid crystal molecules are aligned in one direction as illustrated in FIG. 5A; when an electric field is applied, the alignment differs between the two regions divided horizontally by dashed-dotted line A-B as illustrated in FIG. 5B. FIG. 1 illustrates an example in which this method is applied to the pixel portion of the display device 80.

Normally, liquid crystal molecules in a liquid crystal element are aligned such that their long axes face substantially the same direction; however, alignment disorder (alignment defect) may occur in a portion. The light-transmitting property of a portion with alignment disorder is different from that in a well-aligned portion.

In addition, although the rotation angle from the initial alignment state increases with an increase in the intensity of an electric field as described above, the rotation angle is saturated at a certain angle. As long as the electric field intensity is within the range in which the rotation angle is not saturated, the rotation angle varies between regions with different electric field intensities on the same plane. Liquid crystal in a region with a higher electric field intensity starts to move first. The electric field intensity is obtained by dividing a potential difference by the distance between electrodes. Therefore, in the case where the pixel electrode and the common electrode are each supplied with a constant potential, the electric field intensity is more likely to change in a region in which the distance between the pixel electrode and the common electrode is smaller. An abrupt change in electric field intensity is more likely to cause a significant alignment disorder of liquid crystal; in contrast, a slow change in electric field intensity is less likely to cause alignment disorder.

In the structure of this embodiment, in which the distance between the pixel electrode and the common electrode gradually decreases, a region in which the direction of a line of electric force generated between the pixel electrode and the common electrode changes abruptly can be eliminated, whereby alignment defects can be reduced.

In the top view in FIG. 1, the common electrode 29 is provided adjacent to the conductive film 21a. In this structure, the common electrode 29 blocks an electric field generated from the conductive film 21a to the oxide semiconductor film 19b; thus, alignment defects can be reduced, and accordingly, display quality can be improved.

When a light-blocking conductive material is used for the portion of the common electrode 29 which is provided between the two regions 522a and 522b and extends parallel to the conductive film 13, the common electrode 29 can conceal an alignment defect of liquid crystal which occurs at the boundary between the two regions 522a and 522b, thereby preventing a user of the display device from perceiving the alignment defect. Accordingly, display quality can be improved.

Furthermore, although the most part of the conductive film 21a has a linear pattern, the pattern width is smaller in regions 528a and 528b. This structure enables a reduction in parasitic capacitance between the conductive film 21a and the common electrode 29, thereby suppressing an increase in power consumption.

Thus, by arranging the conductive film 21a, the oxide semiconductor film 19b, and the common electrode 29 as in FIG. 1, viewing angle characteristics can be improved, the liquid crystal molecules can be driven more stably, and power consumption can be reduced.

Note that this embodiment can be combined as appropriate with any of the other embodiments in this specification.

Embodiment 2

In this embodiment, an example of a liquid crystal display device which includes a display portion including the pixel described in Embodiment 1 will be described with reference to FIG. 6 and FIGS. 7A and 7B.

Figure 6:
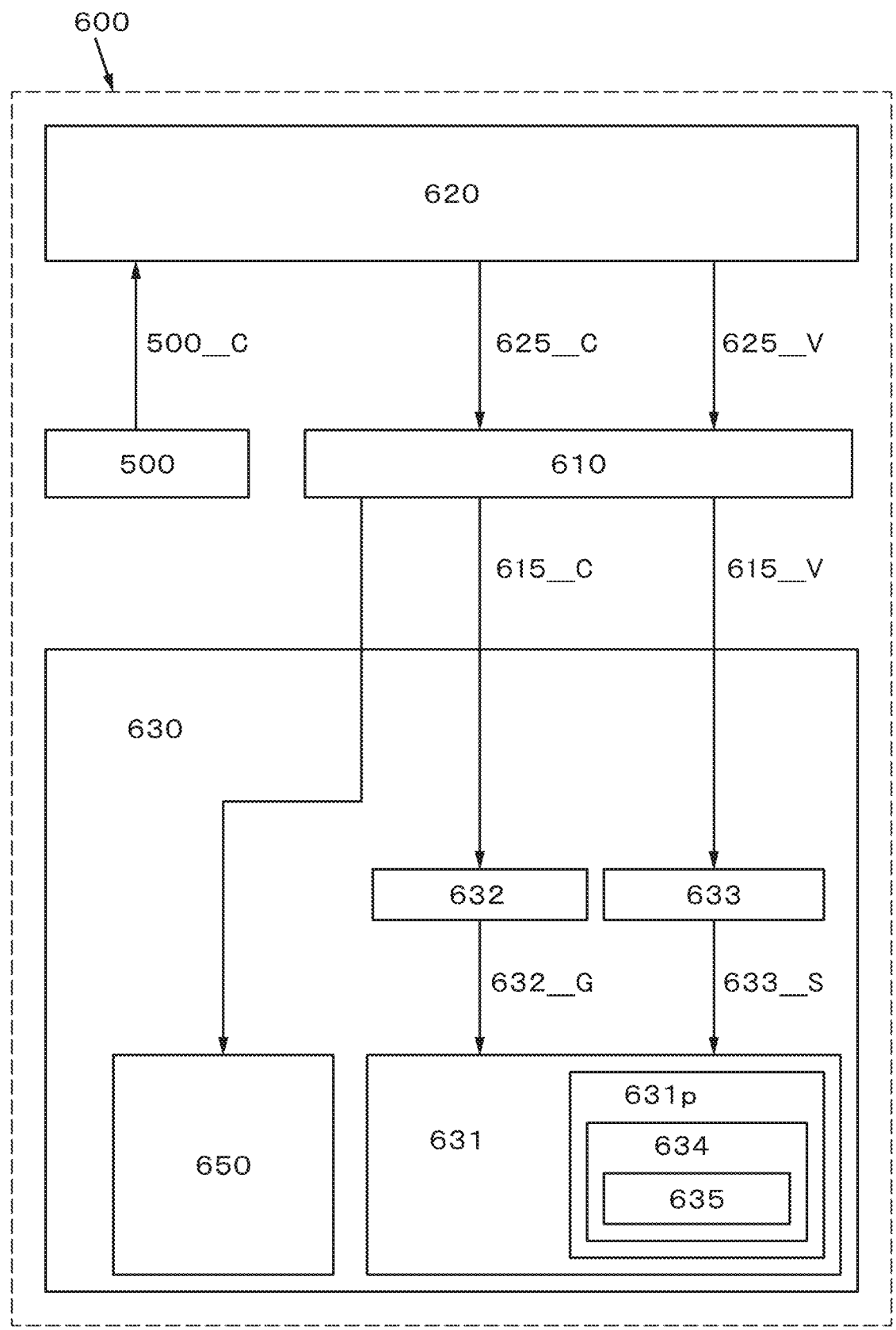
FIG. 6 is a block diagram illustrating the configuration of a liquid crystal display device having a display function.

FIG. 6 is a block diagram illustrating the configuration of a liquid crystal display device having a display function of one embodiment of the present invention.

Figure 7A:
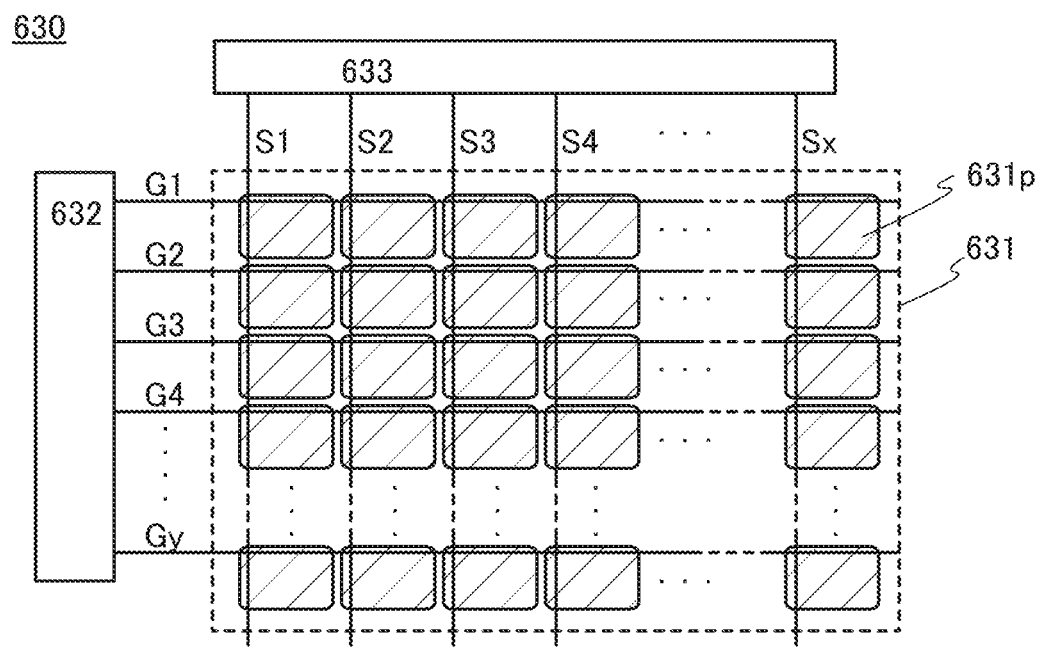
FIGS. 7A and 7B illustrate the configuration of a display portion of a liquid crystal display device having a display function.
Figure 7B:
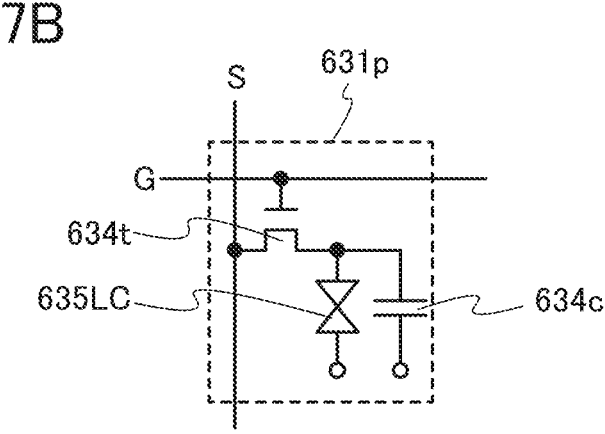

FIGS. 7A and 7B are a top view and a circuit diagram, respectively, which illustrate the configuration of a display portion of the liquid crystal display device having a display function of one embodiment of the present invention.

<1. Configuration of Liquid Crystal Display Device>

In this embodiment, a liquid crystal display device 600 having a display function will be described with reference to FIG. 6. The liquid crystal display device 600 includes an arithmetic device 620, a control portion 610, a display portion 630, and an input unit 500.

The display portion 630 includes a pixel portion 631. The pixel portion 631 includes a plurality of pixels 631$p$, and each of the pixels 631$p$ includes a pixel circuit 634.

Next, the relations between components will be outlined. First, the arithmetic device 620 outputs a primary control signal 625_C and a primary image signal 625_V to the control portion 610.

The input unit 500 is provided to output a control signal to the arithmetic device 620, whereby a signal based on information that the user has supplied to the input unit can be output from the arithmetic device 620 to the control portion 610.

The control portion 610 controls a signal line driver circuit (hereinafter referred to as an S driver circuit 633) and a scan line driver circuit (hereinafter referred to as a G driver circuit 632).

The G driver circuit 632 outputs a G signal 632_G. By controlling the G signal 632_G, the frequency at which one of the plurality of pixel circuits 634 provided in the pixel portion 631 is selected can be changed.

In a display device with the configuration of this embodiment, the operation can be switched between the following modes: an operation mode in which a smooth moving image is displayed and an operation mode in which an image is displayed at a lower frame frequency so that power consumption can be reduced and eye-friendly display with fewer flickers can be achieved.

For example, the following modes can be employed: a first mode in which the G signal for selecting a pixel is output at a frequency of 60 Hz or higher and a second mode in which the G signal is output at a frequency of 1 Hz or lower, preferably 0.2 Hz or lower.

As a result, the liquid crystal display device 600 can have a display function which causes less eye fatigue of the user.

Elements of the liquid crystal display device having a display function of one embodiment of the present invention will be described below.

<2. Arithmetic Device>

The arithmetic device 620 generates the primary image signal 625_V and the primary control signal 625_C.

The primary control signal 625_C generated by the arithmetic device 620 includes a mode-switching signal.

For example, the arithmetic device 620 may output the primary control signal 625S including the mode-switching signal in accordance with an image-switching signal 500_C output from the input unit 500.

<3. Control Portion>

The control portion 610 outputs a secondary image signal 615_V generated from the primary image signal 625_V. Although the secondary image signal 615_V is output to the S driver circuit 633 in FIG. 6, one embodiment of the present invention is not limited to this configuration, and the primary image signal 625_V can be directly output to the display portion 630.

The control portion 610 has functions of generating secondary control signals 615_C such as a start pulse signal SP, a latch signal LP, and a pulse width control signal PWC by using the primary control signals 625_C including a synchronization signal such as a vertical synchronization signal or a horizontal synchronization signal and supplying the secondary control signals to the display portion 630. The secondary control signals 615_C also include a clock signal CK and the like.

The control portion 610 can be provided with an inversion control circuit to have a function of inverting the polarity of the secondary image signal 615_V at a timing notified by the inversion control circuit. Specifically, the polarity of the secondary image signal 615_V may be inverted in the control portion 610 or may be inverted in the display portion 630 in accordance with an instruction from the control portion 610.

The inversion control circuit has a function of determining, using a synchronization signal, the timing at which the polarity of the secondary image signal 615_V is inverted. For example, the inversion control circuit includes a counter and a signal generation circuit.

The counter has a function of counting the number of frame periods by using the pulse of a horizontal synchronization signal.

The signal generation circuit has a function of notifying the timing at which the polarity of the secondary image signal 615_V is inverted to the control portion 610 so that the polarity of the secondary image signal 615_V is inverted every plural consecutive frame periods by using the information on the number of frame periods obtained by the counter.

<4. Display Portion>

The display portion 630 includes the pixel portion 631 including a display element 635 in each pixel and driver circuits such as the S driver circuit 633 and the G driver circuit 632. The pixel portion 631 includes the plurality of pixels 631$p$ each provided with the display element 635 (see FIG. 6).

The secondary image signal 615_V, which is input from the control portion 610 to the display portion 630, is supplied to the S driver circuit 633. In addition, power supply potentials are supplied to the S driver circuit 633 and the G driver circuit 632, and the secondary control signals 615_C are supplied to the G driver circuit 632.

The S driver circuit 633 holds an input first driving signal (also referred to as an S signal) 633_S and outputs it to the pixel portion 631. The display element 635 included in the pixel circuit 634 of the pixel portion 631 displays an image in accordance with the S signal 633_S.

The G driver circuit 632 outputs the second driving signal (G signal) 632_G for selecting the pixel circuit 634 to the pixel portion 631.

Note that the secondary control signals 615_C include an S driver circuit start pulse signal SP and an S driver circuit clock signal CK for controlling the operation of the S driver circuit 633, a latch signal LP, a G driver circuit start pulse SP and a G driver circuit clock signal CK for controlling the operation of the G driver circuit 632, a pulse width control signal PWC, and the like.

FIG. 7A illustrates a configuration example of the display portion 630.

In the display portion 630 in FIG. 7A, the plurality of pixels 631$p$, a plurality of scan lines G for selecting the pixels 631$p$ row by row, and a plurality of signal lines S for supplying the S signal 633_S generated from the secondary image signal 615_V to the selected pixels 631$p$ are provided in the pixel portion 631.

The input of the G signals 632_G to the scan lines G is controlled by the G driver circuit 632. The input of the S signals 633_S to the signal lines S is controlled by the S driver circuit 633. Each of the plurality of pixels 631p is connected to at least one of the scan lines G and at least one of the signal lines S.

Note that the kind and number of wirings provided in the pixel portion 631 can be determined in accordance with the configuration, number, and arrangement of the pixels 631p. Specifically, in the pixel portion 631 in FIG. 7A, the pixels 631p are arranged in a matrix of x columns and y rows, and signal lines S1 to Sx and scan lines G1 to Gy are arranged in the pixel portion 631.

<4-1. Pixel>

Each of the pixels 631p includes the pixel circuit 634 including the display element 635.

<4-2. Pixel Circuit>

As an example of this embodiment, FIG. 7B illustrates a configuration of the pixel circuit 634 in which a liquid crystal element 635LC is used as the display element 635.

The pixel circuit 634 includes a transistor 634t for controlling supply of the S signal 633_S to the liquid crystal element 635LC. An example of connection relation between the transistor 634t and the display element 635 will be described.

A gate of the transistor 634t is connected to one of the scan lines G1 to Gy. One of a source and a drain of the transistor 634t is connected to one of the signal lines S1 to Sx. The other of the source and the drain of the transistor 634t is connected to a first electrode of the liquid crystal element 635LC.

As needed, the pixel 631p may include, in addition to a capacitor 634c for holding the voltage between a first electrode and a second electrode of the liquid crystal element 635LC, another circuit element such as a transistor, a diode, a resistor, a capacitor, or an inductor.

In the pixel 631p in FIG. 7B, one transistor 634t is used as a switching element for controlling the input of the S signal 633_S to the pixel 631p. Alternatively, a plurality of transistors functioning as one switching element may be used for the pixel 631p. The plurality of transistors functioning as one switching element may be connected to each other in parallel, in series, or in combination of parallel connection and series connection.

Note that the capacitance in the pixel circuit 634 may be adjusted as appropriate. For example, the capacitor 634c is provided in the case where the S signal 633_S is held for a relatively long period (specifically, 1/60 sec or longer) in the second mode. The capacitance in the pixel circuit 634 may be adjusted using a component other than the capacitor 634c. For example, the first electrode and the second electrode of the liquid crystal element 635LC may overlap with each other to substantially form a capacitor.

An oxide semiconductor can also be used as a first electrode or a second electrode of a capacitor. For the method for using an oxide semiconductor as an electrode of a capacitor, refer to another embodiment.

The configuration of the pixel circuit 634 can be selected in accordance with the kind or driving method of the display element 635.

<4-2a. Display Element>

The liquid crystal element 635LC includes the first electrode, the second electrode, and a liquid crystal layer containing a liquid crystal material to which the voltage between the first electrode and the second electrode is applied. In the liquid crystal element 635LC, the alignment of liquid crystal molecules is changed in accordance with the voltage applied between the first electrode and the second electrode, so that the transmittance is changed. Thus, the transmittance of the display element 635 is controlled by the potential of the S signal 633_S, whereby gradation can be expressed.

<4-2b. Transistor>

The transistor 634t controls whether the potential of the signal line S is supplied to the first electrode of the display element 635. A predetermined reference potential Vcom is supplied to the second electrode of the display element 635.

Note that a transistor including an oxide semiconductor can be suitably used as the transistor in the liquid crystal display device of one embodiment of the present invention. Embodiments 7 to 9 or Embodiment 11 can be referred to for details of the transistor including an oxide semiconductor.

<5. Light Supply Portion>

In the case where a liquid crystal element is used as the display element 635, the display portion 630 is provided with a light supply portion 650. A plurality of light sources is provided in the light supply portion 650. The control portion 610 controls the operation of the light sources included in the light supply portion 650.

In a reflective liquid crystal display device, the light supply portion 650 is not necessarily provided because, as a light source, sunlight can be used outdoors and an interior lighting can be used indoors, for example. However, considering the use in night or in a dark environment without a light source or with only a light source having low brightness, the light supply portion 650 may be provided to supply light to the pixel portion 631 including the liquid crystal element; thus, a displayed image can be seen even in a dark environment.

The light source of the light supply portion 650 can be a cold cathode fluorescent lamp, a light-emitting diode (LED), an OLED element generating luminescence (electroluminescence) when an electric field is applied thereto, or the like. Light from the light source of the light supply portion 650 can be colored by any of the following systems: a three-color system in which red light, green light, and blue light are used, a color conversion system or a quantum dot system in which part of blue light is converted into red light or green light, a color filter system in which part of white light is converted into red light, green light, and blue light through color filters, and the like.

<6. Input Unit>

As the input unit 500, a touch panel, a touch pad, a finger joystick, a trackball, a data glove, an imaging device, or the like can be used. In the arithmetic device 620, an electric signal output from the input unit 500 can be associated with coordinates of the display portion. Thus, the user can input an instruction for processing information to be displayed on the display portion.

Examples of information that the user inputs with the input unit 500 include a drag instruction for changing the display position of an image on the display portion, a swipe instruction for transferring a displayed image to display a next image, a scroll instruction for sequentially transferring a series of images, a selection instruction of a specific image, a pinch instruction for changing the size of a displayed image, and an input instruction of handwritten characters.

A plurality of display modes, for example, two modes (a first mode and a second mode) are switched in the following manner: when the image-switching signal 500_C is input from the input unit 500 through the control portion 610 to the G driver circuit 632 operating in the second mode, the G driver circuit 632 is switched from the second mode to the first mode, outputs the G signal at least once, and is then switched to the second mode.

<7. Operation Example>

For example, when the input unit 500 senses a page turning operation, the input unit 500 outputs the image-switching signal 500_C to the arithmetic device 620.

The arithmetic device 620 generates the primary image signal 625_V including a page turning operation signal and outputs the primary image signal 625_V together with the primary control signal 625_C including the image-switching signal 500_C.

The control portion 610 outputs the secondary control signal 615_C to the G driver circuit 632 and outputs the secondary image signal 615_V including the page turning operation signal to the S driver circuit 633.

The G driver circuit 632 has a first mode in which the G signal 632_G is output to a pixel at a frequency of 30 or more times per second, preferably a frequency of 60 or more times and less than 960 times per second and a second mode in which the G signal 632_G is output at a frequency of one or more times per day and less than 0.1 times per second, preferably a frequency of one or more times per hour and less than once per second.

Note that the G driver circuit 632 is switched between the first mode and the second mode in accordance with the input mode-switching signal.

The G driver circuit 632 is switched from the second mode to the first mode, and outputs the G signal 632_G at a rate at which a viewer cannot perceive an image change by signal rewriting operation.

Meanwhile, the S driver circuit 633 outputs, to the pixel circuits 634, the S signal 633_S generated from the secondary image signal 615_V including the page turning operation signal.

In this manner, the secondary image signal 615_V including the page turning operation signal is supplied to the pixel 631*p*. Accordingly, many frame images including the page turning operation can be displayed in a short time, so that smooth page turning operation can be displayed.

The arithmetic device 620 may be configured to determine whether the primary image signal 625_V output from the arithmetic device 620 to the display portion 630 is an moving image signal or a still image signal, and output a switching signal for selecting the first mode when the primary image signal 625_V is a moving image signal and output a switching signal for selecting the second mode when the primary image signal 625_V is a still image signal.

Whether the primary image signal 625_V is a moving image signal or a still image signal can be determined in accordance with a difference between a frame signal and the previous or next frame signal in the primary image signal 625_V. The primary image signal 625_V may be determined to be a moving image signal when the difference is larger than a predetermined value and determined to be a still image signal when the difference is less than or equal to the predetermined value.

Furthermore, the following configuration may be employed: when switching from the second mode to the first mode, the G driver circuit 632 outputs the G signal 632_G predetermined times (at least once) and is then switched to the second mode.

The configuration described in Embodiment 3 can reduce eye strain in use.

In this embodiment, one embodiment of the present invention has been described. Other embodiments of the present invention will be described in other embodiments. Note that one embodiment of the present invention is not limited thereto. That is, since various embodiments of the invention are disclosed in this embodiment and the other embodiments, one embodiment of the present invention is not limited to a specific embodiment. Although an example in which a channel formation region, a source region, a drain region, or the like of a transistor includes an oxide semiconductor has been described as one embodiment of the present invention, one embodiment of the present invention is not limited thereto. Depending on circumstances or conditions, various transistors or a channel formation region, a source region, a drain region, or the like of a transistor of one embodiment of the present invention may include various semiconductors. Depending on circumstances or conditions, various transistors or a channel formation region, a source region, a drain region, or the like of a transistor of one embodiment of the present invention may include, for example, at least one of silicon, germanium, silicon germanium, silicon carbide, gallium arsenide, aluminum gallium arsenide, indium phosphide, gallium nitride, and an organic semiconductor. Alternatively, for example, depending on circumstances or conditions, various transistors or a channel formation region, a source region, a drain region, or the like of a transistor of one embodiment of the present invention does not necessarily include an oxide semiconductor.

Note that this embodiment can be combined as appropriate with any of the other embodiments in this specification.

Embodiment 3

<Partial Driving>

In this embodiment, an example of a method for driving a liquid crystal display device will be described with reference to FIGS. 7A and 7B and FIG. 8.

FIGS. 7A and 7B are the top view and the circuit diagram, respectively, which illustrate the configuration of the display portion of the liquid crystal display device having a display function of one embodiment of the present invention. FIG. 8 is a top view illustrating a modification example of the configuration of the display portion of the liquid crystal display device having a display function of one embodiment of the present invention.

<1. Method for Writing S Signal to Pixel Portion>

An example of a method for writing the S signals 633_S to the pixel portion 631 in FIG. 7A or FIG. 8 will be described. Specifically, a method for writing the S signal 633_S to each pixel 631*p* having the pixel circuit in FIG. 7B in the pixel portion 631 will be described.

<Signal Writing to Pixel Portion>

In a first frame period, the G signal 632_G is input to the scan line G1 to select the scan line G1. In each of a plurality of pixels 631*p* connected to the selected scan line G1, the transistor 634*t* is turned on.

When the transistors 634*t* are on (in one line period), the potentials of the S signals 633_S generated from the secondary image signal 615_V are supplied to the signal lines S1 to S*x*. Through each of the transistors 634*t* that are on, charge corresponding to the potential of the S signal 633_S is accumulated in the capacitor 634*c* and the potential of the S signal 633_S is supplied to the first electrode of the liquid crystal element 635LC.

While the scan line G1 is selected in the first frame period, the S signals 633_S having a positive polarity are sequentially input to all the signal lines S1 to S*x*. The S signals 633_S having a positive polarity are supplied to first electrodes G1S1 to G1S*x* in the pixels 631*p* connected to the scan line G1 and the respective signal lines S1 to S*x*. Accordingly, the transmittance of the liquid crystal element 635LC is controlled by the potential of the S signal 633_S; thus, gradation is expressed by the pixels.

In a similar manner, the scan lines G2 to Gy are sequentially selected, and the pixels 631p connected to the scan lines G2 to Gy are sequentially subjected to operation similar to that performed while the scan line G1 is selected. Through the above operation, an image of the first frame can be displayed on the pixel portion 631.

In one embodiment of the present invention, the scan lines G1 to Gy are not necessarily selected sequentially.

It is possible to employ dot sequential driving in which the S signals 633_S are sequentially input from the S driver circuit 633 to the signal lines S1 to Sx or line sequential driving in which the S signals 633_S are input all at once. Alternatively, a driving method in which the S signals 633_S are sequentially input to every plural signal lines S may be employed.

The method for selecting the scan lines G is not limited to progressive scan; interlace scan may also be employed for selecting the scan lines G.

In one given frame period, the polarities of the S signals 633_S input to all the signal lines may be the same, or the polarities of the S signals 633_S to be input to the pixels may be inverted every other signal line.

<Signal Writing to Pixel Portion Divided into Plurality of Regions>

Figure 8:
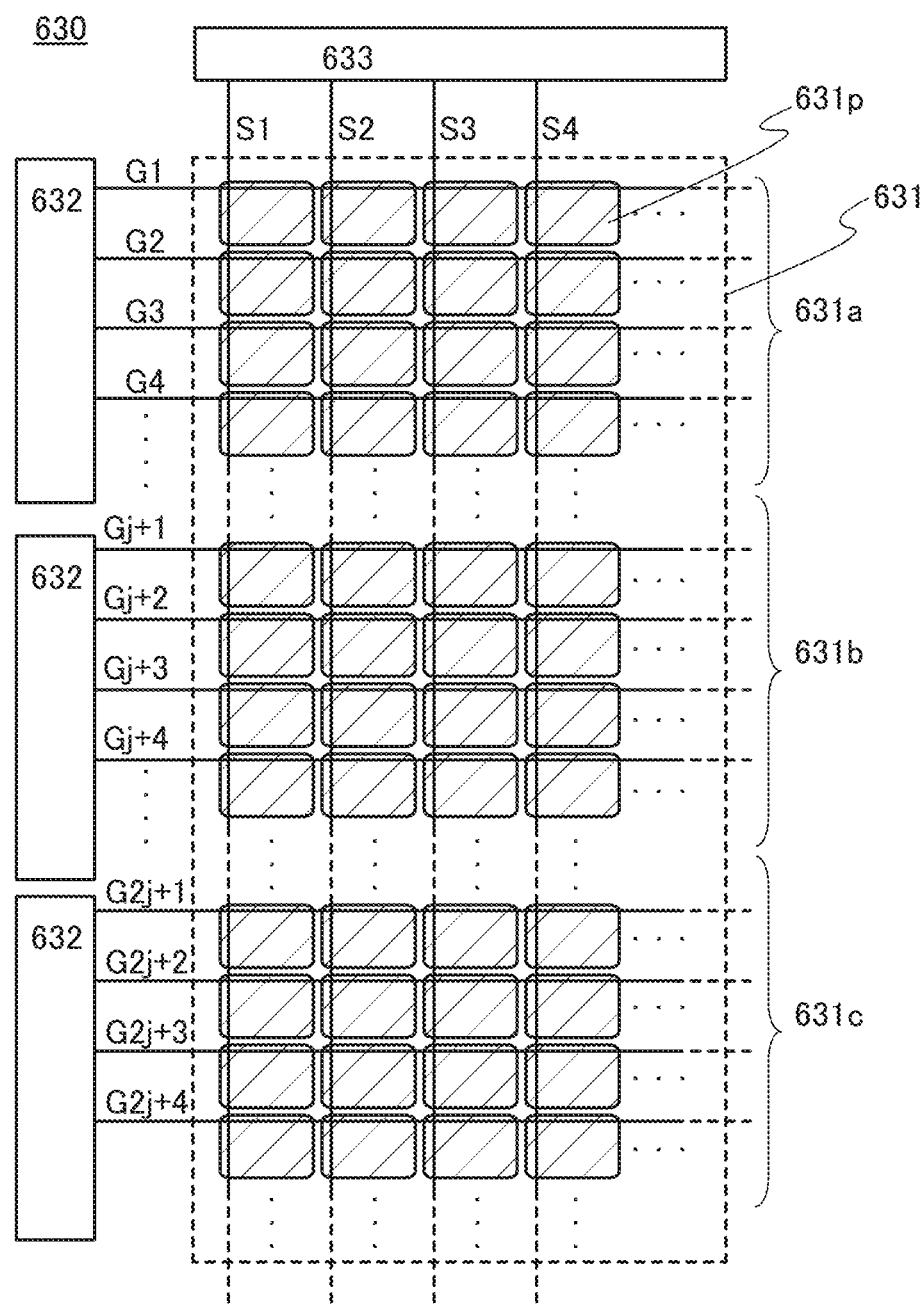
FIG. 8 illustrates the configuration of a display portion of a liquid crystal display device having a display function.

FIG. 8 illustrates a modification example of the configuration of the display portion 630.

In the display portion 630 in FIG. 8, the plurality of pixels 631p, the plurality of scan lines G for selecting the pixels 631p row by row, and the plurality of signal lines S for supplying the S signals 633_S to the selected pixels 631p are provided in the pixel portion 631 divided into a plurality of regions (specifically, a first region 631a, a second region 631b, and a third region 631c).

The input of the G signals 632_G to the scan lines G in each region is controlled by the corresponding G driver circuit 632. The input of the S signals 633_S to the signal lines S is controlled by the S driver circuit 633. Each of the plurality of pixels 631p is connected to at least one of the scan lines G and at least one of the signal lines S.

Such a configuration allows the pixel portion 631 to be divided into regions which are driven separately.

For example, the following operation is possible: when information is input from a touch panel used as the input unit 500, coordinates specifying a region to which the information is to be input are obtained, and the G driver circuit 632 driving the region corresponding to the coordinates operates in the first mode and the G driver circuits 632 driving the other region operate in the second mode. Thus, it is possible to stop the operation of the G driver circuit for a region to which no information is input from the touch panel, that is, a region where rewriting of a displayed image is not necessary.

<2. G Driver Circuit in First Mode and Second Mode>

The S signal 633_S is input to the pixel circuit 634 to which the G signal 632_G output from the G driver circuit 632 is input. During a period during which the G signal 632_G is not input, the pixel circuit 634 holds the potential of the S signal 633_S. In other words, the pixel circuit 634 maintains the state in which the potential of the S signal 633_S is written.

The pixel circuit 634 to which display data is written maintains a display state corresponding to the S signal 633_S. Note that to maintain a display state is to keep the amount of change in display state within a given range. This given range is set as appropriate and is preferably set such that the user can perceive displayed images as the same image.

The G driver circuit 632 has the first mode and the second mode.

<2-1. First Mode>

The G driver circuit 632 in the first mode outputs the G signals 632_G to the pixels at a frequency of 30 or more times per second, preferably 60 or more times and less than 960 times per second.

The G driver circuit 632 in the first mode rewrites signals at a speed at which the user cannot perceive the image change which occurs every signal rewriting. As a result, a smooth moving image can be displayed.

<2-2. Second Mode>

The G driver circuit 632 in the second mode outputs the G signals 632_G to the pixels at a frequency of one or more times per day and less than 0.1 times per second, preferably one or more times per hour and less than once per second.

During a period during which the G signal 632_G is not input, the pixel circuit 634 continues to hold the S signal 633_S and maintains the display state corresponding to the potential of the S signal 633_S.

Thus, in the second mode, images without flickers due to rewriting in the pixels can be displayed.

As a result, eye fatigue of the user of the liquid crystal display device having a display function can be reduced.

The power consumed by the G driver circuit 632 is reduced in a period during which the G driver circuit 632 does not operate.

Note that the pixel circuit driven by the G driver circuit 632 in the second mode is preferably configured to hold the S signal 633_S for a long period. For example, the off-state leakage current of the transistor 634t is preferably as low as possible.

Another embodiment can be referred to for examples of the structure of the transistor 634t with low off-state leakage current.

Note that this embodiment can be combined as appropriate with any of the other embodiments in this specification.

Embodiment 4

<Inversion Driving>

In this embodiment, an example of a method for driving the liquid crystal display device described in Embodiments 2 and 3 will be described with reference to FIG. 9, FIGS. 10A-1, 10A-2, 10B-1, 10B-2, and 10C, and FIG. 11.

Figure 9:
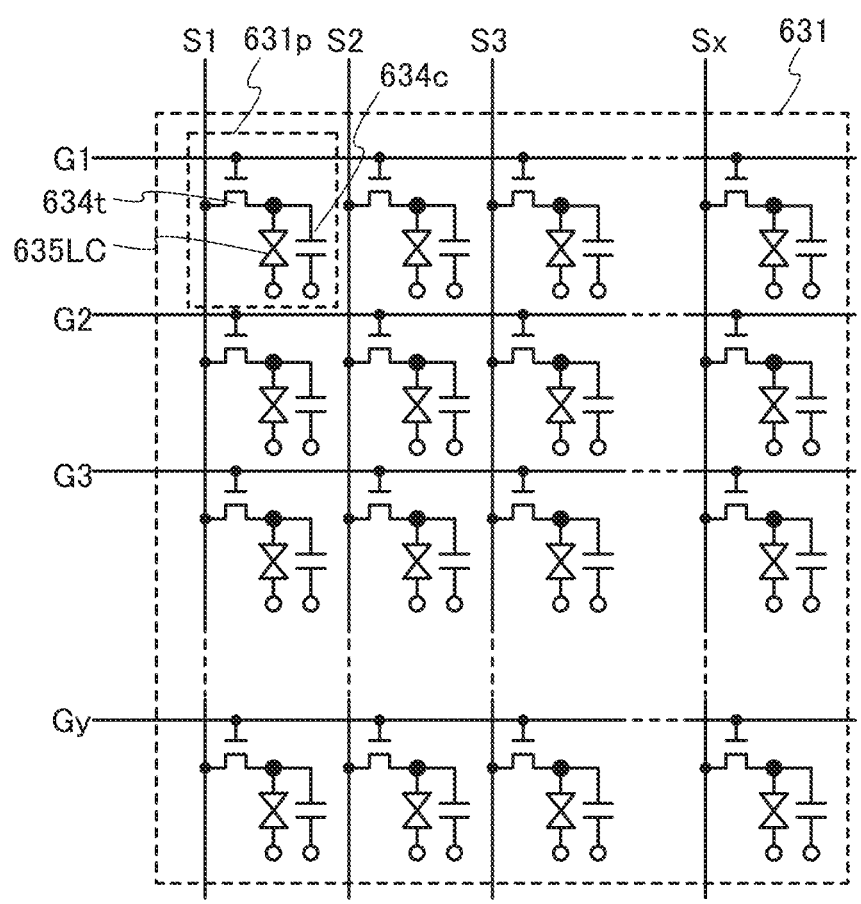
FIG. 9 is a circuit diagram illustrating a liquid crystal display device having a display function.

FIG. 9 is a circuit diagram illustrating the liquid crystal display device having a display function of one embodiment of the present invention.

Figures 1, 10A:
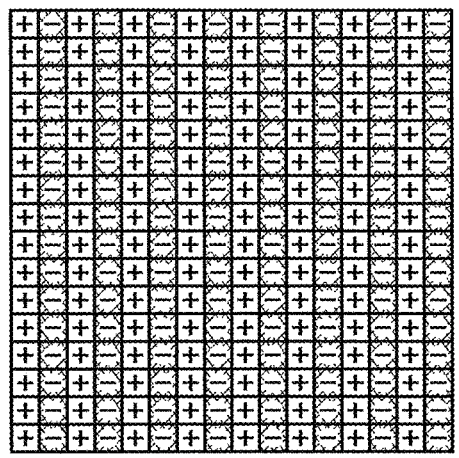
Figures 2, 10A:
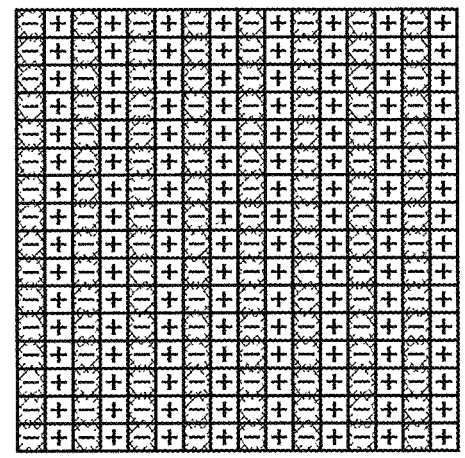
Figures 1, 10B:
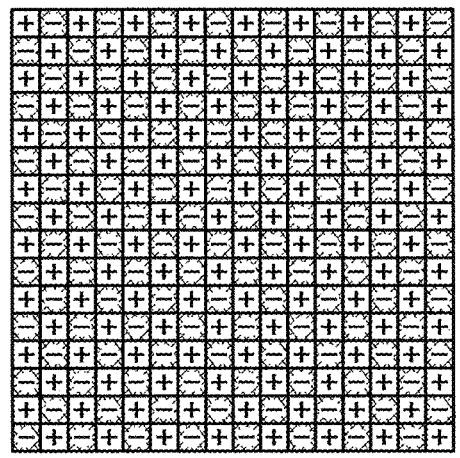
Figures 2, 10B:
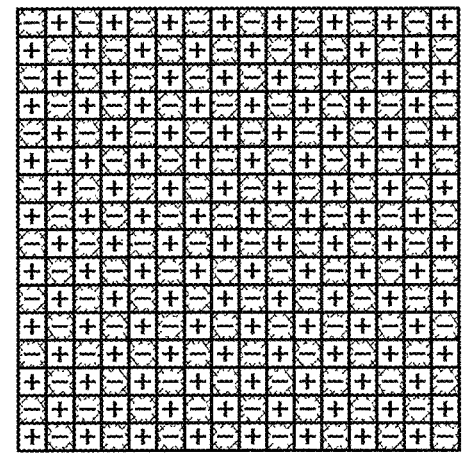

FIGS. 10A-1, 10A-2, 10B-1, 10B-2, and 10C illustrate source line inversion driving and dot inversion driving of the liquid crystal display device having a display function of one embodiment of the present invention. FIG. 11 is a timing chart illustrating the source line inversion driving and the dot inversion driving of the liquid crystal display device having a display function of one embodiment of the present invention.

<1. Overdriving>

The response time of liquid crystal from voltage application to saturation of the change in transmittance is generally about ten milliseconds. Thus, the slow response of the liquid crystal tends to be perceived as a blur of a moving image.

The liquid crystal display device having a display function of one embodiment of the present invention may employ overdriving in which voltage applied to the liquid crystal element 635LC is temporarily increased to change the alignment of the liquid crystal quickly. The overdriving can increase the response speed of the liquid crystal, prevent a blur of a moving image, and improve the quality of a moving image.

If the transmittance of the liquid crystal element 635LC continues to change without being saturated after the transistor 634t is turned off, the relative permittivity of the liquid crystal also changes; accordingly, the voltage held by the liquid crystal element 635LC easily changes.

For example, in the case where the capacitor 634c is not connected in parallel to the liquid crystal element 635LC or in the case where the capacitor 634c connected to the liquid crystal element 635LC has small capacitance, the change in the voltage held by the liquid crystal element 635LC tends to occur markedly. However, since the overdriving can shorten the response time, the change in the transmittance of the liquid crystal element 635LC after the transistor 634t is turned off can be reduced. Accordingly, even in the case where the capacitor 634c connected in parallel to the liquid crystal element 635LC has small capacitance, the voltage held by the liquid crystal element 635LC can be prevented from changing after the transistor 634t is turned off.

<2. Source Line Inversion Driving and Dot Inversion Driving>

Figure 10C:
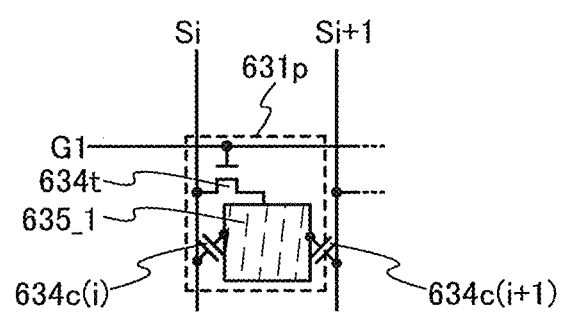
Figure 11:
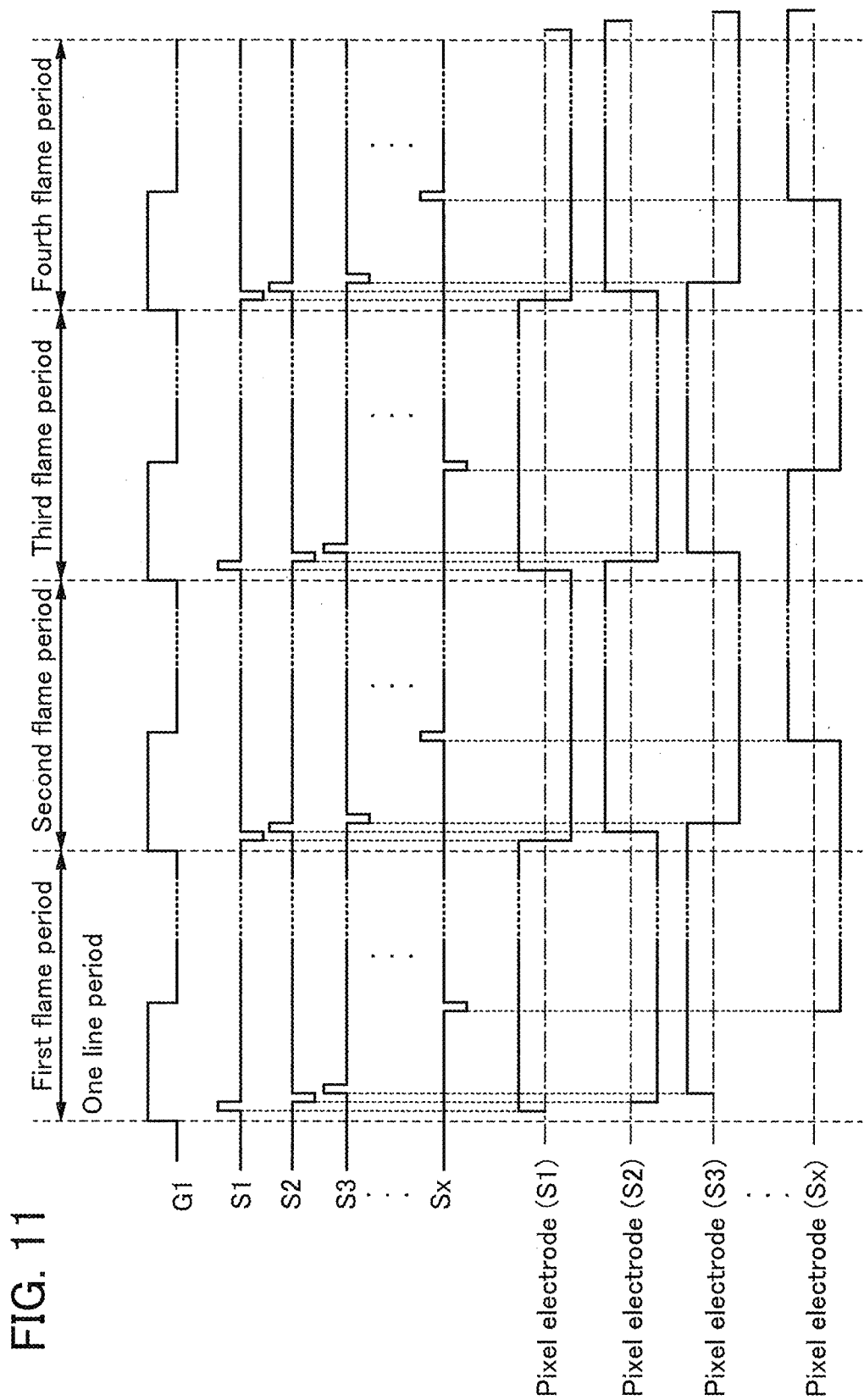
FIG. 11 is a timing chart illustrating source line inversion driving and dot inversion driving of a liquid crystal display device having a display function.

In the pixel 631p connected to the signal line Si of the pixel circuit in FIG. 10C, the pixel electrode 635_1 is positioned between the signal line Si and the signal line Si+1 adjacent to the signal line Si. It is ideal that the pixel electrode 635_1 and the signal line Si are electrically separated from each other while the transistor 634t is off. Furthermore, ideally, the pixel electrode 635_1 and the signal line Si+1 are electrically separated from each other. However, there actually exist a parasitic capacitance 634c(i) between the pixel electrode 635_1 and the signal line Si and a parasitic capacitance 634c(i+1) between the pixel electrode 635_1 and the signal line Si+1 (see FIG. 10C). Note that FIG. 10C illustrates the pixel electrode 635_1 functioning as a first electrode or a second electrode of the liquid crystal element 635LC, instead of the liquid crystal element 635LC in FIG. 9.

When the first electrode and the second electrode of the liquid crystal element 635LC overlap with each other and the overlap of the two electrodes is practically utilized as a capacitor, the capacitor 634c formed using a capacitor wiring is not necessarily connected to the liquid crystal element 635LC, or the capacitance of the capacitor 634c connected to the liquid crystal element 635LC may be small. In such cases, the potential of the pixel electrode 635_1 functioning as a first electrode or a second electrode of the liquid crystal element is easily affected by the parasitic capacitance 634c(i) and the parasitic capacitance 634c(i+1).

Consequently, the following phenomenon easily occurs: even when the transistor 634t is off in the period during which the potential of an image signal is held, a change in the potential of the signal line Si or the signal line Si+1 causes a fluctuation in the potential of the pixel electrode 635_1.

The above phenomenon is referred to as crosstalk; namely, in the period during which the potential of an image signal is held, a change in the potential of a signal line causes a fluctuation in the potential of a pixel electrode. Crosstalk causes a decrease in display contrast. For example, in the case where normally-white liquid crystal is used for the liquid crystal element 635LC, a whitish image is displayed.

In view of the above description, the liquid crystal display device having a display function of one embodiment of the present invention may employ a driving method in which, in one given frame period, image signals having opposite polarities are input to the signal line Si and the signal line Si+1 arranged with the pixel electrode 635_1 positioned therebetween.

Note that the image signals having opposite polarities mean, on the assumption that the potential of a common electrode of the liquid crystal element is a reference potential, an image signal having a potential higher than the reference potential and an image signal having a potential lower than the reference potential.

Two methods (source line inversion and dot inversion) can be given as examples of a method for sequentially and alternately writing image signals having opposite polarities to selected pixels.

In either method, in a first frame period, an image signal having a positive (+) polarity is input to the signal line Si and an image signal having a negative (−) polarity is input to the signal line Si+1. Next, in a second frame period, an image signal having a negative (−) polarity is input to the signal line Si and an image signal having a positive (+) polarity is input to the signal line Si+1. Then, in a third frame period, an image signal having a positive (+) polarity is input to the signal line Si and an image signal having a negative (−) polarity is input to the signal line Si+1 (see FIG. 10C).

Such a driving method, in which the potentials of a pair of signal lines fluctuate in opposite polarity, can cancel the fluctuation in the potential of a pixel electrode. Accordingly, the crosstalk can be suppressed.

<2-1. Source Line Inversion Driving>

In the source line inversion, in one given frame period, an image signal having a polarity is input to a plurality of pixels connected to a signal line and an image signal having an opposite polarity is input to a plurality of pixels connected to another signal line adjacent to the signal line.

FIGS. 10A-1 and 10A-2 schematically illustrate the polarities of image signals supplied to pixels driven by the source line inversion. In FIGS. 10A-1 and 10A-2, "+" indicates a pixel supplied with an image signal having a positive polarity and "−" indicates a pixel supplied with an image signal having a negative polarity in one given frame period. The frame in FIG. 10A-2 follows the frame in FIG. 10A-1.

<2-2. Dot Inversion Driving>

In the dot inversion, in one given frame period, an image signal having a polarity is input to a plurality of pixels connected to a signal line and an image signal having an opposite polarity is input to a plurality of pixels connected to another signal line adjacent to the signal line such that the image signals supplied to the adjacent pixels connected to the same signal line have opposite polarities.

FIGS. 10B-1 and 10B-2 schematically illustrate the polarities of image signals supplied to pixels driven by the dot inversion. In FIGS. 10B-1 and 10B-2, "+" indicates a pixel supplied with an image signal having a positive polarity and "−" indicates a pixel supplied with an image signal having a negative polarity in one given frame period. The frame in FIG. 10B-2 follows the frame in FIG. 10B-1.

<2-3. Timing Chart>

FIG. 11 is a timing chart in the case where the pixel portion 631 in FIG. 9 is driven by the source line inversion. Specifically, FIG. 11 shows temporal changes of the potential of a signal supplied to the scan line G1, the potentials of image signals supplied to the signal lines S1 to Sx, and the potentials of the pixel electrodes included in pixels connected to the scan line G1.

First, the scan line G1 is selected by a signal input to the scan line G1. In each of the plurality of pixels 631p connected to the selected scan line G1, the transistor 634t is turned on. When the potentials of image signals are supplied to the signal lines S1 to Sx while the transistors 634t are on, the potentials of the image signals are supplied to the pixel electrodes of the liquid crystal elements 635LC via the transistors 634t which are on.

In the example shown in the timing chart in FIG. 11, in a period during which the scan line G1 is selected in the first frame period, image signals having a positive polarity are sequentially input to the odd-numbered signal lines S1, S3, . . . and image signals having a negative polarity are sequentially input to the even-numbered signal lines S2, S4, . . . , and Sx. Therefore, the image signals having a positive polarity are supplied to pixel electrodes (S1), (S3), . . . in the pixels 631p connected to the odd-numbered signal lines S1, S3, . . . . The image signals having a negative polarity are supplied to pixel electrodes (S2), (S4), . . . , and (Sx) in the pixels 631p connected to the even-numbered signal lines S2, S4, . . . , and Sx.

In the liquid crystal element 635LC, the alignment of liquid crystal molecules is changed in accordance with the voltage applied between the pixel electrode and the common electrode, whereby transmittance is changed. Accordingly, the transmittance of the liquid crystal element 635LC can be controlled by the potential of the image signal; thus, gradation can be expressed.

When the input of the image signals to the signal lines S1 to Sx is completed, the selection of the scan line G1 is terminated. When the selection of the scan line is terminated, the transistors 634t in the pixels 631p connected to the scan line are turned off Thus, the liquid crystal element 635LC holds the voltage applied between the pixel electrode and the common electrode, thereby maintaining the display gray level. Then, the scan lines G2 to Gy are sequentially selected, and operations similar to the operation in the period during which the scan line G1 is selected are performed in the pixels connected to the above respective scan lines.

Next, the scan line G1 is selected again in the second frame period. While the scan line G1 is selected in the second frame period, image signals having a negative polarity are sequentially input to the odd-numbered signal lines S1, S3, . . . and image signals having a positive polarity are sequentially input to the even-numbered signal lines S2, S4, . . . , and Sx, which is different from the operation performed while the scan line G1 is selected in the first frame period. Therefore, the image signals having a negative polarity are supplied to the pixel electrodes (S1), (S3), . . . in the pixels 631p connected to the odd-numbered signal lines S1, S3, . . . . The image signals having a positive polarity are supplied to the pixel electrodes (S2), (S4), . . . , and (Sx) in the pixels 631p connected to the even-numbered signal lines S2, S4, . . . , and Sx.

Also in the second frame period, when the input of the image signals to the signal lines S1 to Sx is completed, the selection of the scan line G1 is terminated. Then, the scan lines G2 to Gy are sequentially selected, and operations similar to the operation in the period during which the scan line G1 is selected are performed in the pixels connected to the above respective scan lines.

Operations similar to the above operations are repeated in the third frame period and the fourth frame period.

Although the timing chart in FIG. 11 shows an example in which image signals are sequentially input to the signal lines S1 to Sx, one embodiment of the present invention is not limited to this configuration. Image signals may be input to the signal lines S1 to Sx all at once, or image signals may be sequentially input every several signal lines.

In this embodiment, scan lines are selected by progressive scan; however, the scan lines may be selected by interlace scan.

The inversion driving in which the polarity of the potential of an image signal is inverted using the potential of a common electrode as a reference can prevent degradation of liquid crystal called burn-in.

However, in the inversion driving, the change in the potential supplied to the signal line is increased when the polarity of the image signal changes; thus, a potential difference between a source electrode and a drain electrode of the transistor 634t functioning as a switching element is increased. Accordingly, deterioration of characteristics of the transistor 634t, such as a threshold voltage shift, is easily caused.

Furthermore, to maintain the voltage held by the liquid crystal element 635LC, the off-state current of the transistor 634t needs to be low even when the potential difference between the source electrode and the drain electrode is large.

Note that this embodiment can be combined as appropriate with any of the other embodiments in this specification.

Embodiment 5

In this embodiment, a method for generating an image that can be displayed on the liquid crystal display device of one embodiment of the present invention will be described with reference to FIGS. 12A and 12B. Specifically, a method for switching images in an eye-friendly way, a method for switching images with less eye fatigue of the user, and a method for switching images without eye strain to the user will be described.

The user may feel eye fatigue when displayed images are quickly switched, for example, when scenes of a moving image are switched frequently or when a still image is switched to another still image.

When displayed images are switched from one to another, it is preferable that the images be switched not instantaneously but gradually (smoothly) and naturally.

For example, when a first image is switched to a second image that is different from the first image, a fade-out image of the first image or a fade-in image of the second image is preferably inserted between the first image and the second image. It is also possible to insert an image obtained by overlapping the first image and the second image so that the second image fades in as the first image fades out (this technique is also referred to as crossfading) or to insert a moving image in which the first image gradually changes into the second image (this technique is also referred to as morphing).

Specifically, a first still image is displayed at a low refresh rate, an image for image switching is displayed at a high refresh rate, and then, a second still image is displayed at a low refresh rate.

<Fade-In, Fade-Out>

An example of a method for switching display from an image A to another image B will be described below.

Figure 12A:
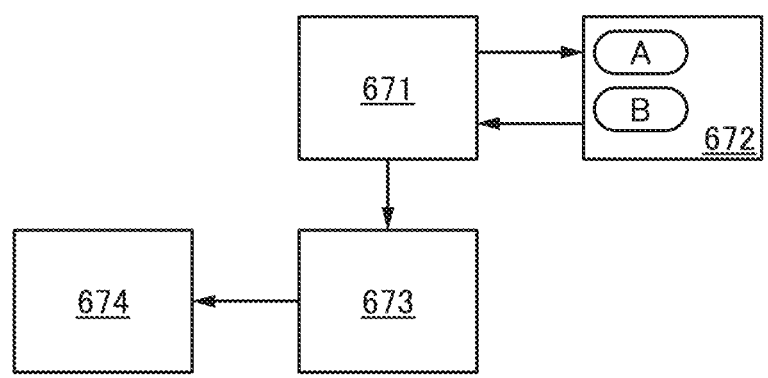
FIG. 12A illustrates the configuration of a display device, and FIG. 12B schematically illustrates image data generated by the display device.

FIG. 12A is a block diagram illustrating the configuration of a display device capable of switching images. The display device in FIG. 12A includes an arithmetic device 671, a memory device 672, a graphic unit 673, and a display unit 674.

In a first step, the arithmetic device 671 stores the memory device 672 with data of the image A and data of the image B which are output from an external memory device or the like.

In a second step, the arithmetic device 671 sequentially generates new image data based on the data of the image A and the data of the image B in accordance with a predetermined number by which the image data is to be divided.

In a third step, the generated image data is output to the graphic unit 673. The graphic unit 673 makes the display unit 674 display the input image data.

Figure 12B:
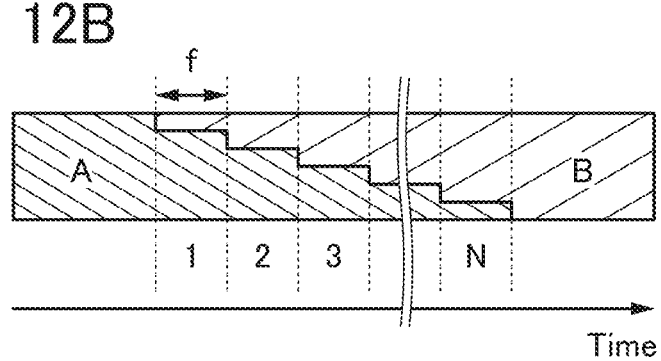

FIG. 12B schematically illustrates image data generated for gradual image change from the image A to the image B.

FIG. 12B illustrates an example in which N pieces of image data (N is a natural number) are generated between the image A and the image B and are each displayed for f frame periods (f is a natural number). Thus, it takes f×N frames to switch display from the image A to the image B.

It is preferable that the user can freely set the parameters such as N and f. The arithmetic device 671 acquires these parameters in advance and generates image data in accordance with the parameters.

As an example, i-th generated image data (i is an integer of 1 or greater and N or less) can be generated by weighting the data of the image A and the data of the image B and summing up the weighted data. For example, when the luminance (gray level) of a pixel displaying the image A is denoted by a and the luminance (gray level) of the pixel displaying the image B is denoted by b, the luminance (gray level) c of the pixel displaying the i-th generated image data is expressed by Equation (1).

[Formula 1]

$$c = \frac{(N-i)a + ib}{N} \quad (1)$$

The display is switched from the image A to the image B with the use of the image data generated by such a method, so that discontinuous images can be changed gradually (smoothly) and naturally.

Note that the case where all pixels satisfy a=0 in Equation (1) corresponds to a fade-in in which a black image is gradually changed into the image B. The case where all pixels satisfy b=0 corresponds to a fade-out in which the image A is gradually changed into a black image.

In the above method, the display is switched from an image to another image such that the two images temporarily overlap with each other; however, a method without overlapping operation may also be employed.

In the case where two images do not overlap with each other, a black image may be inserted between the image A and the image B. In this case, the above image switching method may be used when the display is switched from the image A to the black image and/or from the black image to the image B. The image inserted between the image A and the image B is not limited to the black image and may be a single color image such as a white image or a multi-color image which is different from the image A and the image B. The insertion of another image, particularly a single-color image such as a black image, between the image A and the image B enables the user to perceive image switching as being more natural without feeling stress.

Note that this embodiment can be combined as appropriate with any of the other embodiments in this specification.

Embodiment 6

In this embodiment, a semiconductor device of one embodiment of the present invention will be described with reference to FIGS. 13A and 13B, FIGS. 14A and 14B, FIGS. 15A and 15B, FIGS. 16A to 16D, FIGS. 17A to 17C, and FIGS. 18A to 18C.

Structural Example of Semiconductor Device

Figure 13A:
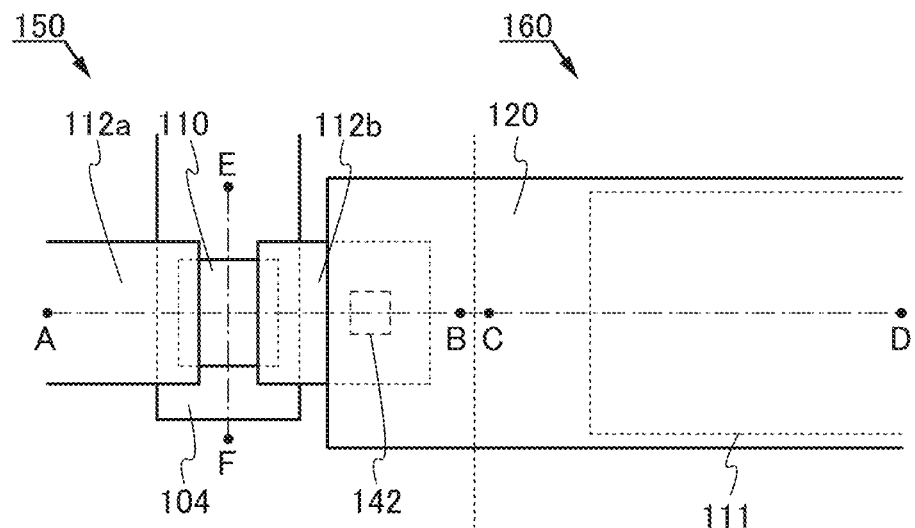
FIGS. 13A and 13B are a top view and a cross-sectional view, respectively, which illustrate one embodiment of a semiconductor device.
Figure 13B:
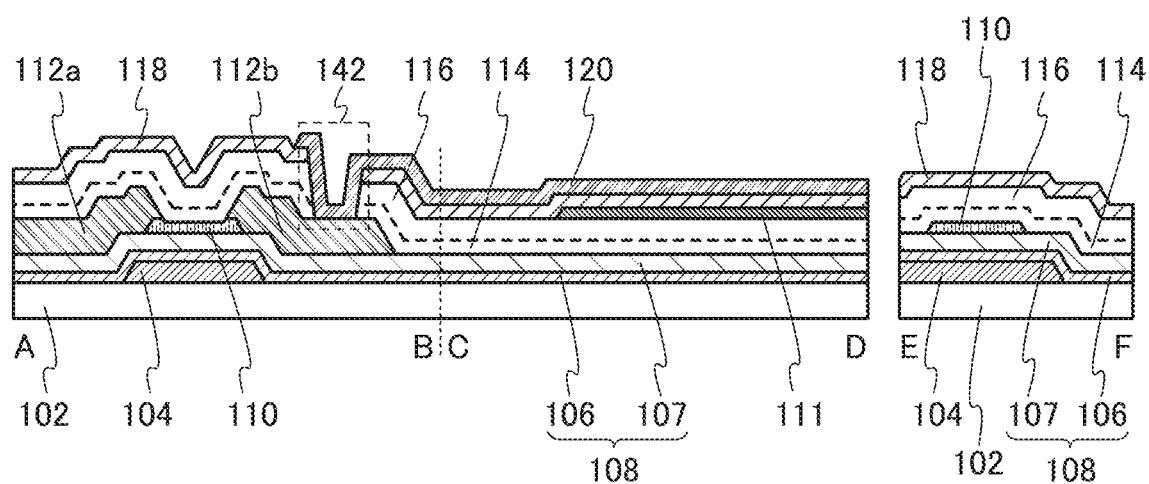

FIG. 13A shows a top view of a semiconductor device which can be used for the display device of one embodiment of the present invention, and FIG. 13B illustrates cross sections taken along dashed-dotted line A-B, dashed-dotted line C-D, and dashed-dotted line E-F in FIG. 13A. Note that FIG. 13A does not illustrate some components of the semiconductor device (e.g., a gate insulating film) to avoid complexity. As in FIG. 13A, some components are not illustrated in some cases in top views of transistors described below.

The direction of dashed-dotted line A-B in FIG. 13A corresponds to the channel length direction of a transistor 150. The direction of dashed-dotted line E-F corresponds to the channel width direction of the transistor 150. In this specification, the channel length direction of a transistor means a direction in which carriers move between a source (source region or source electrode) and a drain (drain region or drain electrode). The channel width direction means a direction perpendicular to the channel length direction in a plane parallel to a substrate.

The semiconductor device in FIGS. 13A and 13B includes the transistor 150 including a first oxide semiconductor film 110 and a capacitor 160 including an insulating film between a pair of electrodes. In the capacitor 160, one of the pair of electrodes is a second oxide semiconductor film 111, and the other of the pair of electrodes is a conductive film 120.

The transistor 150 includes a gate electrode 104 over a substrate 102, an insulating film 108 which is over the gate electrode 104 and functions as a gate insulating film, the first oxide semiconductor film 110 which is over the insulating film 108 and overlaps with the gate electrode 104, and a source electrode 112*a* and a drain electrode 112*b* over the first oxide semiconductor film 110. In other words, the transistor 150 includes the first oxide semiconductor film 110, the insulating film 108 which is provided in contact with the first oxide semiconductor film 110 and functions as a gate insulating film, the gate electrode 104 which is provided in contact with the insulating film 108 and overlaps with the first oxide semiconductor film 110, and the source electrode 112*a* and the drain electrode 112*b* which are electrically connected to the first oxide semiconductor film 110. Note that the transistor 150 in FIGS. 13A and 13B has a bottom-gate structure.

In addition, insulating films 114, 116, and 118 are formed over the transistor 150, specifically over the first oxide semiconductor film 110, the source electrode 112*a*, and the drain electrode 112*b*. The insulating films 114, 116, and 118 function as protective insulating films for the transistor 150. An opening 142 reaching the drain electrode 112*b* is formed in the insulating films 114, 116, and 118. The conductive film 120 is formed over the insulating film 118 to cover the opening 142. The conductive film 120 functions as a pixel electrode, for example.

The capacitor 160 includes the second oxide semiconductor film 111 which is over the insulating film 116 and functions as one electrode of a pair of electrodes, the insulating film 118 which is over the second oxide semiconductor film 111 and functions as a dielectric film, and the conductive film 120 which overlaps with the second oxide semiconductor film 111 with the insulating film 118 positioned therebetween and functions as the other electrode of the pair of electrodes. In other words, the conductive film 120 functions as a pixel electrode and an electrode of the capacitor.

Note that the first oxide semiconductor film 110 functions as a channel region of the transistor 150. The second oxide semiconductor film 111 functions as one electrode of the pair of electrodes of the capacitor 160. Thus, the second oxide semiconductor film 111 has lower resistivity than the first oxide semiconductor film 110. In addition, the first oxide semiconductor film 110 and the second oxide semiconductor film 111 preferably contain the same metal element. When the first oxide semiconductor film 110 and the second oxide semiconductor film 111 contain the same metal element, a common manufacturing apparatus (e.g., a deposition apparatus or a processing apparatus) can be used, and accordingly, the manufacturing cost can be suppressed.

Furthermore, the second oxide semiconductor film 111 may be connected to a wiring or the like which is separately formed using a metal film or the like. For example, in the case where the structure in FIG. 1 is applied to a transistor and a capacitor in a pixel portion of a display device, a lead wiring, a gate wiring, or the like may be formed using a metal film and connected to the second oxide semiconductor film 111. Since the lead wiring, the gate wiring, or the like is formed using a metal film, the wiring resistance can be reduced, and accordingly, signal delay or the like can be suppressed.

Figure 14A:
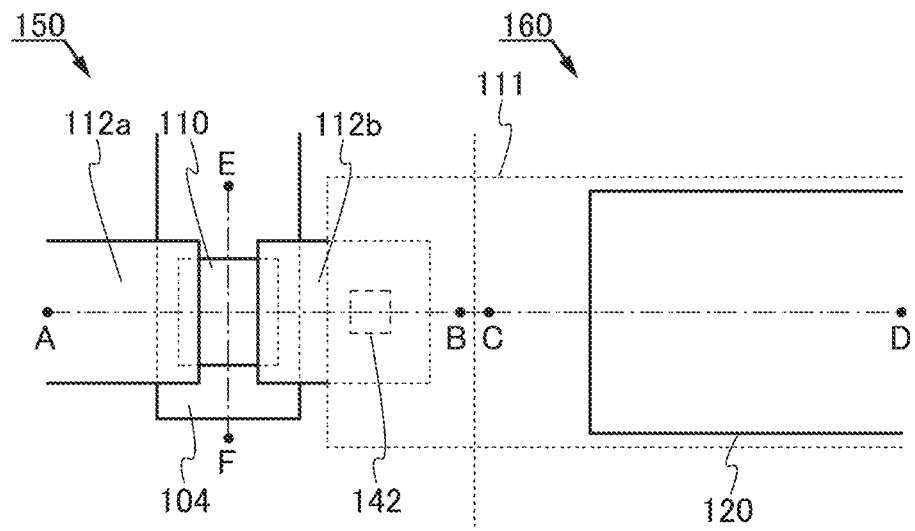
FIGS. 14A and 14B are a top view and a cross-sectional view, respectively, which illustrate one embodiment of a semiconductor device.
Figure 14B:
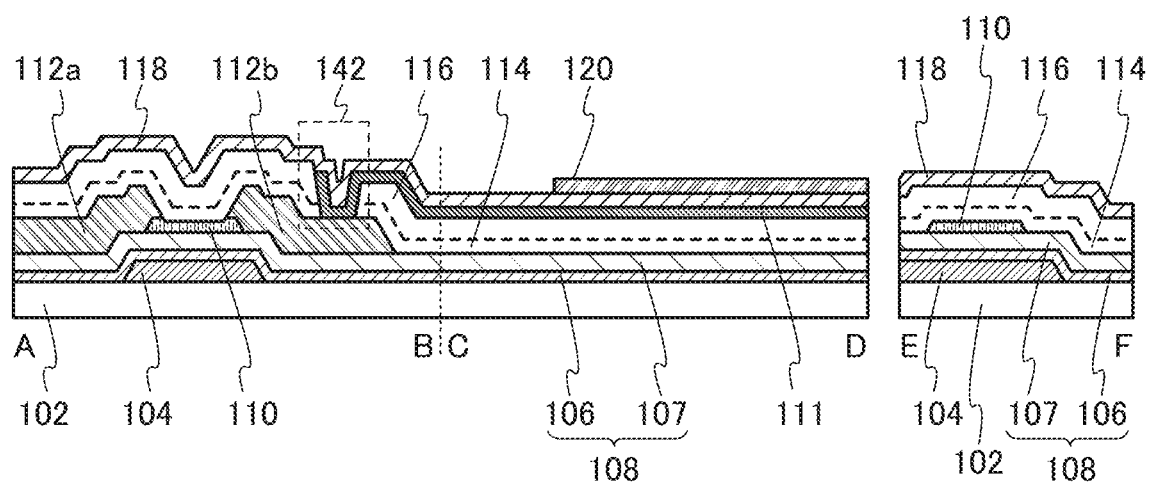

Furthermore, the second oxide semiconductor film 111 may be connected to a pattern of a terminal or the like which is separately formed using a metal film or the like. For example, in the case where the structure in FIG. 1 is applied to a transistor and a capacitor in a pixel portion of a display device, the second oxide semiconductor film 111 may be connected to a metal film of a terminal or the like. As an example, FIGS. 14A and 14B illustrate a structure in which the second oxide semiconductor film 111 is connected to the drain electrode 112b of the transistor 150.

In addition, the capacitor 160 may transmit light. In this case, the second oxide semiconductor film 111, the conductive film 120, and the insulating film 118 which are included in the capacitor 160 are each formed of a light-transmitting material. Since the capacitor 160 transmits light, the capacitor 160 can be formed large (in a large area) in the pixel except a region in which the transistor is formed; thus, the display device can have a large capacitance as well as a high aperture ratio. Accordingly, the display device can have excellent display quality.

As the insulating film 118 which is provided over the transistor 150 and used for the capacitor 160, an insulating film containing at least hydrogen is used. As an insulating film 107 used for the transistor 150 and the insulating films 114 and 116 provided over the transistor 150, insulating films containing at least oxygen are used. Such insulating films are used as the insulating films used for the transistor 150 and the capacitor 160 and the insulating films over the transistor 150 and the capacitor 160, so that the resistivity of the first oxide semiconductor film 110 included in the transistor 150 and the resistivity of the second oxide semiconductor film 111 included in the capacitor 160 can be controlled.

When the insulating films used for the capacitor 160 and the insulating films over the transistor 150 and the capacitor 160 are provided as follows, the planarity of the conductive film 120 can be increased. Specifically, the insulating films 114 and 116 are provided over the first oxide semiconductor film 110, and the insulating film 118 is provided over the second oxide semiconductor film 111 such that the second oxide semiconductor film 111 is positioned between the insulating film 116 and the insulating film 118; thus, the resistivity of the second oxide semiconductor film 111 can be controlled without providing an opening in the insulating films 114 and 116 overlapping with the second oxide semiconductor film 111. In the case where such a structure of the semiconductor device in FIGS. 13A and 13B is applied to a transistor and a capacitor in a pixel portion of a liquid crystal display device, the alignment of liquid crystal over the conductive film 120 can be improved.

Figure 15A:
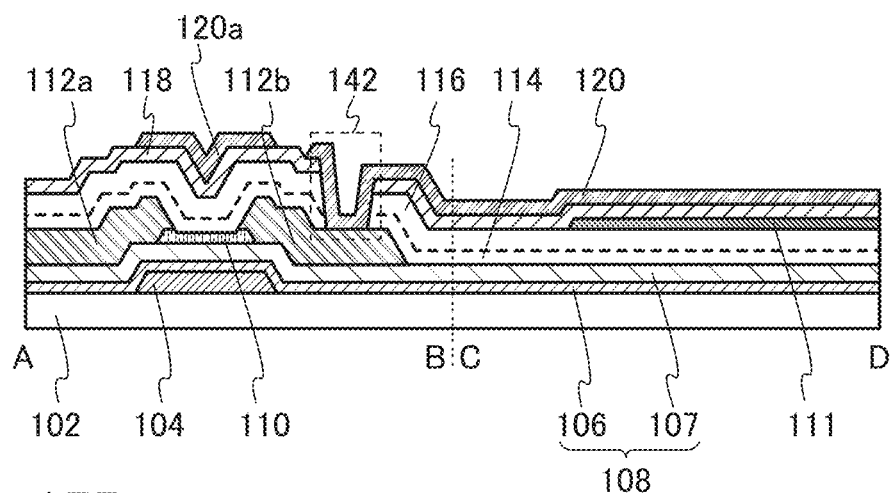
FIGS. 15A and 15B are cross-sectional views each illustrating one embodiment of a semiconductor device.

Note that a conductive film 120a which is deposited, etched, and completed simultaneously with the conductive film 120 may be provided to overlap with the channel region of the transistor. FIG. 15A illustrates an example of this case. For example, the conductive film 120a contains the same material as the conductive film 120 because the conductive film 120a is deposited, etched, and completed simultaneously with the conductive film 120. Thus, the number of processing steps is not increased. Note that one embodiment of the present invention is not limited thereto. The conductive film 120 and the conductive film 120a may be formed in different steps. The conductive film 120a includes a region overlapping with the channel region of the transistor. Thus, the conductive film 120a functions as a second gate electrode of the transistor. Therefore, the conductive film 120a may be connected to the gate electrode 104. Instead of being connected to the gate electrode 104, the conductive film 120a may be supplied with a signal or a potential different from that supplied to the gate electrode 104. Such a structure can further improve the current driving capability of the transistor 150. In that case, the insulating films 114, 116, and 118 serve as gate insulating films for the second gate electrode.

Figure 15B:
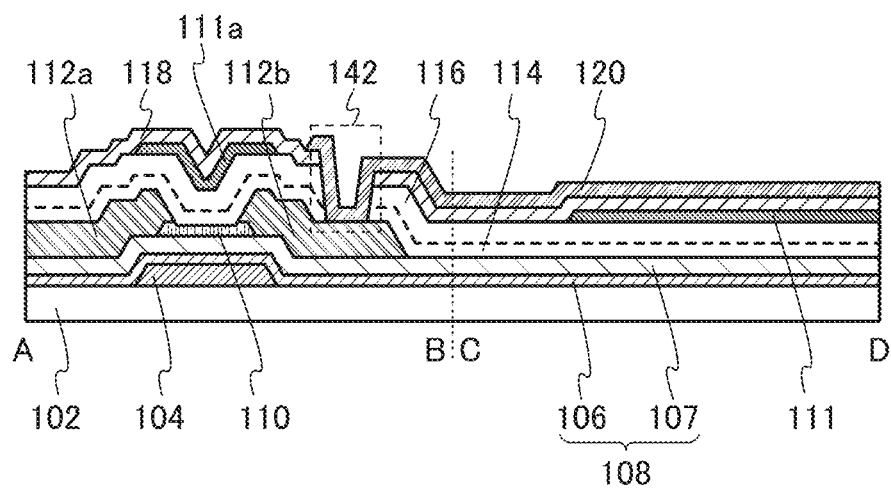

Note that a second oxide semiconductor film 111a which is deposited, etched, and completed simultaneously with the second oxide semiconductor film 111 may be provided to overlap with the channel region of the transistor. FIG. 15B illustrates an example of this case. For example, the second oxide semiconductor film 111a contains the same material as the second oxide semiconductor film 111 because the second oxide semiconductor film 111a is deposited, etched, and completed simultaneously with the second oxide semiconductor film 111. Thus, the number of processing steps is not increased. Note that one embodiment of the present invention is not limited thereto. The second oxide semiconductor film 111 and the second oxide semiconductor film 111a may be formed in different steps. The second oxide semiconductor film 111a includes a region overlapping with the first oxide semiconductor film 110 which serves as the channel region of the transistor 150. Thus, the second oxide semiconductor film 111a functions as a second gate electrode of the transistor 150. Therefore, the second oxide semiconductor film 111a may be connected to the gate electrode 104. Instead of being connected to the gate electrode 104, the second oxide semiconductor film 111a may be supplied with a signal or a potential different from that supplied to the gate electrode 104. Such a structure in which the insulating films 114 and 116 serve as gate insulating films for the second gate electrode can further improve the current driving capability of the transistor 150 as compared with the structure of the transistor in FIG. 15A.

Note that the first oxide semiconductor film 110, which is used as a channel region of the transistor 150, has higher resistivity than the second oxide semiconductor film 111. In contrast, the second oxide semiconductor film 111, which functions as an electrode, has low resistivity as compared with the first oxide semiconductor film 110.

A method for controlling the resistivity of the first oxide semiconductor film 110 and the resistivity of the second oxide semiconductor film 111 will be described below.

<Method for Controlling Resistivity of Oxide Semiconductor>

Oxide semiconductor films that can be used as the first oxide semiconductor film 110 and the second oxide semiconductor film 111 include a semiconductor material whose resistivity can be controlled by the number of oxygen vacancies in the films and/or the concentration of impurities such as hydrogen or water in the films. Thus, to control the resistivity of the first oxide semiconductor film 110 and the resistivity of the second oxide semiconductor film 111, treatment to be performed on each of the oxide semiconductor films is selected from treatment for increasing oxygen vacancies and/or impurity concentration and treatment for reducing oxygen vacancies and/or impurity concentration.

Specifically, plasma treatment is performed on the oxide semiconductor film that is used as the second oxide semiconductor film 111 functioning as an electrode of the capacitor 160 to increase oxygen vacancies and/or impurities such as hydrogen or water in the oxide semiconductor film; thus, the oxide semiconductor film can have high carrier density and low resistivity. Alternatively, an insulating film containing hydrogen is formed, for example, as the insulating film 118 in contact with the oxide semiconductor film so that hydrogen may diffuse from the insulating film containing hydrogen into the oxide semiconductor film; thus, the oxide semiconductor film can have high carrier density and low resistivity. As described above, the second oxide semiconductor film 111 functions as a semiconductor before the step of increasing oxygen vacancies or diffusing hydrogen into the film, whereas it functions as a conductor after the step.

In contrast, the first oxide semiconductor film 110 functioning as a channel region of the transistor 150 is not in contact with the insulating films 106 and 118 containing hydrogen because the insulating films 107, 114, and 116 are provided. With the use of an insulating film containing oxygen, that is, an insulating film capable of releasing oxygen, as at least one of the insulating films 107, 114, and 116, oxygen can be supplied to the first oxide semiconductor film 110. The first oxide semiconductor film 110 to which oxygen is supplied has high resistivity because oxygen vacancies in the film or at the interface are filled. As the insulating film capable of releasing oxygen, a silicon oxide film or a silicon oxynitride film can be used, for example.

To obtain an oxide semiconductor film with low resistivity, hydrogen, boron, phosphorus, or nitrogen may be introduced into the oxide semiconductor film by an ion implantation method, an ion doping method, a plasma immersion ion implantation method, or the like.

In order to reduce the resistivity of the oxide semiconductor film, plasma treatment may be performed on the oxide semiconductor film. A typical example of the plasma treatment is plasma treatment using a gas containing at least one of a rare gas (He, Ne, Ar, Kr, or Xe), hydrogen, and nitrogen. Specifically, plasma treatment in an argon atmosphere, plasma treatment in a mixed gas atmosphere of argon and hydrogen, plasma treatment in an ammonia atmosphere, plasma treatment in a mixed gas atmosphere of argon and ammonia, plasma treatment in a nitrogen atmosphere, or the like can be employed.

In the oxide semiconductor film subjected to the plasma treatment, an oxygen vacancy is formed in a lattice from which oxygen is released (or in a portion from which oxygen is released). This oxygen vacancy can cause carrier generation. Furthermore, hydrogen supplied from an insulating film in the vicinity of the oxide semiconductor film, specifically, an insulating film in contact with the bottom surface or the top surface of the oxide semiconductor film might be bonded to the oxygen vacancy, so that an electron serving as a carrier might be generated.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8\times10^{11}/cm^3$, preferably lower than $1\times10^{11}/cm^3$, further preferably lower than $1\times10^{10}/cm^3$. A highly purified intrinsic or substantially highly purified intrinsic oxide semiconductor film has few carrier generation sources and thus can have low carrier density. The highly purified intrinsic or substantially highly purified intrinsic oxide semiconductor film has low density of defect states and accordingly can have low density of trap states.

Furthermore, the highly purified intrinsic or substantially highly purified intrinsic oxide semiconductor film has extremely low off-state current; even when an element has a channel width of $1\times10^6$ μm and a channel length L of 10 μm, the off-state current can be lower than or equal to the measurement limit of a semiconductor parameter analyzer, that is, lower than or equal to $1\times10^{-13}$ A, at a voltage (drain voltage) between a source electrode and a drain electrode of 1 V to 10 V. Accordingly, the transistor 150, in which a channel region is formed in the first oxide semiconductor film 110 that is a highly purified intrinsic or substantially highly purified intrinsic oxide semiconductor film, has only a small change in electrical characteristics and is highly reliable.

For example, an insulating film containing hydrogen, that is, an insulating film capable of releasing hydrogen, typically, a silicon nitride film, is used as the insulating film 118, whereby hydrogen can be supplied to the second oxide semiconductor film 111. The insulating film capable of releasing hydrogen preferably has a hydrogen concentration of $1\times10^{22}$ atoms/cm$^3$ or higher. Such an insulating film is formed in contact with the second oxide semiconductor film 111, whereby hydrogen can be effectively contained in the second oxide semiconductor film 111. Thus, the resistivity of the first oxide semiconductor film 110 and the resistivity of the second oxide semiconductor film 111 can be controlled by using different materials for insulating films in contact with the oxide semiconductor films. Note that a material of the insulating film 106 may be similar to the material of the insulating film 118. Silicon nitride used for the insulating film 106 can prevent the gate electrode 104 from being supplied with and oxidized by oxygen released from the insulating film 107.

Hydrogen contained in the oxide semiconductor film reacts with oxygen bonded to a metal atom to form water and also causes an oxygen vacancy in a lattice from which oxygen is released (or a portion from which oxygen is released). Entry of hydrogen into the oxygen vacancy may generate an electron serving as a carrier. In some cases, bonding of part of hydrogen to oxygen bonded to a metal element generates an electron serving as a carrier. Accordingly, the second oxide semiconductor film 111 provided in contact with the insulating film containing hydrogen is an oxide semiconductor film that has higher carrier density than the first oxide semiconductor film 110.

Hydrogen in the first oxide semiconductor film 110 in which the channel region of the transistor 150 is formed is preferably reduced as much as possible. Specifically, the hydrogen concentration in the first oxide semiconductor film 110, which is measured by secondary ion mass spectrometry (SIMS), is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, lower than $5\times10^{18}$ atoms/cm$^3$, preferably lower than or equal to $1\times10^{18}$ atoms/cm$^3$, further preferably lower than or equal to $5\times10^{17}$ atoms/cm$^3$, still further preferably lower than or equal to $1\times10^{16}$ atoms/cm$^3$.

The second oxide semiconductor film 111 functioning as an electrode of the capacitor 160 is an oxide semiconductor film that has a higher hydrogen concentration and/or a larger number of oxygen vacancies (i.e., lower resistivity) than the first oxide semiconductor film 110. The concentration of hydrogen contained in the second oxide semiconductor film 111 is higher than or equal to $8\times10^{19}$ atoms/cm$^3$, preferably higher than or equal to $1\times10^{20}$ atoms/cm$^3$, further preferably higher than or equal to $5\times10^{20}$ atoms/cm$^3$. The concentration of hydrogen contained in the second oxide semiconductor film 111 is twice or more, preferably 10 times or more that in the first oxide semiconductor film 110. The resistivity of the second oxide semiconductor film 111 is preferably more than or equal to $1\times10^{-8}$ times and less than $1\times10^{-1}$ times the resistivity of the first oxide semiconductor film 110. The resistivity of the second oxide semiconductor film 111 is typically higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm.

Details of other components of the semiconductor devices in FIGS. 13A and 13B and FIGS. 14A and 14B will be described below.

<Substrate>

There is no particular limitation on a material and the like of the substrate 102 as long as the material has at least heat resistance high enough to withstand heat treatment performed later. For example, a glass substrate, a ceramic substrate, a quartz substrate, or a sapphire substrate may be used as the substrate 102. Alternatively, a single crystal semiconductor substrate or a polycrystalline semiconductor substrate made of silicon or silicon carbide, a compound semiconductor substrate made of silicon germanium or the like, an SOI substrate, or the like can be used. Alternatively, any of these substrates provided with a semiconductor element may be used as the substrate 102. In the case where a glass substrate is used as the substrate 102, a large substrate having any of the following sizes may be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured. Alternatively, a flexible substrate may be used as the substrate 102, and the transistor 150, the capacitor 160, and the like may be formed directly on the flexible substrate.

Other than the above, a transistor can be formed using various substrates as the substrate 102. The type of the substrate is not limited to a certain type. As the substrate, a plastic substrate, a metal substrate, a stainless steel substrate, a substrate including stainless steel foil, a tungsten substrate, a substrate including tungsten foil, a flexible substrate, an attachment film, paper containing a fibrous material, or a base film can be used, for example. As examples of the glass substrate, a barium borosilicate glass substrate, an aluminoborosilicate glass substrate, and a soda lime glass substrate can be given. For the flexible substrate, a flexible synthetic resin such as plastic typified by polyethylene terephthalate (PET), polyethylene naphthalate (PEN), and polyether sulfone (PES) or acrylic can be used, for example. An example of the attachment film is a film formed using polypropylene, polyester, polyvinyl fluoride, polyvinyl chloride, or the like. Examples of the base film include a film formed using polyester, polyamide, or polyimide, an inorganic vapor deposition film, and paper. In particular, a transistor formed using a semiconductor substrate, a single crystal substrate, an SOI substrate, or the like can have little variation in characteristics, size, shape, or the like, high current capability, and a small size. Such a transistor can achieve lower power consumption or higher integration of a circuit.

A transistor may be formed using one substrate, and then, the transistor may be transferred to another substrate. Examples of a substrate to which a transistor is transferred include, in addition to the above substrates over which the transistor can be formed, a paper substrate, a cellophane substrate, a stone substrate, a wood substrate, a cloth substrate (including a natural fiber (silk, cotton, or hemp), a synthetic fiber (nylon, polyurethane, or polyester), a regenerated fiber (acetate, cupra, rayon, or regenerated polyester), and the like), a leather substrate, and a rubber substrate. When such a substrate is used, a transistor with excellent characteristics or a transistor with low power consumption can be formed, a device with high durability can be manufactured, high heat resistance can be provided, or a reduction in weight or thickness can be achieved.

<First Oxide Semiconductor Film and Second Oxide Semiconductor Film>

The first oxide semiconductor film 110 and the second oxide semiconductor film 111 each preferably include an In-M-Zn oxide film that contains at least indium (In), zinc (Zn), and M (metal such as Al, Ti, Ga, Y, Zr, La, Ce, Nd, Sn, or Hf). In order to reduce variation in the electrical characteristics of the transistor including the oxide semiconductor, the oxide semiconductor preferably contains a stabilizer in addition to In, Zn, and M.

Examples of the stabilizer, including metals that can be used as M, are gallium (Ga), tin (Sn), hafnium (Hf), aluminum (Al), and zirconium (Zr). As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As an oxide semiconductor included in the first oxide semiconductor film 110 and the second oxide semiconductor film 111, for example, the following oxide can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components, and there is no limitation on the ratio of In to Ga and Zn. The "In—Ga—Zn-based oxide" may contain another metal element in addition to In, Ga, and Zn.

The first oxide semiconductor film 110 and the second oxide semiconductor film 111 may contain the same metal element selected from metal elements contained in the above oxides. The use of the same metal element for the first oxide semiconductor film 110 and the second oxide semiconductor film 111 can reduce the manufacturing cost. For example, when metal oxide targets with the same metal composition are used, the manufacturing cost can be reduced, and the same etching gas or the same etchant can be used in processing the oxide semiconductor films. Even when the first oxide semiconductor film 110 and the second oxide semiconductor film 111 contain the same metal element, they have different compositions in some cases. For example, a metal element may be released from the film in the manufacturing process of the transistor and the capacitor, which results in different metal compositions.

In the case where the first oxide semiconductor film 110 contains an In-M-Zn oxide, the proportions of In and M, the sum of which is assumed to be 100 atomic %, are preferably as follows: the proportion of In is higher than 25 atomic % and the proportion of M is lower than 75 atomic %, further preferably, the proportion of In is higher than 34 atomic % and the proportion of M is lower than 66 atomic %.

The energy gap of the first oxide semiconductor film 110 is 2 eV or more, preferably 2.5 eV or more, further preferably 3 eV or more. With the use of an oxide semiconductor having such a wide energy gap, the off-state current of the transistor 150 can be reduced.

The thickness of the first oxide semiconductor film 110 is greater than or equal to 3 nm and less than or equal to 200 nm, preferably greater than or equal to 3 nm and less than or equal to 100 nm, further preferably greater than or equal to 3 nm and less than or equal to 50 nm.

In the case where the first oxide semiconductor film 110 contains an In-M-Zn oxide (M represents Al, Ga, Y, Zr, La, Ce, or Nd), the atomic ratio of metal elements in a sputtering target used for depositing the In-M-Zn oxide preferably satisfies In≥M and Zn≥M. As examples of the atomic ratio of metal elements in such a sputtering target, In:M:Zn=1:1:1, 1:1:1.2, 3:1:2, 1:3:4, and 1:3:6 can be given. Note that the atomic ratio of metal elements in the deposited first oxide semiconductor film 110 varies within a range of error of ±40% of the above atomic ratio of metal elements in the sputtering target.

An oxide semiconductor film with low carrier density is used as the first oxide semiconductor film 110. For example, an oxide semiconductor film whose carrier density is $1\times10^{17}/cm^3$ or lower, preferably $1\times10^{15}/cm^3$ or lower, further preferably $1\times10^{13}/cm^3$ or lower, still further preferably $1\times10^{11}/cm^3$ or lower is used as the first oxide semiconductor film 110.

Without being limited to the above examples, a material with an appropriate composition may be used in accordance with required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio of a metal element to oxygen, the interatomic distance, the density, and the like of the first oxide semiconductor film 110 be set as appropriate.

If silicon or carbon, which are elements belonging to Group 14, is contained in the first oxide semiconductor film 110, the number of oxygen vacancies is increased in the first oxide semiconductor film 110, and the first oxide semiconductor film 110 becomes an n-type film. To prevent this, the concentration of silicon or carbon (the concentration is measured by SIMS) in the first oxide semiconductor film 110 is set to $2\times10^{18}$ atoms/cm$^3$ or lower, preferably $2\times10^{17}$ atoms/cm$^3$ or lower.

The concentration of alkali metal or alkaline earth metal in the first oxide semiconductor film 110, which is measured by SIMS, is set to $1\times10^{18}$ atoms/cm$^3$ or lower, preferably $2\times10^{16}$ atoms/cm$^3$ or lower. Alkali metal and alkaline earth metal might generate carriers when bonded to an oxide semiconductor, in which case the off-state current of the transistor might increase. Therefore, it is preferable to reduce the concentration of alkali metal or alkaline earth metal in the first oxide semiconductor film 110.

If nitrogen is contained in the first oxide semiconductor film 110, electrons serving as carriers are generated and the carrier density increases, so that the first oxide semiconductor film 110 easily becomes an n-type film. Thus, a transistor formed using an oxide semiconductor containing nitrogen is likely to be normally on. For this reason, nitrogen in the oxide semiconductor film is preferably reduced as much as possible; the nitrogen concentration measured by SIMS is preferably, for example, $5\times10^{18}$ atoms/cm$^3$ or lower.

The first oxide semiconductor film 110 may have, for example, a non-single crystal structure. The non-single crystal structure includes a c-axis aligned crystalline oxide semiconductor (CAAC-OS) described later, a polycrystalline structure, a microcrystalline structure described later, or an amorphous structure, for example. Among the non-single crystal structures, the amorphous structure has the highest density of defect states, whereas the CAAC-OS has the lowest density of defect states.

The first oxide semiconductor film 110 may have an amorphous structure, for example. An oxide semiconductor film having an amorphous structure has disordered atomic arrangement and no crystalline component, for example. Alternatively, an amorphous oxide film has, for example, an absolutely amorphous structure and no crystal part.

Note that the first oxide semiconductor film 110 may be a mixed film including two or more of the following regions: a region having an amorphous structure, a region having a microcrystalline structure, a region having a polycrystalline structure, a CAAC-OS region, and a region having a single crystal structure. The mixed film includes, for example, two or more of the following regions in some cases: a region having an amorphous structure, a region having a microcrystalline structure, a region having a polycrystalline structure, a CAAC-OS region, and a region having a single crystal structure. Furthermore, for example, the mixed film has a stacked-layer structure of two or more of the following regions in some cases: a region having an amorphous structure, a region having a microcrystalline structure, a region having a polycrystalline structure, a CAAC-OS region, and a region having a single crystal structure.

<Insulating Film>

As each of the insulating films 106 and 107 functioning as gate insulating films of the transistor 150, an insulating film including at least one of the following films formed by a plasma-enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Instead of the stacked insulating films 106 and 107, a single-layer insulating film selected from the above films may be used.

The insulating film 106 functions as a blocking film which inhibits penetration of oxygen. For example, in the case where excess oxygen is supplied to the insulating film 107, the insulating film 114, the insulating film 116, and/or the first oxide semiconductor film 110, the insulating film 106 can inhibit penetration of oxygen.

Note that the insulating film 107 that is in contact with the first oxide semiconductor film 110 functioning as a channel region of the transistor 150 is preferably an oxide insulating film and further preferably includes a region containing oxygen in excess of that in the stoichiometric composition (oxygen-excess region). In other words, the insulating film 107 is an insulating film capable of releasing oxygen. To provide the oxygen-excess region in the insulating film 107, the insulating film 107 may be formed in an oxygen atmosphere, for example. Alternatively, the oxygen-excess region may be formed by introduction of oxygen into the deposited insulating film 107. As a method for introducing oxygen, an ion implantation method, an ion doping method, a plasma immersion ion implantation method, plasma treatment, or the like can be employed.

In the case where hafnium oxide is used for the insulating films 106 and 107, the following effect is attained. Hafnium oxide has a higher dielectric constant than silicon oxide and silicon oxynitride. Therefore, the thicknesses of the insulating films 106 and 107 can be made large as compared with the case where silicon oxide is used; as a result, leakage current due to tunnel current can be reduced. That is, it is possible to provide a transistor with low off-state current. Moreover, hafnium oxide with a crystalline structure has higher dielectric constant than hafnium oxide with an amorphous structure. Therefore, it is preferable to use hafnium oxide with a crystalline structure in order to provide a transistor with low off-state current. Examples of the crystalline structure include a monoclinic crystal structure and a cubic crystal structure. Note that one embodiment of the present invention is not limited to these examples.

In this embodiment, a silicon nitride film is formed as the insulating film 106, and a silicon oxide film is formed as the insulating film 107. A silicon nitride film has a higher dielectric constant than a silicon oxide film and needs a larger thickness for capacitance equivalent to that of the silicon oxide film. Thus, when the insulating film 108 functioning as a gate insulating film of the transistor 150 includes a silicon nitride film, the physical thickness of the insulating film can be increased. This makes it possible to suppress a decrease in the withstand voltage of the transistor 150 and rather to increase the withstand voltage, thereby inhibiting electrostatic discharge damage of the transistor 150.

<Gate Electrode, Source Electrode, and Drain Electrode>

The gate electrode 104, the source electrode 112a, and the drain electrode 112b can each have a single-layer structure or a stacked-layer structure formed using a metal such as aluminum, titanium, chromium, nickel, copper, yttrium, zirconium, molybdenum, silver, tantalum, or tungsten, or an alloy containing the metal as its main component. For example, a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over an alloy film containing copper, magnesium, and aluminum; a three-layer structure in which a titanium film or a titanium nitride film, an aluminum film or a copper film, and a titanium film or a titanium nitride film are stacked in this order; or a three-layer structure in which a molybdenum film or a molybdenum nitride film, an aluminum film or a copper film, and a molybdenum film or a molybdenum nitride film are stacked in this order can be employed. In the case where the source electrode 112a and the drain electrode 112b have a three-layer structure, it is preferable that a film of titanium, titanium nitride, molybdenum, tungsten, an alloy containing molybdenum and tungsten, an alloy containing molybdenum and zirconium, or molybdenum nitride be formed as each of the first and third layers and that a film of a low-resistance material such as copper, aluminum, gold, silver, or an alloy containing copper and manganese be formed as the second layer. Note that it is also possible to use a light-transmitting conductive material such as indium thin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. The materials that can be used for the gate electrode 104, the source electrode 112a, and the drain electrode 112b can be formed by a sputtering method, for example.

<Conductive Film>

The conductive film 120 functions as a pixel electrode. A material that transmits visible light may be used for the conductive film 120, for example. Specifically, a material containing one of indium (In), zinc (Zn), and tin (Sn) is preferably used. For the conductive film 120, for example, a light-transmitting conductive material such as indium oxide containing tungsten oxide, indium zinc oxide containing tungsten oxide, indium oxide containing titanium oxide, indium tin oxide containing titanium oxide, indium tin oxide (ITO), indium zinc oxide, or indium tin oxide to which silicon oxide is added can also be used. The conductive film 120 can be formed by a sputtering method, for example.

<Protective Insulating Film>

As each of the insulating films 114, 116, and 118 functioning as protective insulating films for the transistor 150, an insulating film including at least one of the following films formed by a PECVD method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

The insulating film 114 that is in contact with the first oxide semiconductor film 110 functioning as a channel region of the transistor 150 is preferably an oxide insulating film capable of releasing oxygen. In other words, the insulating film capable of releasing oxygen is an insulating film which includes a region containing oxygen in excess of that in the stoichiometric composition (oxygen-excess region). To provide the oxygen-excess region in the insulating film 114, the insulating film 114 may be formed in an oxygen atmosphere, for example. Alternatively, the oxygen-excess region may be formed by introduction of oxygen into the deposited insulating film 114. As a method for introducing oxygen, an ion implantation method, an ion doping method, a plasma immersion ion implantation method, plasma treatment, or the like can be employed.

The use of the insulating film capable of releasing oxygen as the insulating film 114 enables oxygen to move to the first oxide semiconductor film 110 functioning as a channel region of the transistor 150, so that the number of oxygen vacancies in the first oxide semiconductor film 110 can be reduced. For example, the number of oxygen vacancies in the first oxide semiconductor film 110 can be reduced by using an insulating film having the following feature: the number of oxygen molecules released from the insulating film at a film surface temperature higher than or equal to 100° C. and lower than or equal to 700° C. or higher than or equal to 100° C. and lower than or equal to 500° C. is greater than or equal to $1.0 \times 10^{18}$ molecules/cm$^3$ when measured by thermal desorption spectroscopy (hereinafter referred to as TDS).

In addition, the number of defects in the insulating film 114 is preferably small; typically, in ESR measurement, the spin density of a signal that appears at g=2.001 due to a dangling bond of silicon is preferably lower than or equal to $3 \times 10^{17}$ spins/cm$^3$. This is because a high density of defects in the insulating film 114 causes oxygen to be bonded to the defects and decreases the amount of oxygen that penetrates the insulating film 114. Furthermore, the number of defects at the interface between the insulating film 114 and the first oxide semiconductor film 110 is preferably small; typically, in ESR measurement, the spin density of a signal that appears at g=1.89 or more and 1.96 or less due to a defect in the first oxide semiconductor film 110 is preferably lower than or equal to $1 \times 10^{17}$ spins/cm$^3$, further preferably lower than or equal to the lower limit of detection.

Note that all oxygen having entered the insulating film 114 from the outside moves to the outside of the insulating film 114 in some cases. Alternatively, part of oxygen having entered the insulating film 114 from the outside remains in the insulating film 114 in some cases. In some cases, movement of oxygen occurs in the insulating film 114 in such a manner that oxygen enters the insulating film 114 from the outside and oxygen contained in the insulating film 114 moves to the outside of the insulating film 114. When an oxide insulating film which is permeable to oxygen is formed as the insulating film 114, oxygen released from the insulating film 116 provided over the insulating film 114 can be moved to the first oxide semiconductor film 110 through the insulating film 114.

The insulating film 114 can be formed using an oxide insulating film having a low density of states due to nitrogen oxide. Note that the density of states due to nitrogen oxide can be formed between the energy of the valence band maximum (Ev_os) and the energy of the conduction band minimum (Ec_os) of the oxide semiconductor film. A silicon oxynitride film that releases only a small amount of nitrogen oxide, an aluminum oxynitride film that releases only a small amount of nitrogen oxide, or the like can be used as the above oxide insulating film.

Note that a silicon oxynitride film that releases only a small amount of nitrogen oxide is a film that releases more ammonia than nitrogen oxide in TDS; the number of ammonia molecules released from the silicon oxynitride film is typically greater than or equal to $1 \times 10^{18}$ molecules/cm$^3$ and less than or equal to $5 \times 10^{19}$ molecules/cm$^3$. Note that the amount of released ammonia is the amount of ammonia released by heat treatment at a film surface temperature higher than or equal to 50° C. and lower than or equal to 650° C., preferably higher than or equal to 50° C. and lower than or equal to 550° C.

Nitrogen oxide (NO$_x$; x is greater than 0 and 2 or less, preferably 1 or greater and 2 or less), typically NO$_2$ or NO, forms states in the insulating film 114, for example. The state is positioned in the energy gap of the first oxide semiconductor film 110. Therefore, when nitrogen oxide diffuses into the interface between the insulating film 114 and the first oxide semiconductor film 110, an electron is trapped by the state on the insulating film 114 side in some cases. As a result, the trapped electron remains in the vicinity of the interface between the insulating film 114 and the first oxide semiconductor film 110; thus, the threshold voltage of the transistor shifts in the positive direction.

Nitrogen oxide reacts with ammonia and oxygen in heat treatment. Since nitrogen oxide contained in the insulating film 114 reacts with ammonia contained in the insulating film 116 in heat treatment, the amount of nitrogen oxide contained in the insulating film 114 is reduced. Therefore, an electron is hardly trapped at the interface between the insulating film 114 and the first oxide semiconductor film 110.

By using the above oxide insulating film as the insulating film 114, a shift of the threshold voltage of the transistor can be reduced, which leads to a reduced change in the electrical characteristics of the transistor.

In an ESR spectrum at 100 K or lower of the insulating film 114 subjected to heat treatment in a manufacturing process of the transistor, typically heat treatment at a temperature lower than 400° C. or lower than 375° C. (preferably higher than or equal to 340° C. and lower than or equal to 360° C.), a first signal that appears at a g-factor greater than or equal to 2.037 and less than or equal to 2.039, a second signal that appears at a g-factor greater than or equal to 2.001 and less than or equal to 2.003, and a third signal that appears at a g-factor greater than or equal to 1.964 and less than or equal to 1.966 are observed. The split width of the first and second signals and the split width of the second and third signals which are obtained by ESR measurement using an X-band are each approximately 5 mT. The sum of the spin densities of the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 is lower than $1 \times 10^{18}$ spins/cm$^3$, typically higher than or equal to $1 \times 10^{17}$ spins/cm$^3$ and lower than $1 \times 10^{18}$ spins/cm$^3$.

In the ESR spectrum at 100 K or lower, the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 correspond to signals attributed to nitrogen oxide (NO$_x$; x is greater than 0 and 2 or less, preferably 1 or greater and 2 or less). Typical examples of nitrogen oxide include nitrogen monoxide and nitrogen dioxide. Accordingly, the smaller the sum of the spin densities of the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 is, the lower the content of nitrogen oxide in the oxide insulating film is.

The nitrogen concentration in the above oxide insulating film measured by SIMS is lower than or equal to $6 \times 10^{20}$ atoms/cm$^3$.

The above oxide insulating film is formed by a PECVD method at a substrate temperature higher than or equal to 220° C. and lower than or equal to 350° C. with the use of silane and dinitrogen monoxide, whereby a dense and hard film can be formed.

The insulating film 116 in contact with the insulating film 114 is formed using an oxide insulating film in which the oxygen content is higher than that in the stoichiometric composition. Part of oxygen is released by heating from the oxide insulating film in which the oxygen content is higher than that in the stoichiometric composition. The oxide insulating film in which the oxygen content is higher than that in the stoichiometric composition has the following feature: the amount of oxygen released from the oxide insulating film, which is converted into oxygen atoms, is greater than or equal to $1.0 \times 10^{19}$ atoms/cm$^3$, preferably greater than or equal to $3.0 \times 10^{20}$ atoms/cm$^3$ in TDS. Note that the film surface temperature in TDS is preferably higher than or equal to 100° C. and lower than or equal to 700° C., or higher than or equal to 100° C. and lower than or equal to 500° C.

In addition, the number of defects in the insulating film 116 is preferably small; typically, in ESR measurement, the spin density of a signal that appears at g=2.001 due to a dangling bond of silicon is preferably lower than $1.5 \times 10^{18}$ spins/cm$^3$, further preferably lower than or equal to $1 \times 10^{18}$ spins/cm$^3$. Note that the insulating film 116 is positioned more apart from the first oxide semiconductor film 110 than the insulating film 114; thus, the insulating film 116 may have higher defect density than the insulating film 114.

The thickness of the insulating film 114 can be greater than or equal to 5 nm and less than or equal to 150 nm, preferably greater than or equal to 5 nm and less than or equal to 50 nm, further preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Furthermore, the insulating film 114 and the insulating film 116 can be formed using the same kinds of materials; thus, an interface between the insulating film 114 and the insulating film 116 cannot be clearly observed in some cases. Therefore, in this embodiment, the interface between the insulating film 114 and the insulating film 116 is shown by a dashed line. Although the two-layer structure including the insulating film 114 and the insulating film 116 is described in this embodiment, one embodiment of the present invention is not limited thereto. For example, a single-layer structure of the insulating film 114, a single-layer structure of the insulating film 116, or a stacked-layer structure including three or more layers may be used.

The insulating film 118 functioning as a dielectric film of the capacitor 160 is preferably a nitride insulating film. In particular, a silicon nitride film has a higher dielectric constant than a silicon oxide film and needs a larger thickness for capacitance equivalent to that of the silicon oxide film. Thus, when the insulating film 118 functioning as a dielectric film of the capacitor 160 includes a silicon nitride film, the physical thickness of the insulating film can be increased. This makes it possible to suppress a decrease in the withstand voltage of the capacitor 160 and rather to increase the withstand voltage, thereby inhibiting electrostatic discharge damage of the capacitor 160. Note that the insulating film 118 also has a function of reducing the resistivity of the second oxide semiconductor film 111 that functions as an electrode of the capacitor 160.

The insulating film 118 also has a function of blocking oxygen, hydrogen, water, alkali metal, alkaline earth metal, and the like. The insulating film 118 can prevent outward diffusion of oxygen from the first oxide semiconductor film 110, outward diffusion of oxygen contained in the insulating films 114 and 116, and entry of hydrogen, water, and the like into the first oxide semiconductor film 110 from the outside. Instead of the nitride insulating film having a blocking effect against oxygen, hydrogen, water, alkali metal, alkaline earth metal, and the like, an oxide insulating film having a blocking effect against oxygen, hydrogen, water, and the like may be provided. As examples of the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

<Method for Manufacturing Semiconductor Device>

Next, an example of a method for manufacturing the semiconductor device in FIGS. 13A and 13B will be described with reference to FIGS. 16A to 16D, FIGS. 17A to 17C, FIGS. 18A to 18C, and FIGS. 19A and 19B.

First, the gate electrode 104 is formed over the substrate 102. After that, the insulating film 108 including the insulating films 106 and 107 is formed over the substrate 102 and the gate electrode 104 (see FIG. 16A).

Note that the substrate 102, the gate electrode 104, and the insulating films 106 and 107 can each be formed using a material selected from the materials listed above. In this embodiment, a glass substrate is used as the substrate 102; a tungsten film is used as a conductive film for the gate electrode 104; a silicon nitride film capable of releasing hydrogen is used as the insulating film 106; and a silicon oxynitride film capable of releasing oxygen is used as the insulating film 107.

The gate electrode 104 can be formed in the following manner: a conductive film is deposited over the substrate 102 and patterned such that a desired region remains, and then, unnecessary regions of the conductive film are etched away.

Figure 16A:
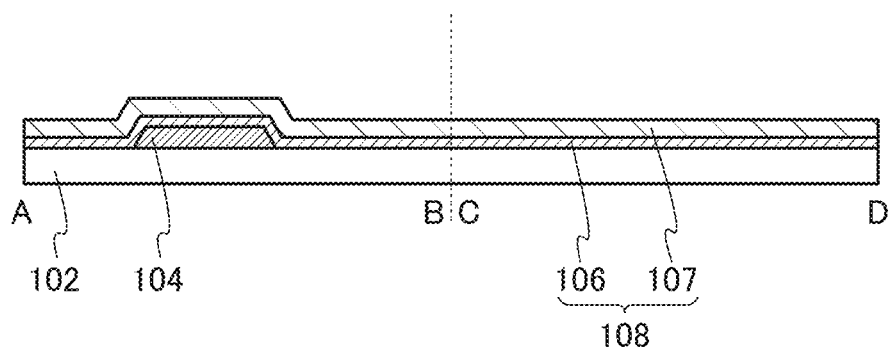
FIGS. 16A to 16D are cross-sectional views illustrating one embodiment of a method for manufacturing a semiconductor device.
Figure 16B:
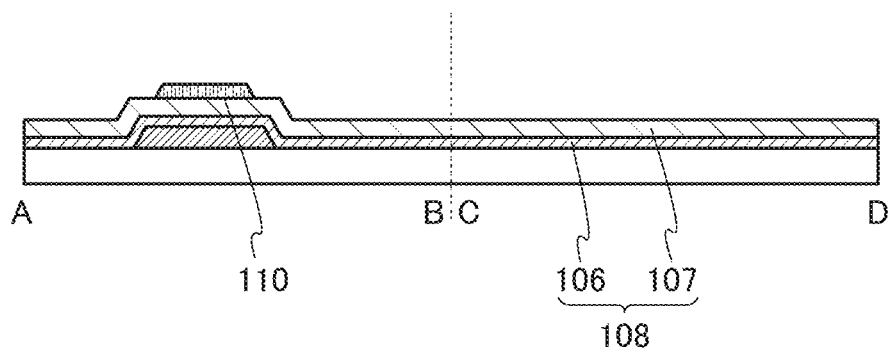

Next, the first oxide semiconductor film 110 is formed over the insulating film 108 to overlap with the gate electrode 104 (see FIG. 16B).

The first oxide semiconductor film 110 can be formed using a material selected from the materials listed above. In this embodiment, as the first oxide semiconductor film 110, an In—Ga—Zn oxide film formed using a metal oxide target of In:Ga:Zn=1:1:1.2 is used.

The first oxide semiconductor film 110 can be formed in the following manner: an oxide semiconductor film is deposited over the insulating film 108 and patterned such that a desired region remains, and then, unnecessary regions of the oxide semiconductor film are etched away.

After the formation of the first oxide semiconductor film 110, heat treatment is preferably performed. The heat treatment may be performed at a temperature higher than or equal to 250° C. and lower than or equal to 650° C., preferably higher than or equal to 300° C. and lower than or equal to 500° C., further preferably higher than or equal to 350° C. and lower than or equal to 450° C., in an inert gas atmosphere, an atmosphere containing an oxidation gas at 10 ppm or more, or a reduced-pressure atmosphere. Alternatively, heat treatment may be performed first in an inert gas atmosphere, and then, another heat treatment may be performed in an atmosphere containing an oxidation gas at 10 ppm or more in order to compensate for oxygen released from the first oxide semiconductor film 110. By this heat treatment, impurities such as hydrogen or water can be removed from at least one of the following films: the insulating films 106 and 107 and the first oxide semiconductor film 110. Note that the above heat treatment may be performed before the first oxide semiconductor film 110 is processed into an island shape.

Note that stable electrical characteristics can be effectively imparted to the transistor 150, in which the first oxide semiconductor film 110 serves as a channel region, by reducing impurities in the first oxide semiconductor film 110 to make the first oxide semiconductor film 110 intrinsic or substantially intrinsic.

Figure 16C:
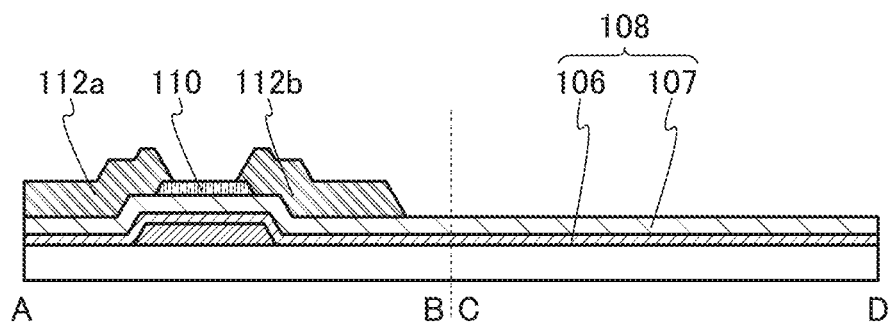
Figure 16D:
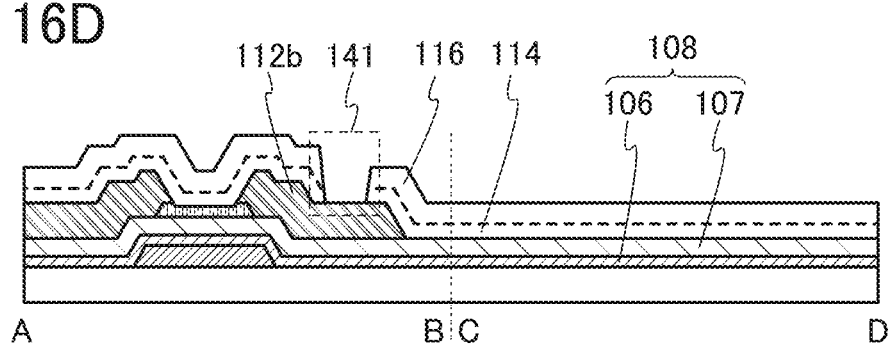

Next, a conductive film is deposited over the insulating film 108 and the first oxide semiconductor film 110 and patterned such that desired regions remain, and then, unnecessary regions of the conductive film are etched away, whereby the source electrode 112a and the drain electrode 112b are formed over the insulating film 108 and the first oxide semiconductor film 110 (see FIG. 16C).

The source electrode 112a and the drain electrode 112b can be formed using a material selected from the materials listed above. In this embodiment, the source electrode 112a and the drain electrode 112b have a three-layer structure including a tungsten film, an aluminum film, and a titanium film.

After the source electrode 112a and the drain electrode 112b are formed, a surface of the first oxide semiconductor film 110 may be cleaned. The cleaning may be performed, for example, using a chemical solution such as phosphoric acid. The cleaning using a chemical solution such as phosphoric acid can remove impurities (e.g., elements contained in the source electrode 112a and the drain electrode 112b) attached to the surface of the first oxide semiconductor film 110. Note that the cleaning is not necessarily performed and may be omitted depending on the conditions.

In the step of forming the source electrode 112a and the drain electrode 112b and/or the cleaning step, the thickness of a region of the first oxide semiconductor film 110 which is covered with neither the source electrode 112a nor the drain electrode 112b might be decreased.

Next, the insulating films 114 and 116 are formed over the insulating film 108, the first oxide semiconductor film 110, the source electrode 112a, and the drain electrode 112b. After that, the insulating films 114 and 116 are patterned such that desired regions remain, and then, unnecessary regions are etched away, whereby an opening 141 is formed (see FIG. 16D).

After the insulating film 114 is formed, the insulating film 116 is preferably formed in succession without exposure to the air. After the insulating film 114 is formed, the insulating film 116 is formed in succession without exposure to the air while at least one of the flow rate of a source gas, the pressure, the high-frequency power, and the substrate temperature is adjusted, whereby the concentration of impurities attributed to the atmospheric component at the interface between the insulating films 114 and 116 can be reduced and oxygen contained in the insulating films 114 and 116 can be moved to the first oxide semiconductor film 110; accordingly, the number of oxygen vacancies in the first oxide semiconductor film 110 can be reduced.

The insulating film 114 serves as a protective film for the first oxide semiconductor film 110 in the step of forming the insulating film 116. Consequently, the insulating film 116 can be formed using high-density, high-frequency power while damage to the first oxide semiconductor film 110 is reduced.

The insulating films 114 and 116 can each be formed using a material selected from the materials listed above. In this embodiment, a silicon oxynitride film capable of releasing oxygen is used as each of the insulating films 114 and 116.

Heat treatment (hereinafter referred to as first heat treatment) is preferably performed after the insulating films 114 and 116 are deposited. The first heat treatment can reduce nitrogen oxide contained in the insulating films 114 and 116. By the first heat treatment, part of oxygen contained in the insulating films 114 and 116 can be moved to the first oxide semiconductor film 110, so that the number of oxygen vacancies included in the first oxide semiconductor film 110 can be reduced.

The temperature of the first heat treatment is typically lower than 400° C., preferably lower than 375° C., further preferably higher than or equal to 150° C. and lower than or equal to 350° C. The first heat treatment may be performed in an atmosphere of nitrogen, oxygen, ultra-dry air (air with a water content of 20 ppm or less, preferably 1 ppm or less, further preferably 10 ppb or less), or a rare gas (e.g., argon or helium). The atmosphere of nitrogen, oxygen, ultra-dry air, or a rare gas preferably does not contain hydrogen, water, and the like. An electric furnace, a rapid thermal annealing (RTA) apparatus, or the like can be used for the heat treatment.

The opening 141 is formed to expose part of the drain electrode 112b. An example of a method for forming the opening 141 is, but not limited to, a dry etching method. Alternatively, a wet etching method or a combination of dry etching and wet etching may be employed as a method for forming the opening 141. Note that the etching step for forming the opening 141 reduces the thickness of the drain electrode 112b in some cases.

Figure 17A:
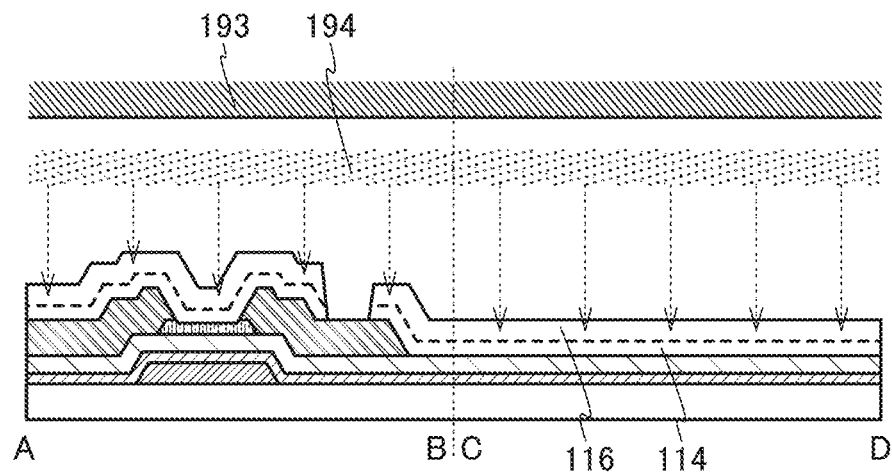
FIGS. 17A to 17C are cross-sectional views illustrating one embodiment of a method for manufacturing a semiconductor device.
Figure 17B:
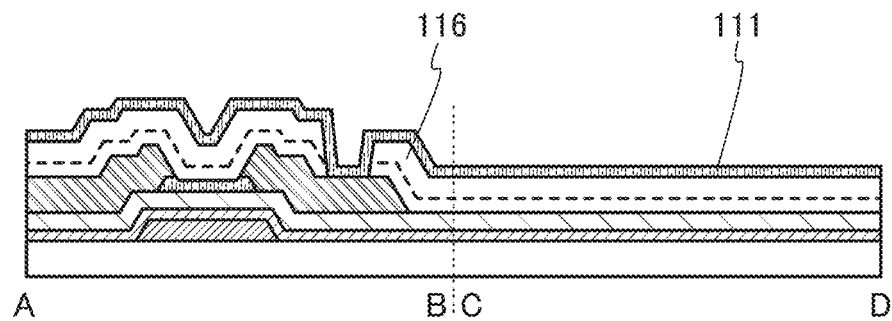

Next, an oxide semiconductor film to be the second oxide semiconductor film 111 is formed over the insulating film 116 to cover the opening 141 (see FIGS. 17A and 17B).

Note that FIG. 17A is a schematic cross-sectional view of the inside of a deposition apparatus used when the oxide semiconductor film is formed over the insulating film 116. In FIG. 17A, a sputtering apparatus is used as the deposition apparatus, and a target 193 placed inside the sputtering apparatus and plasma 194 generated under the target 193 are schematically illustrated.

When the oxide semiconductor film is formed, firstly, plasma discharge is performed in an atmosphere containing a oxygen gas. At this time, oxygen is added to the insulating film 116 over which the oxide semiconductor film is to be formed. When the oxide semiconductor film is formed, an inert gas (e.g., a helium gas, an argon gas, or a xenon gas) and the third oxygen gas may be mixed. For example, it is preferable to use an argon gas and the third oxygen gas with a flow rate higher than that of the argon gas. When the flow rate of the third oxygen gas is higher, oxygen can be favorably added to the insulating film 116. As an example of the formation conditions of the oxide semiconductor film, the proportion of the third oxygen gas in the entire deposition gas may be higher than or equal to 50% and lower than or equal to 100%, preferably higher than or equal to 80% and lower than or equal to 100%.

In FIG. 17A, oxygen or excess oxygen added to the insulating film 116 is schematically shown by dashed arrows.

The oxide semiconductor film is deposited at a substrate temperature higher than or equal to room temperature and lower than 340° C., preferably higher than or equal to room temperature and lower than or equal to 300° C., further preferably higher than or equal to 100° C. and lower than or equal to 250° C., still further preferably higher than or equal to 100° C. and lower than or equal to 200° C. The oxide semiconductor film is deposited while being heated, so that the crystallinity of the oxide semiconductor film can be increased. On the other hand, in the case where a large glass substrate (e.g., the 6th generation to the 10th generation) is used as the substrate 102 and the oxide semiconductor film is deposited at a substrate temperature higher than or equal to 150° C. and lower than 340° C., the substrate 102 might be changed in shape (distorted or warped). Even in the case where a large glass substrate is used, the change in the shape of the glass substrate can be suppressed by depositing the oxide semiconductor film at a substrate temperature higher than or equal to 100° C. and lower than 150° C.

The oxide semiconductor film can be formed using a material selected from the materials listed above. In this embodiment, the oxide semiconductor film is formed by a sputtering method using an In—Ga—Zn metal oxide target with an atomic ratio of In:Ga:Zn=1:3:6.

Figure 17C:
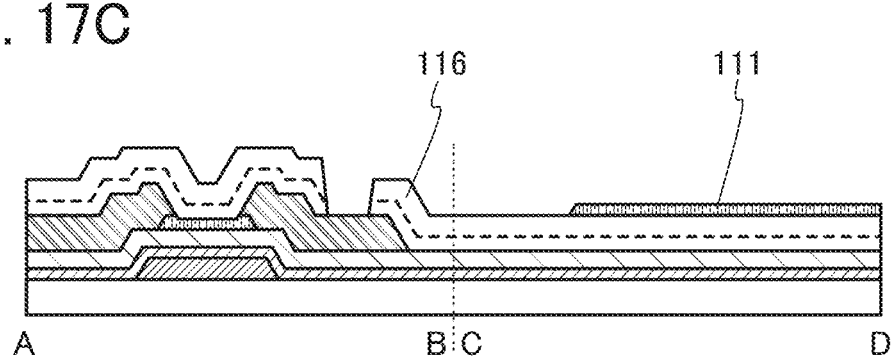

Next, the oxide semiconductor film is processed into a desired shape to form the island-shaped second oxide semiconductor film 111 (see FIG. 17C).

The second oxide semiconductor film 111 can be formed in the following manner: an oxide semiconductor film is deposited over the insulating film 116 and patterned such that a desired region remains, and then, unnecessary regions of the oxide semiconductor film are etched away.

Figure 18A:
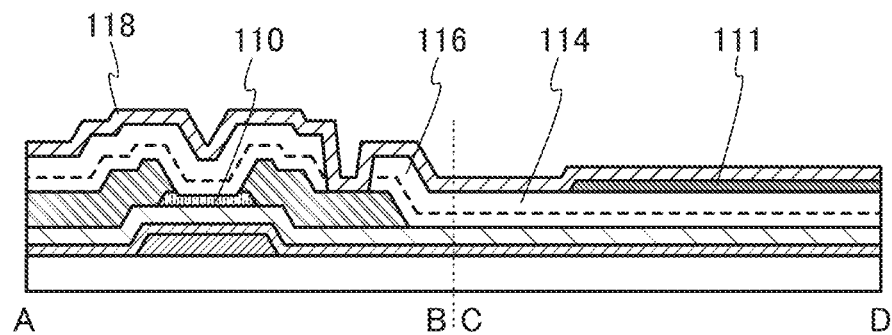
FIGS. 18A to 18C are cross-sectional views illustrating one embodiment of a method for manufacturing a semiconductor device.

Next, the insulating film 118 is formed over the insulating film 116 and the second oxide semiconductor film 111 (see FIG. 18A).

The insulating film 118 contains hydrogen and/or nitrogen. As the insulating film 118, for example, a silicon nitride film is preferably used. The insulating film 118 can be formed by a sputtering method or a PECVD method, for example. In the case where the insulating film 118 is deposited by a PECVD method, for example, the substrate temperature is lower than 400° C., preferably lower than 375° C., further preferably higher than or equal to 180° C. and lower than or equal to 350° C. The substrate temperature at which the insulating film 118 is deposited is preferably within the above range because a dense film can be formed. Furthermore, when the substrate temperature at which the insulating film 118 is deposited is within the above range, oxygen or excess oxygen in the insulating films 114 and 116 can be moved to the first oxide semiconductor film 110.

After the insulating film 118 is formed, heat treatment (hereinafter referred to as second heat treatment) similar to the first heat treatment described above may be performed. After adding oxygen to the insulating film 116 while the oxide semiconductor film to be the second oxide semiconductor film 111 is deposited, heat treatment is performed at a temperature lower than 400° C., preferably lower than 375° C., further preferably higher than or equal to 180° C. and lower than or equal to 350° C., whereby oxygen or excess oxygen in the insulating film 116 can be moved to the first oxide semiconductor film 110 and compensate for oxygen vacancies in the first oxide semiconductor film 110.

Figure 19A:
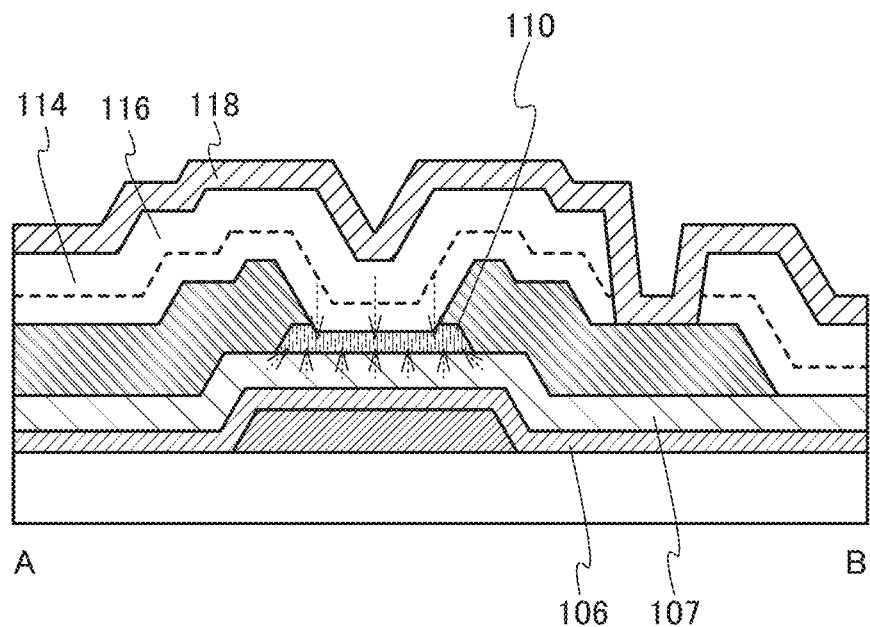
FIGS. 19A and 19B are cross-sectional views illustrating one embodiment of a method for manufacturing a semiconductor device.
Figure 19B:
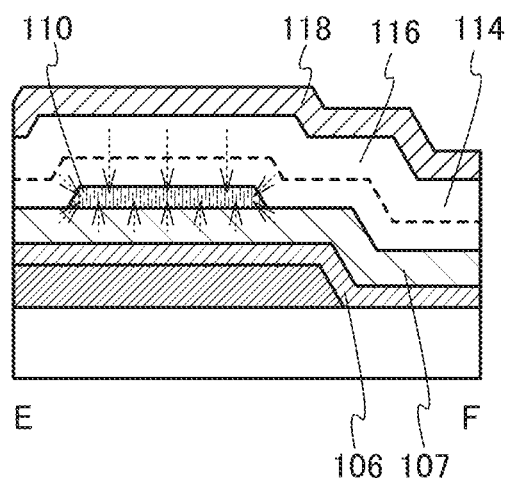

Oxygen moved to the first oxide semiconductor film 110 will be described with reference to FIGS. 19A and 19B. FIGS. 19A and 19B are model diagrams illustrating oxygen moved to the first oxide semiconductor film 110 due to the substrate temperature at the time of depositing the insulating film 118 (typically, lower than 375° C.) or the second heat treatment after the formation of the insulating film 118 (typically, lower than 375° C.). In FIGS. 19A and 19B, oxygen (oxygen radicals, oxygen atoms, or oxygen molecules) in the first oxide semiconductor film 110 are shown by dashed arrows. Note that FIGS. 19A and 19B are cross-sectional views taken along dashed-dotted line A-B and dashed-dotted line E-F in FIG. 13A, respectively, and illustrate the state in which the insulating film 118 has been deposited.

In the first oxide semiconductor film 110 in FIGS. 19A and 19B, oxygen vacancies are compensated with oxygen moved from films in contact with the first oxide semiconductor film 110 (here, the insulating film 107 and the insulating film 114). Specifically, in the semiconductor device of one embodiment of the present invention, the insulating film 107 includes an excess-oxygen region because oxygen is added to the insulating film 107 at the time of depositing the oxide semiconductor film to be the first oxide semiconductor film 110 by sputtering using an oxygen gas. The insulating film 116 also includes an excess-oxygen region because oxygen is added to the insulating film 116 at the time of depositing the oxide semiconductor film to be the second oxide semiconductor film 111 by sputtering using an oxygen gas. Accordingly, oxygen vacancies in the first oxide semiconductor film 110 between the insulating films including the excess-oxygen regions can be favorably compensated for.

Furthermore, the insulating film 106 is provided under the insulating film 107, and the insulating film 118 is provided over the insulating films 114 and 116. When the insulating films 106 and 118 are each formed using a material having low oxygen permeability, such as silicon nitride, oxygen contained in the insulating films 107, 114, and 116 can be confined to the first oxide semiconductor film 110 side; thus, oxygen can be favorably moved to the first oxide semiconductor film 110. Note that the insulating film 118 also has an effect of preventing an impurity from the outside, such as water, alkali metal, or alkaline earth metal, from diffusing into the first oxide semiconductor film 110 included in the transistor 150.

The insulating film 118 contains hydrogen and/or nitrogen. Thus, hydrogen and/or nitrogen are/is added to the second oxide semiconductor film 111 in contact with the formed insulating film 118, so that the second oxide semiconductor film 111 has higher carrier density and can function as an oxide conductive film.

Since the resistivity of the second oxide semiconductor film 111 is reduced, the hatching pattern of the second oxide semiconductor film 111 in FIG. 18A is different from that in FIG. 17C.

The resistivity of the second oxide semiconductor film 111 is lower than at least the resistivity of the first oxide semiconductor film 110 and is preferably higher than or equal to $1\times10^{-3}$ Ωcm and lower than $1\times10^{4}$ Ωcm, further preferably higher than or equal to $1\times10^{-3}$ Ωcm and lower than $1\times10^{-1}$ Ωcm.

Figure 18B:
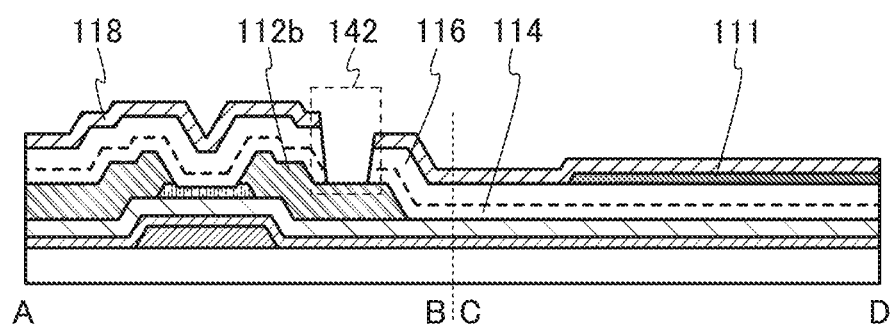

Then, the opening 142 is formed in the following manner: the insulating film 118 is patterned such that desired regions remain, and then, unnecessary regions are etched away (see FIG. 18B).

The opening 142 is formed to expose part of the drain electrode 112b. An example of a method for forming the opening 142 is, but not limited to, a dry etching method. Alternatively, a wet etching method or a combination of dry etching and wet etching may be employed as a method for forming the opening 142. Note that the etching step for forming the opening 142 reduces the thickness of the drain electrode 112b in some cases.

Note that an opening may be formed in the insulating films 114, 116, and 118 at one time in the step of forming the opening 142 without performing the step of forming the opening 141. In this case, the number of manufacturing steps of the semiconductor device of one embodiment of the present invention can be reduced, resulting in a reduction in manufacturing cost.

Figure 18C:
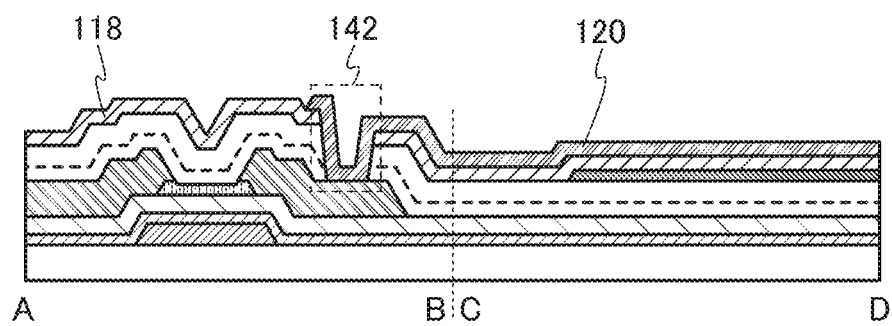

Then, a conductive film is deposited over the insulating film 118 to cover the opening 142 and is patterned and etched into a desired shape; thus, the conductive film 120 is formed (see FIG. 18C).

The conductive film 120 can be formed using a material selected from the materials listed above. In this embodiment, an indium tin oxide film is used as the conductive film 120.

The capacitor 160 is completed at the time when the conductive film 120 is formed. The capacitor 160 includes a dielectric layer between a pair of electrodes. One of the pair of electrodes corresponds to the second oxide semiconductor film 111, and the other of the pair of electrodes corresponds to the conductive film 120. In addition, the insulating film 118 functions as a dielectric layer of the capacitor 160.

Through the above steps, the transistor 150 and the capacitor 160 can be formed over one substrate.

The structures, the methods, and the like described in this embodiment can be combined as appropriate with any of the structures, the methods, and the like described in the other embodiments.

Embodiment 7

In this embodiment, a modification example of the semiconductor device of one embodiment of the present invention described in Embodiment 6 will be described with reference to FIGS. 20A and 20B, FIGS. 21A to 21D, and FIGS. 22A to 22C. Note that portions similar to or similar in function to those in FIGS. 13A and 13B, FIGS. 14A and 14B, FIGS. 15A and 15B, FIGS. 16A to 16D, FIGS. 17A to 17C, FIGS. 18A to 18C, and FIGS. 19A and 19B, which are referred to in Embodiment 6, are denoted by the same reference numerals, and description thereof is not repeated.

Structural Example (Modification Example 1) of Semiconductor Device

Figure 20A:
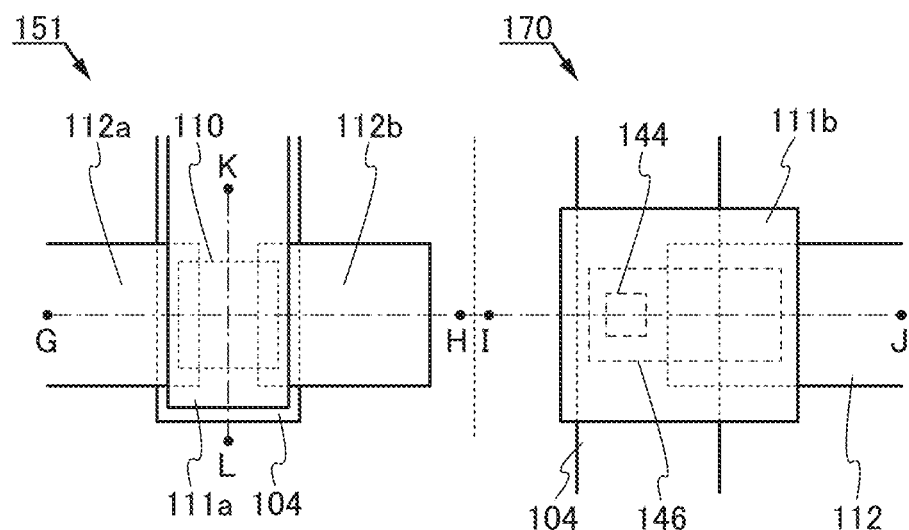
FIGS. 20A and 20B are a top view and a cross-sectional view, respectively, which illustrate one embodiment of a semiconductor device.
Figure 20B:
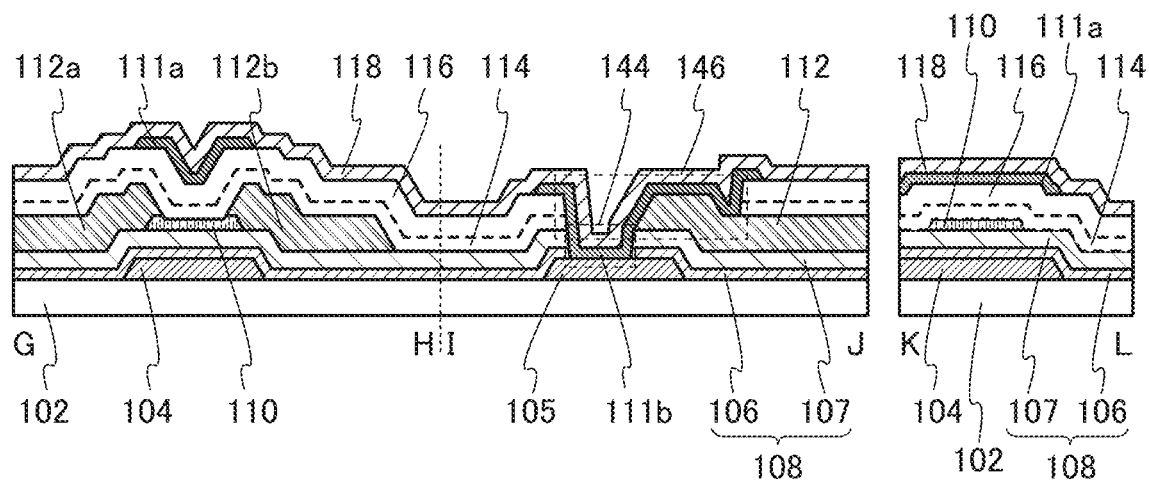

FIG. 20A shows top views of the semiconductor device of one embodiment of the present invention. FIG. 20B illustrates cross sections taken along dashed-dotted line G-H, dashed-dotted line I-J, and dashed-dotted line K-L in FIG. 20A. Note that FIG. 20A does not illustrate some components of the semiconductor device (e.g., a gate insulating film) to avoid complexity.

The semiconductor device in FIGS. 20A and 20B includes a transistor 151 including the first oxide semiconductor film 110 and the second oxide semiconductor film 111a and a gate wiring contact portion 170 including a second oxide semiconductor film 111b. Note that the gate wiring contact portion 170 refers to a region in which a gate wiring 105 is electrically connected to the wiring 112.

Note that the direction of dashed-dotted line G-H in FIG. 20A corresponds to the channel length direction of the transistor 151. The direction of dashed-dotted line K-L corresponds to the channel width direction of the transistor 151.

The transistor 151 includes the gate electrode 104 over the substrate 102, the insulating film 108 which is over the gate electrode 104 and functions as a first gate insulating film, the first oxide semiconductor film 110 which is over the insulating film 108 and overlaps with the gate electrode 104, the source electrode 112a and the drain electrode 112b over the first oxide semiconductor film 110, the insulating films 114 and 116 which are over the first oxide semiconductor film 110, the source electrode 112a, and the drain electrode 112b and function as second gate insulating films, and the second oxide semiconductor film 111a which is over the insulating film 116 and overlaps with the first oxide semiconductor film 110. The second oxide semiconductor film 111a functions as a second gate electrode of the transistor 151. In other words, the transistor 151 in FIGS. 20A and 20B has a double-gate structure.

In addition, the insulating film 118 is formed over the transistor 151, specifically, over the insulating film 116 and the second oxide semiconductor film 111a. The insulating films 114 and 116 function not only as second gate insulating films of the transistor 151 but also as protective insulating films for the transistor 151. The insulating film 118 functions as a protective insulating film for the transistor 151.

In the gate wiring contact portion 170, the second oxide semiconductor film 111b is formed over the gate wiring 105 and the wiring 112 to cover an opening 144 provided in the insulating film 108 and an opening 146 provided in the insulating films 114 and 116.

In the gate wiring contact portion 170 of the semiconductor device described in this embodiment, the gate wiring 105 is electrically connected to the wiring 112 through the second oxide semiconductor film 111b. In such a structure, the opening 144 and the opening 146 can be formed successively, and accordingly, the manufacturing process of the semiconductor device can be shortened.

If a protective film for blocking entry of oxygen is not provided over the second oxide semiconductor film 111b, the second oxide semiconductor film 111b may deteriorate under a high-temperature and high-humidity environment to have higher resistivity. In the semiconductor device described in this embodiment, the second oxide semiconductor film 111b is covered with the insulating film 118; thus, high temperature and humidity resistance of the semiconductor device can be improved without forming another protective film.

Note that an insulating film containing at least hydrogen is used as the insulating film 118. In addition, an insulating film containing at least oxygen is used as each of the insulating films 107, 114, and 116. As described above, when the insulating film used for the transistor 151 and the gate wiring contact portion 170 or the insulating film in contact with the transistor 151 and the gate wiring contact portion 170 has the above-described structure, the resistivity of the first oxide semiconductor film 110 and the resistivity of the second oxide semiconductor films 111a and 111b can be controlled.

Note that the description of Embodiment 6 can be referred to for the method for controlling the resistivity of the first oxide semiconductor film 110 and the resistivity of the second oxide semiconductor films 111a and 111b.

The major differences between the semiconductor device in FIGS. 13A and 13B described in Embodiment 6 and the semiconductor device in FIGS. 20A and 20B are that the gate wiring contact portion 170 is provided instead of the capacitor 160, that the transistor 151 includes the second oxide semiconductor film 111a functioning as a second gate electrode, and that the conductive film 120 is not provided.

<Method for Manufacturing Display Device (Modification Example 1)>

Next, an example of a method for manufacturing the semiconductor device in FIGS. 20A and 20B will be described with reference to FIGS. 21A to 21D and FIGS. 22A to 22C.

First, the gate electrode 104 and the gate wiring 105 are formed over the substrate 102. Then, the insulating film 108 including the insulating films 106 and 107 is formed over the gate electrode 104 and the gate wiring 105 (see FIG. 21A). The gate wiring 105 can be formed at the same time as the gate electrode 104 with the use of a material similar to that of the gate electrode 104.

Figure 21A:
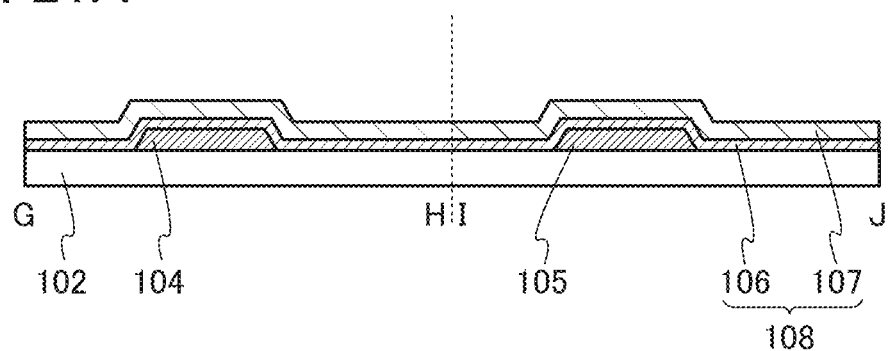
FIGS. 21A to 21D are cross-sectional views illustrating one embodiment of a method for manufacturing a semiconductor device.
Figure 21B:
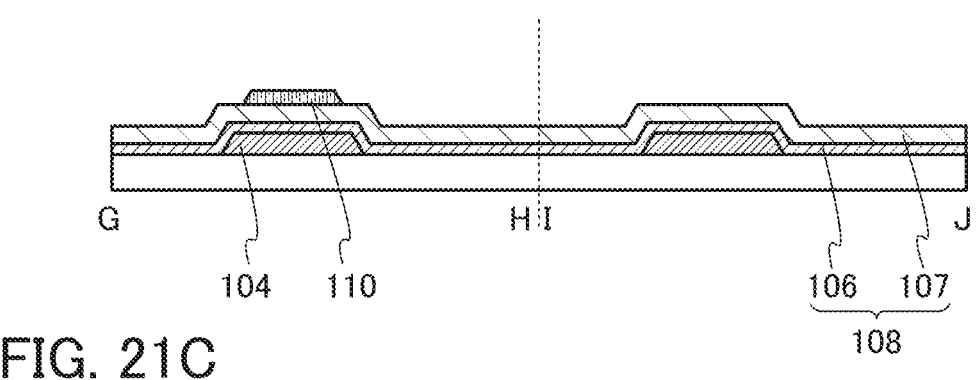

Next, the first oxide semiconductor film 110 is formed over the insulating film 108 to overlap with the gate electrode 104 (see FIG. 21B).

The first oxide semiconductor film 110 can be formed in the following manner: an oxide semiconductor film is deposited over the insulating film 108 and patterned such that a desired region remains, and then, unnecessary regions of the oxide semiconductor film are etched away.

When the first oxide semiconductor film 110 is processed by etching, part of the insulating film 107 (a region not covered with the first oxide semiconductor film 110) might be overetched and reduced in thickness.

After the formation of the first oxide semiconductor film 110, heat treatment is preferably performed. The description of the heat treatment after the formation of the first oxide semiconductor film 110 in Embodiment 6 can be referred to for the heat treatment here.

Figure 21C:
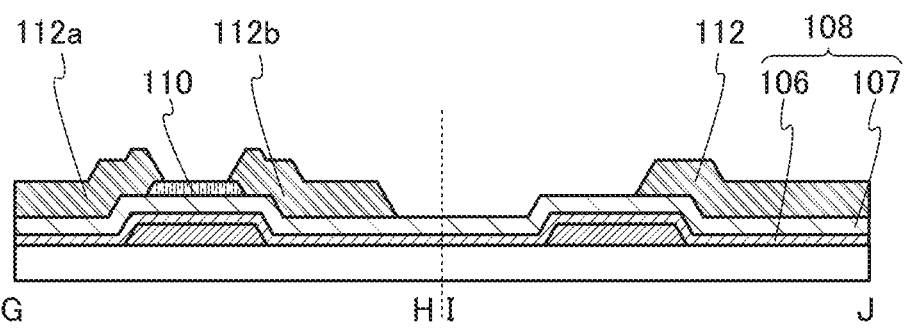

Next, a conductive film is deposited over the insulating film 108 and the first oxide semiconductor film 110 and patterned such that desired regions remain, and then, unnecessary regions of the conductive film are etched away, whereby the source electrode 112a, the drain electrode 112b, and the wiring 112 are formed (see FIG. 21C). The wiring 112 can be formed at the same time as the source electrode 112a and the drain electrode 112b with the use of a material similar to that of the source electrode 112a and the drain electrode 112b.

Figure 21D:
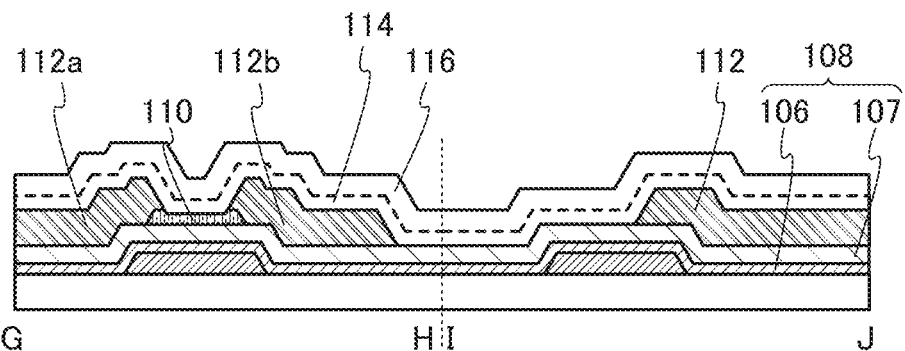

Next, the insulating films 114 and 116 are formed over the insulating film 108, the first oxide semiconductor film 110, the source electrode 112a, the drain electrode 112b, and the wiring 112 (see FIG. 21D). After the insulating films 114 and 116 are formed, the first heat treatment described in Embodiment 6 is preferably performed.

Figure 22A:
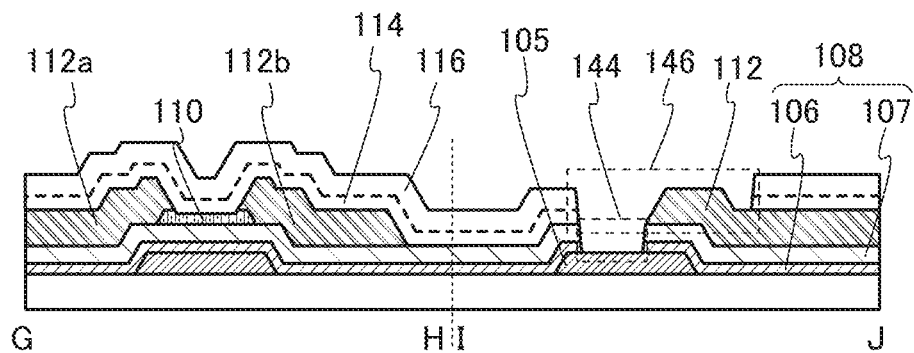
FIGS. 22A to 22C are cross-sectional views illustrating one embodiment of a method for manufacturing a semiconductor device.

Then, the opening 144 and the opening 146 are formed in the following manner: the insulating films 106, 107, 114, and 116 are patterned such that desired regions remain, and then, unnecessary regions are etched away (see FIG. 22A).

The opening 144 and the opening 146 are formed to expose part of the wiring 112 and part of the gate wiring 105. An example of a method for forming the opening 144 and the opening 146 is, but not limited to, a dry etching method. Alternatively, a wet etching method or a combination of dry etching and wet etching may be employed as a method for forming the opening 144 and the opening 146.

The opening 144 and the opening 146 can be formed at the same time by one patterning step followed by etching, which leads to a shorter manufacturing process.

Figure 22B:
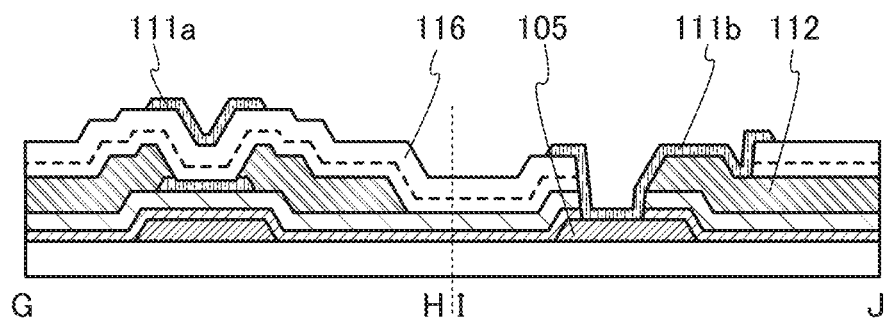

Next, the second oxide semiconductor film 111a is formed over the insulating film 116 to overlap with the first oxide semiconductor film 110, and concurrently, the second oxide semiconductor film 111b is formed over the insulating film 116 to cover the opening 144 and the opening 146 (see FIG. 22B). The method for forming the second oxide semiconductor film 111 in Embodiment 6 can be referred to for the method for forming the second oxide semiconductor film 111a and the second oxide semiconductor film 111b.

The second oxide semiconductor films 111a and 111b can be formed in the following manner: an oxide semiconductor film is deposited over the insulating film 116 and patterned such that desired regions remain, and then, unnecessary regions of the oxide semiconductor film are etched away.

When the second oxide semiconductor films 111a and 111b are processed by etching, part of the insulating film 116 (a region not covered with the second oxide semiconductor films 111a and 111b) might be overetched and reduced in thickness.

Figure 22C:
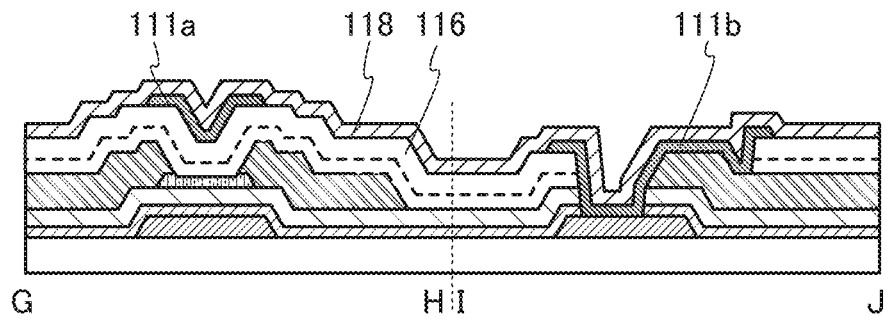

Next, the insulating film 118 is formed over the insulating film 116 and the second oxide semiconductor films 111a and 111b (see FIG. 22C). Hydrogen contained in the insulating film 118 diffuses into the second oxide semiconductor films 111a and 111b, so that the resistivity of the second oxide semiconductor films 111a and 111b is reduced. Since the resistivity of the second oxide semiconductor films 111a and 111b is reduced, the hatching pattern of the second oxide semiconductor films 111a and 111b in FIG. 22B is different from that in FIG. 22C. In addition, the second heat treatment described in Embodiment 6 may be performed after the insulating film 118 is formed.

Through the above steps, the transistor 151 and the gate wiring contact portion 170 can be formed over one substrate.

The structures, the methods, and the like described in this embodiment can be combined as appropriate with any of the structures, the methods, and the like described in the other embodiments.

Embodiment 8

In this embodiment, a modification example of the semiconductor device of one embodiment of the present invention described in Embodiment 6 will be described with reference to FIGS. 23A and 23B, FIGS. 24A to 24D, and FIGS. 25A to 25C. Note that portions similar to or similar in function to those in FIGS. 13A and 13B, FIGS. 14A and 14B, FIGS. 15A and 15B, FIGS. 16A to 16D, FIGS. 17A to 17C, FIGS. 18A to 18C, and FIGS. 19A and 19B, which are referred to in Embodiment 6, are denoted by the same reference numerals, and description thereof is not repeated.

Structural Example (Modification Example 2) of Semiconductor Device

Figure 23A:
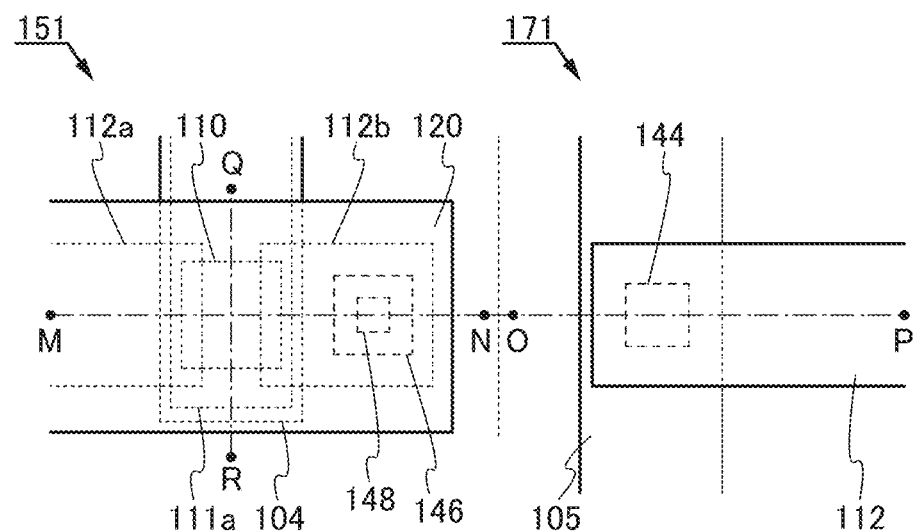
FIGS. 23A and 23B are a top view and a cross-sectional view, respectively, which illustrate one embodiment of a semiconductor device.
Figure 23B:
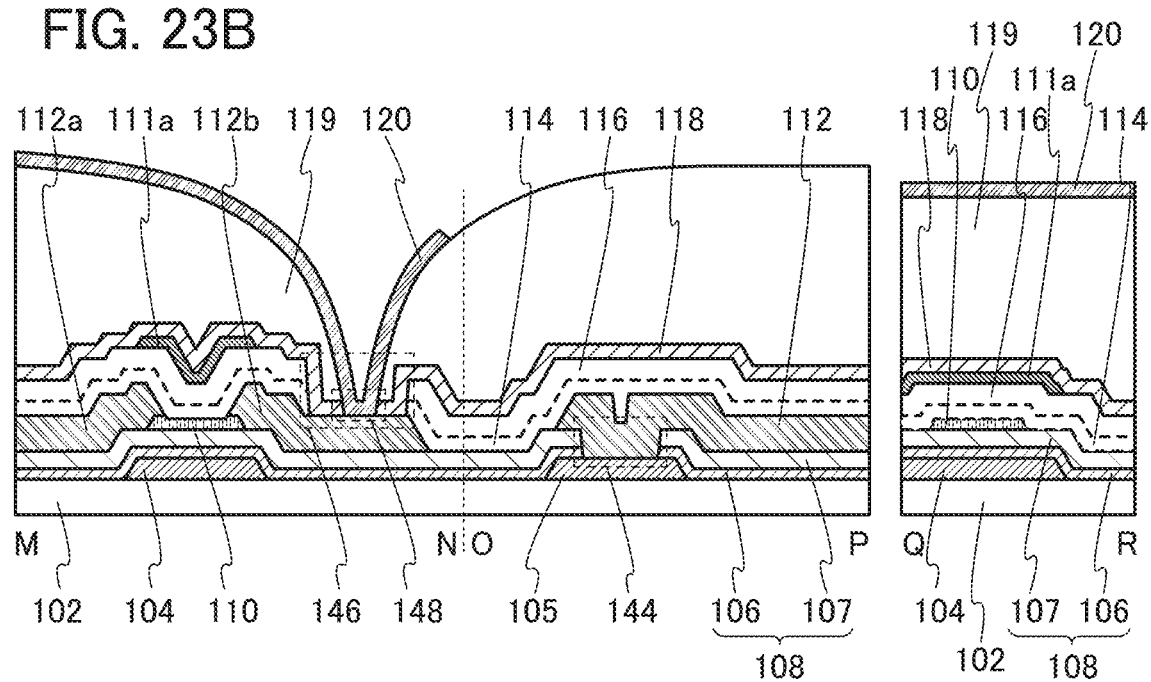

FIG. 23A shows top views of the semiconductor device of one embodiment of the present invention. FIG. 23B illustrates cross sections taken along dashed-dotted line M-N, dashed-dotted line O-P, and dashed-dotted line Q-R in FIG. 23A. Note that FIG. 23A does not illustrate some components of the semiconductor device (e.g., a gate insulating film) to avoid complexity.

The semiconductor device in FIGS. 23A and 23B includes the transistor 151 including the first oxide semiconductor film 110 and the second oxide semiconductor film 111a and a gate wiring contact portion 171. Note that the gate wiring contact portion 171 refers to a region in which the gate wiring 105 is electrically connected to the wiring 112.

Note that the direction of dashed-dotted line M-N in FIG. 23A corresponds to the channel length direction of the transistor 151. The direction of dashed-dotted line Q-R corresponds to the channel width direction of the transistor 151.

The transistor 151 includes the gate electrode 104 over the substrate 102, the insulating film 108 which is over the gate electrode 104 and functions as a first gate insulating film, the first oxide semiconductor film 110 which is over the insulating film 108 and overlaps with the gate electrode 104, the source electrode 112a and the drain electrode 112b over the first oxide semiconductor film 110, the insulating films 114 and 116 which are over the first oxide semiconductor film 110, the source electrode 112a, and the drain electrode 112b and function as second gate insulating films, and the second oxide semiconductor film 111a which is over the insulating film 116 and overlaps with the first oxide semiconductor film 110. The second oxide semiconductor film 111a functions as a second gate electrode of the transistor 151. In other words, the transistor 151 in FIGS. 23A and 23B has a double-gate structure.

In addition, the insulating film 118 and an insulating film 119 are formed over the transistor 151, specifically, over the insulating film 116 and the second oxide semiconductor film 111a. The insulating films 114 and 116 function not only as second gate insulating films of the transistor 151 but also as protective insulating films for the transistor 151. The insulating film 118 functions as a protective insulating film for the transistor 151. The insulating film 119 functions as a planarization film. In addition, openings reaching the drain electrode 112b are formed in the insulating films 114, 116, 118, and 119. The conductive film 120 is formed over the insulating film 119 to cover the openings. The opening provided in the insulating films 114 and 116 is referred to as an opening 146, and the opening provided in the insulating films 118 and 119 is referred to as an opening 148. The conductive film 120 functions as a pixel electrode, for example.

In the gate wiring contact portion 171, the wiring 112 is formed over the gate wiring 105 to cover the opening 144 provided in the insulating film 108.

In the semiconductor device described in this embodiment, an end portion of the insulating film 118 and an end portion of the insulating film 119 are substantially aligned with each other in the opening 148. Since the semiconductor device has such a structure, the number of patterning masks can be reduced, and accordingly, the manufacturing cost can be reduced.

Note that an insulating film containing at least hydrogen is used as the insulating film 118. In addition, an insulating film containing at least oxygen is used as each of the insulating films 107, 114, and 116. As described above, when the insulating film used for the transistor 151 or the insulating film in contact with the transistor 151 has the above-described structure, the resistivity of the first oxide semiconductor film 110 and the resistivity of the second oxide semiconductor film 111a, which are included in the transistor 151, can be controlled.

Note that the description of Embodiment 6 can be referred to for the method for controlling the resistivity of the first oxide semiconductor film 110 and the resistivity of the second oxide semiconductor film 111a.

The major differences between the semiconductor device in FIGS. 13A and 13B described in Embodiment 6 and the semiconductor device in FIGS. 23A and 23B are that the gate wiring contact portion 171 is provided instead of the capacitor 160, that the transistor 151 includes the second oxide semiconductor film 111a functioning as a second gate electrode, and that the insulating film 119 is provided.

<Method for Manufacturing Display Device (Modification Example 2)>

Next, an example of a method for manufacturing the semiconductor device in FIGS. 23A and 23B will be described with reference to FIGS. 24A to 24D and FIGS. 25A to 25C.

First, the gate electrode 104 and the gate wiring 105 are formed over the substrate 102. Then, the insulating film 108 including the insulating films 106 and 107 is formed over the gate electrode 104 and the gate wiring 105. The gate wiring 105 can be formed at the same time as the gate electrode 104 with the use of a material similar to that of the gate electrode 104.

Figure 24A:
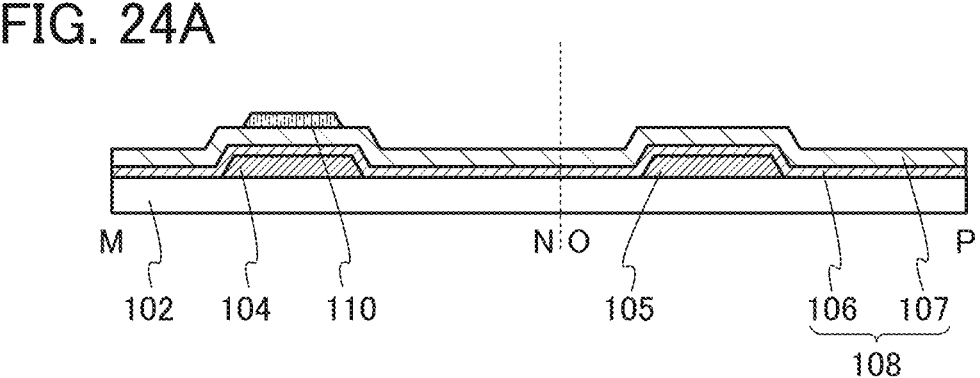
FIGS. 24A to 24D are cross-sectional views illustrating one embodiment of a method for manufacturing a semiconductor device.

Next, the first oxide semiconductor film 110 is formed over the insulating film 108 to overlap with the gate electrode 104 (see FIG. 24A).

The first oxide semiconductor film 110 can be formed in the following manner: an oxide semiconductor film is deposited over the insulating film 108 and patterned such that a desired region remains, and then, unnecessary regions of the oxide semiconductor film are etched away.

When the first oxide semiconductor film 110 is processed by etching, part of the insulating film 108 (a region not covered with the first oxide semiconductor film 110) might be overetched and reduced in thickness.

After the formation of the first oxide semiconductor film 110, heat treatment is preferably performed. The description of the heat treatment after the formation of the first oxide semiconductor film 110 in Embodiment 6 can be referred to for the heat treatment here.

Figure 24B:
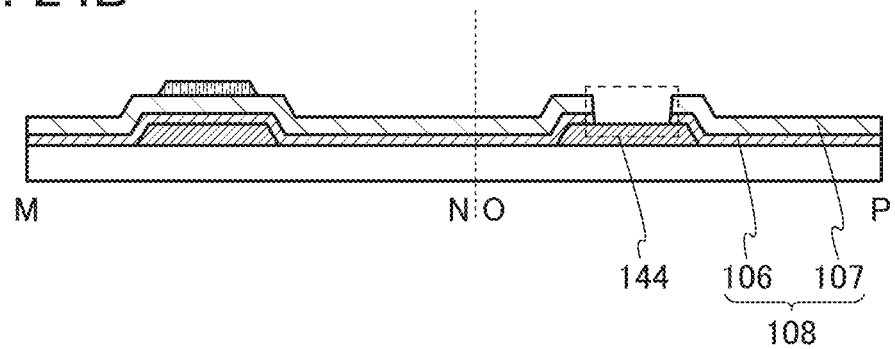

Then, the opening 144 is formed in the following manner: the insulating films 106 and 107 are patterned such that desired regions remain, and then, unnecessary regions are etched away (see FIG. 24B).

The opening 144 is formed to expose part of the gate wiring 105. An example of a method for forming the opening 144 is, but not limited to, a dry etching method. Alternatively, a wet etching method or a combination of dry etching and wet etching may be employed as a method for forming the opening 144.

Figure 24C:
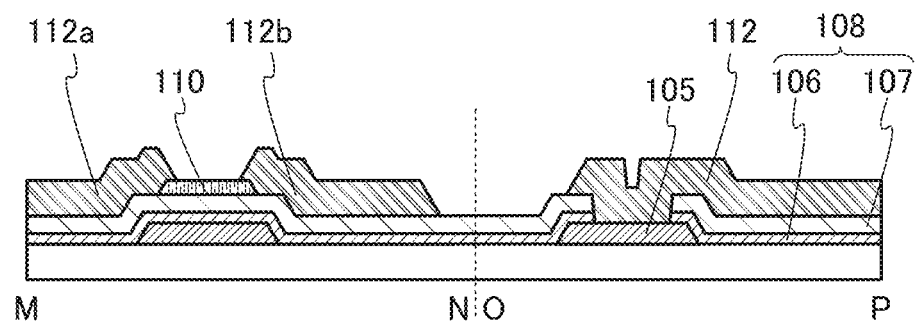

Next, a conductive film is deposited over the insulating film 108, the gate wiring 105, and the first oxide semiconductor film 110 and patterned such that desired regions remain, and then, unnecessary regions of the conductive film are etched away, whereby the source electrode 112a, the drain electrode 112b, and the wiring 112 are formed (see FIG. 24C). The wiring 112 can be formed at the same time as the source electrode 112a and the drain electrode 112b with the use of a material similar to that of the source electrode 112a and the drain electrode 112b.

Next, the insulating films 114 and 116 are formed over the insulating film 108, the first oxide semiconductor film 110, the source electrode 112a, the drain electrode 112b, and the wiring 112. After the insulating films 114 and 116 are formed, the first heat treatment described in Embodiment 6 is preferably performed.

Figure 24D:
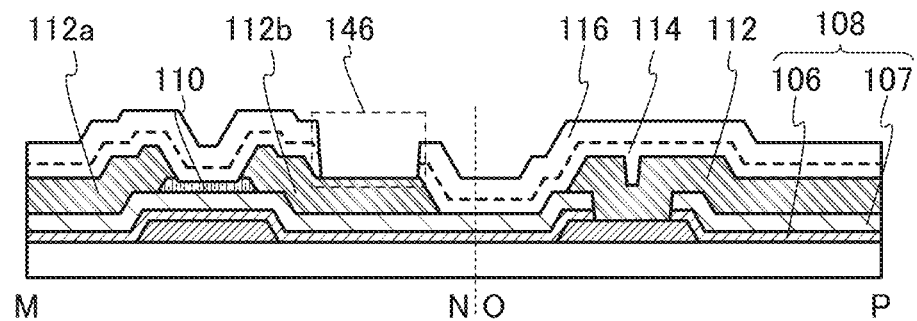

Then, the opening 146 is formed in the following manner: the insulating films 114 and 116 are patterned such that desired regions remain, and then, unnecessary regions are etched away (see FIG. 24D).

The opening 146 is formed to expose part of the drain electrode 112b. An example of a method for forming the opening 146 is, but not limited to, a dry etching method. Alternatively, a wet etching method or a combination of dry etching and wet etching may be employed as a method for forming the opening 146.

Next, the second oxide semiconductor film 111a is formed over the insulating film 116 to overlap with the first oxide semiconductor film 110. The method for forming the second oxide semiconductor film 111 in Embodiment 6 can be referred to for the method for forming the second oxide semiconductor film 111a.

The second oxide semiconductor film 111a can be formed in the following manner: an oxide semiconductor film is deposited over the insulating film 116 and patterned such that a desired region remains, and then, unnecessary regions of the oxide semiconductor film are etched away.

When the second oxide semiconductor film 111a is processed by etching, part of the insulating film 116 (a region not covered with the second oxide semiconductor film 111a) might be overetched and reduced in thickness.

Next, the insulating film 118 is formed over the insulating film 116, the second oxide semiconductor film 111a, and the drain electrode 112b. Hydrogen contained in the insulating film 118 diffuses into the second oxide semiconductor film 111a, so that the resistivity of the second oxide semiconductor film 111a is reduced.

Figure 25A:
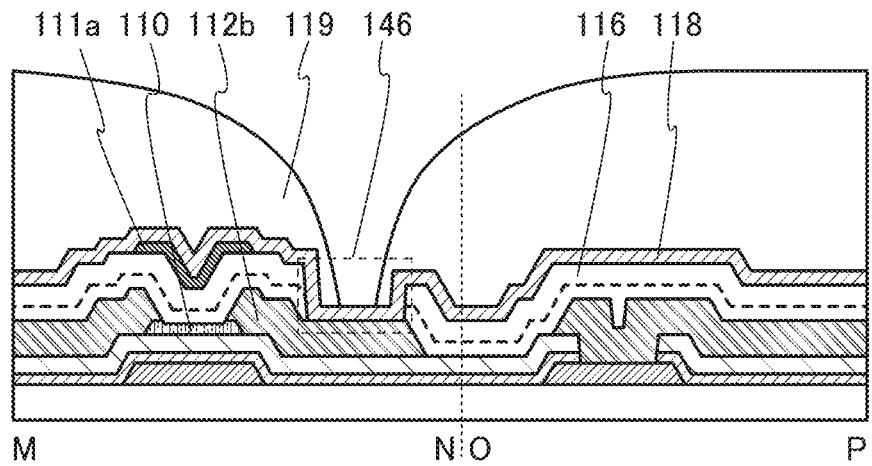
FIGS. 25A to 25C are cross-sectional views illustrating one embodiment of a method for manufacturing a semiconductor device.

Next, the insulating film 119 is formed over the insulating film 118 (see FIG. 25A). The insulating film 119 can be formed using a heat-resistant organic material such as a polyimide resin, an acrylic resin, a polyimide amide resin, a benzocyclobutene resin, a polyamide resin, or an epoxy resin. An organic resin film is formed over the insulating film and patterned such that desired regions remain, and then, unnecessary regions are etched away, whereby an opening overlapping with the opening 146 is formed.

Figure 25B:
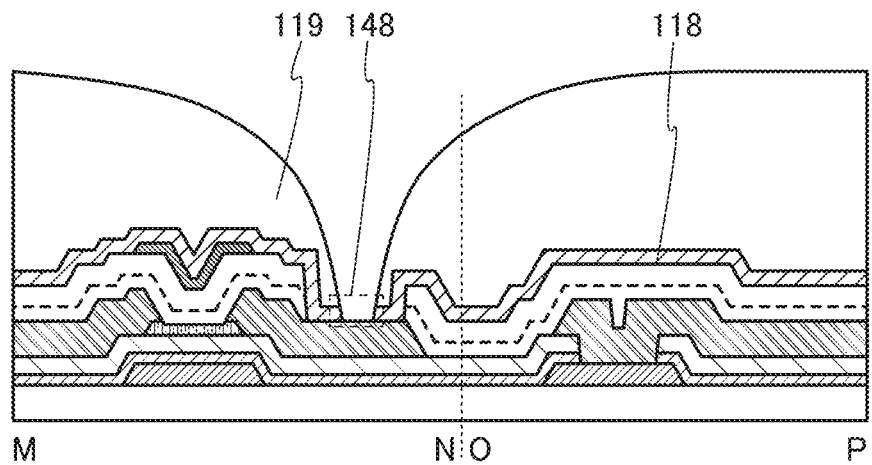

Then, the insulating film 118 is etched using the insulating film 119 having the opening as a mask, whereby the opening 148 is formed (see FIG. 25B). Since the insulating film 119 can be used as a mask, the opening 148 can be formed without an additional mask and patterning. Thus, the manufacturing cost of the semiconductor device can be reduced.

Figure 25C:
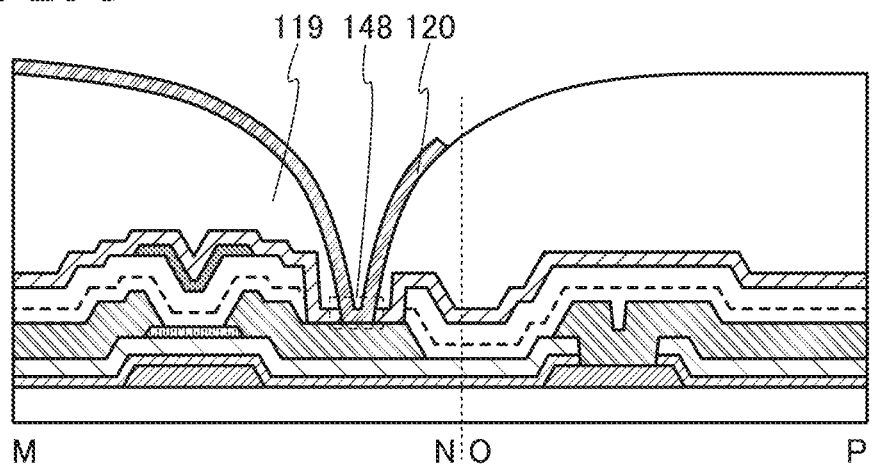

Then, a conductive film is deposited over the insulating film 119 to cover the opening 148 and is patterned and etched into a desired shape; thus, the conductive film 120 is formed (see FIG. 25C).

Through the above steps, the transistor 151 and the gate wiring contact portion 171 can be formed over one substrate.

The structures, the methods, and the like described in this embodiment can be combined as appropriate with any of the structures, the methods, and the like described in the other embodiments.

Embodiment 9

In this embodiment, an example of an oxide semiconductor will be described, which can be used for the transistor, the capacitor, and the gate wiring contact portion of the semiconductor device of one embodiment of the present invention.

The structure of an oxide semiconductor will be described below.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. The term "substantially perpendicular" indicates that the angle formed between two straight lines is greater than or equal to 60° and less than or equal to 120°.

In this specification, trigonal and rhombohedral crystal systems are included in a hexagonal crystal system.

An oxide semiconductor is classified into a single crystal oxide semiconductor and a non-single crystal oxide semiconductor. Examples of the non-single crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of the crystalline oxide semiconductor include a single crystal oxide semiconductor, a CAAC-OS, a polycrystalline oxide semiconductor, and an nc-OS.

It is known that an amorphous structure is generally defined as being metastable and unfixed, and being isotropic and having no non-uniform structure. In other words, an amorphous structure has a flexible bond angle and a short-range order but does not have a long-range order.

This means that an inherently stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. Although having a periodic structure in a microscopic region, an a-like OS has an unstable structure including a void. For this reason, an a-like OS has physical properties similar to those of an amorphous oxide semiconductor.

<CAAC-OS>

First, a CAAC-OS will be described.

A CAAC-OS is one of oxide semiconductors and has a plurality of c-axis aligned crystal parts (also referred to as pellets).

In a combined analysis image (also referred to as a high-resolution transmission electron microscope (TEM) image) of a bright-field image and a diffraction pattern of a CAAC-OS, which is obtained using a TEM, a plurality of pellets can be observed. However, in the high-resolution TEM image, a boundary between pellets, that is, a grain boundary is not clearly observed. Thus, in the CAAC-OS, a reduction in electron mobility due to the grain boundary is less likely to occur.

Figure 26A:
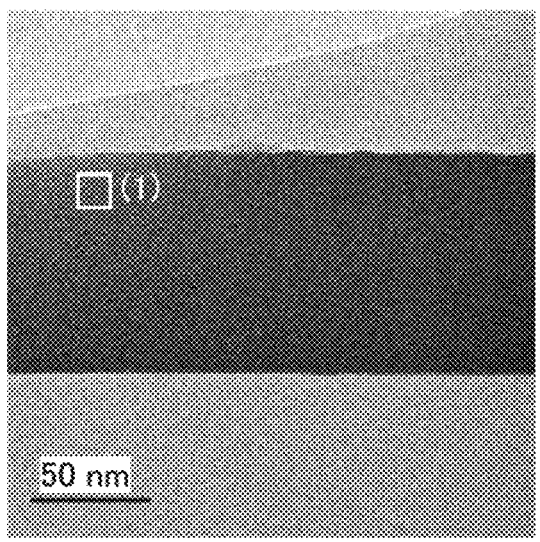
FIGS. 26A to 26C are Cs-corrected high-resolution TEM images of a cross section of a CAAC-OS.

A CAAC-OS observed with a TEM will be described below. FIG. 26A shows a high-resolution TEM image of a cross section of the CAAC-OS which is observed in the direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be obtained with, for example, an atomic resolution analytical electron microscope JEM-ARM200F manufactured by JEOL Ltd.

Figure 26B:
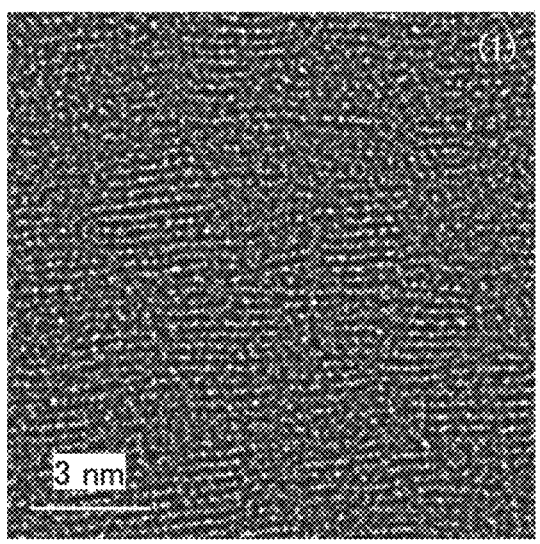

FIG. 26B shows an enlarged Cs-corrected high-resolution TEM image of a region (1) in FIG. 26A. FIG. 26B shows that metal atoms are arranged in a layered manner in a pellet. Each metal atom layer has a configuration reflecting unevenness of a surface over which the CAAC-OS is formed (the surface is also referred to as a formation surface) or a top surface of the CAAC-OS, and is arranged parallel to the formation surface or the top surface of the CAAC-OS.

Figure 26C:
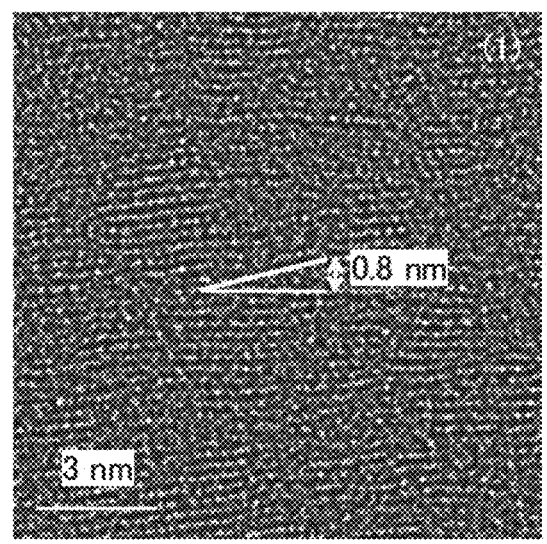

As shown in FIG. 26B, the CAAC-OS has a characteristic atomic arrangement. The characteristic atomic arrangement is denoted by an auxiliary line in FIG. 26C. FIGS. 26B and 26C prove that the size of a pellet is 1 nm or greater, or 3 nm or greater, and the size of a space caused by tilt of the pellets is approximately 0.8 nm. Therefore, the pellet can also be referred to as a nanocrystal (nc). Furthermore, the CAAC-OS can also be referred to as an oxide semiconductor including c-axis aligned nanocrystals (CANC).

Figure 26D:
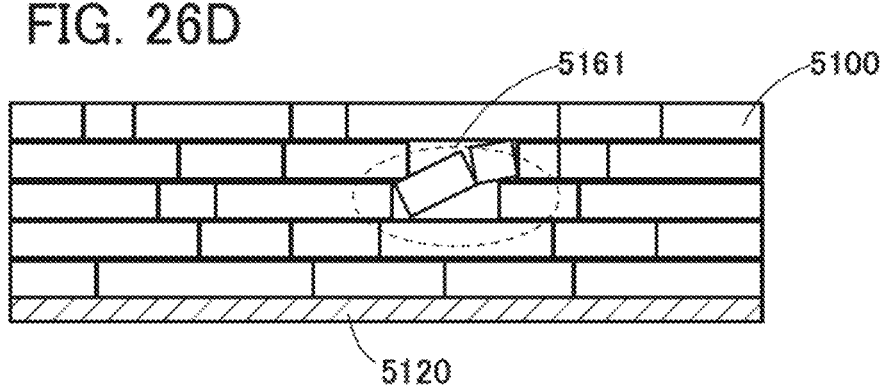
FIG. 26D is a schematic cross-sectional view of a CAAC-OS.

Here, according to the Cs-corrected high-resolution TEM images, the schematic arrangement of pellets 5100 of a CAAC-OS over a substrate 5120 is illustrated as such a structure in which bricks or blocks are stacked (see FIG. 26D). The portion in which the pellets are tilted as observed in FIG. 26C corresponds to a region 5161 in FIG. 26D.

FIG. 27A shows a Cs-corrected high-resolution TEM image of a plane of the CAAC-OS observed in the direction substantially perpendicular to the sample surface. FIGS. 27B, 27C, and 27D show enlarged Cs-corrected high-resolution TEM images of regions (1), (2), and (3) in FIG. 27A, respectively. FIGS. 27B, 27C, and 27D indicate that metal atoms are arranged in a triangular, quadrangular, or hexagonal configuration in a pellet. However, there is no regularity of arrangement of metal atoms between different pellets.

Figure 28A:
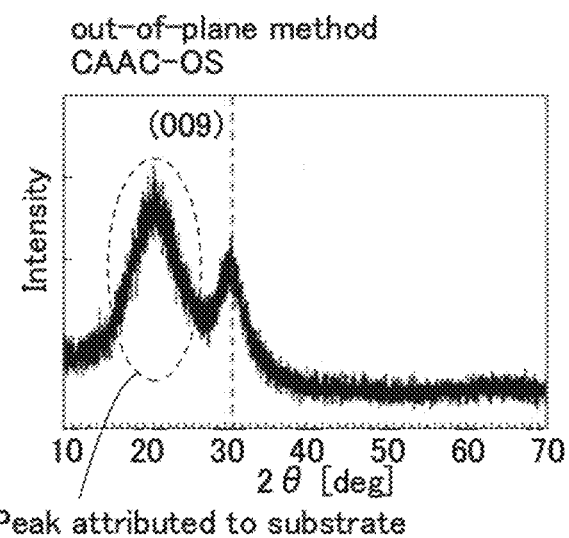
FIGS. 28A to 28C show structural analysis of a CAAC-OS and a single crystal oxide semiconductor by XRD.

Next, a CAAC-OS analyzed by X-ray diffraction (XRD) will be described. For example, when the structure of a CAAC-OS including an InGaZnO$_4$ crystal is analyzed by an out-of-plane method, a peak appears at a diffraction angle (2θ) of around 31° as shown in FIG. 28A. This peak is derived from the (009) plane of the InGaZnO$_4$ crystal, which indicates that crystals in the CAAC-OS have c-axis alignment and that the c-axes are aligned in the direction substantially perpendicular to the formation surface or the top surface of the CAAC-OS.

In structural analysis of the CAAC-OS by an out-of-plane method, another peak may appear when 2θ is around 36°, in addition to the peak at 2θ of around 31°. The peak at 2θ of around 36° indicates that a crystal having no c-axis alignment is included in part of the CAAC-OS. In structural analysis of a preferred CAAC-OS by an out-of-plane method, a peak appears when 2θ is around 31° and no peak appears when 2θ is around 36°.

Figure 28B:
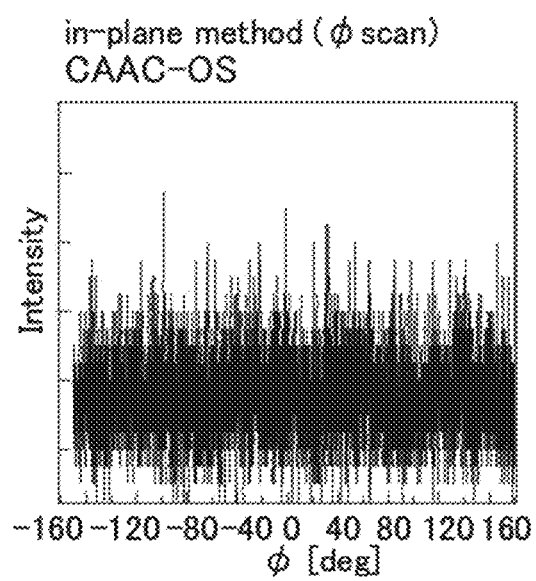
Figure 28C:
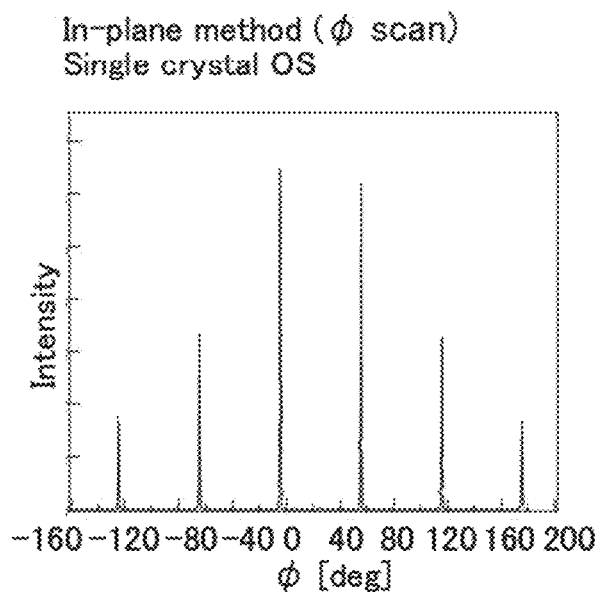

On the other hand, in structural analysis of the CAAC-OS by an in-plane method in which an X-ray is incident on a sample in the direction substantially perpendicular to the c-axis, a peak appears when 2θ is around 56°. This peak is derived from the (110) plane of the InGaZnO$_4$ crystal. When the CAAC-OS is subjected to an analysis (φ scan) with 2θ fixed at around 56° and with the sample rotated using a normal vector of the sample surface as an axis (φ axis), as shown in FIG. 28B, a peak is not clearly observed. In contrast, when a single crystal oxide semiconductor of InGaZnO$_4$ is subjected to the φ scan with 2θ fixed at around 56°, as shown in FIG. 28C, six peaks which are derived from crystal planes equivalent to the (110) plane are observed. Accordingly, the structural analysis using XRD shows that the directions of the a-axes and b-axes are irregularly oriented in the CAAC-OS.

Next, a CAAC-OS analyzed by electron diffraction will be described. For example, when an electron beam with a probe diameter of 300 nm is incident on a CAAC-OS including an InGaZnO$_4$ crystal in the direction parallel to the sample surface, a diffraction pattern (also referred to as a selected-area transmission electron diffraction pattern) shown in FIG. 29A can be obtained. This diffraction pattern includes spots derived from the (009) plane of an InGaZnO$_4$ crystal. Thus, the results of electron diffraction also indicate that pellets included in the CAAC-OS have c-axis alignment and that the c-axes are aligned in the direction substantially perpendicular to the formation surface or the top surface of the CAAC-OS. Meanwhile, FIG. 29B shows a diffraction pattern obtained in such a manner that an electron beam with a probe diameter of 300 nm is incident on the same sample in the direction perpendicular to the sample surface. In FIG. 29B, a ring-like diffraction pattern is observed. Thus, the results of electron diffraction also indicate that the a-axes and b-axes of the pellets included in the CAAC-OS do not have regular alignment. The first ring in FIG. 29B is considered to be derived from the (010) plane, the (100) plane, and the like of the InGaZnO$_4$ crystal. The second ring in FIG. 29B is considered to be derived from the (110) plane and the like.

As described above, the CAAC-OS is an oxide semiconductor with high crystallinity. Entry of impurities, formation of defects, or the like might decrease the crystallinity of an oxide semiconductor. This means that the CAAC-OS has negligible amounts of impurities and defects (e.g., oxygen vacancies).

Note that the impurity means an element other than the main components of the oxide semiconductor, such as hydrogen, carbon, silicon, or a transition metal element. For example, an element (e.g., silicon) having stronger bonding force to oxygen than a metal element contained in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities contained in the oxide semiconductor might serve as carrier traps or carrier generation sources, for example. Furthermore, oxygen vacancies in the oxide semiconductor might serve as carrier traps or carrier generation sources when hydrogen is captured therein.

The CAAC-OS having few impurities and oxygen vacancies is an oxide semiconductor with low carrier density (specifically, lower than $8\times10^{11}$/cm$^3$, preferably lower than $1\times10^{11}$/cm$^3$, further preferably lower than $1\times10^{10}$/cm$^3$, and higher than or equal to $1\times10^{-9}$/cm$^3$). Such an oxide semiconductor is referred to as a highly purified intrinsic or substantially highly purified intrinsic oxide semiconductor. A CAAC-OS has a low impurity concentration and a low density of defect states. Thus, the CAAC-OS can be referred to as an oxide semiconductor having stable characteristics.

<nc-OS>

Next, an nc-OS will be described.

A high-resolution TEM image of an nc-OS has a region in which a crystal part is observed and a region in which a crystal part is not clearly observed. In most cases, the size of a crystal part included in the nc-OS is greater than or equal to 1 nm and less than or equal to 10 nm, or greater than or equal to 1 nm and less than or equal to 3 nm. An oxide semiconductor including a crystal part whose size is greater than 10 nm and less than or equal to 100 nm may be referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not observed. Accordingly, the nc-OS cannot be distinguished from an a-like OS or an amorphous oxide semiconductor, depending on the analysis method. For example, when the nc-OS is analyzed by an out-of-plane method using an X-ray beam having a diameter larger than the size of a pellet, a peak indicating a crystal plane does not appear. Furthermore, a diffraction pattern like a halo pattern is observed when the nc-OS is subjected to electron diffraction using an electron beam with a probe diameter (e.g., 50 nm or greater) that is larger than the size of a pellet. Meanwhile, spots are observed in a nanobeam electron diffraction pattern of the nc-OS when an electron beam having a probe diameter close to or smaller than the size of a pellet is used. Moreover, in a nanobeam electron diffraction pattern of the nc-OS, regions with high luminance in a circular (ring) pattern are observed in some cases. In some cases, a plurality of spots is also observed in a ring-like region.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has higher regularity than an amorphous oxide semiconductor. Therefore, the nc-OS has a lower density of defect states than the a-like OS and the amorphous oxide semiconductor. Note that there is no regularity of crystal orientation between different pellets in the nc-OS. Therefore, the nc-OS has a higher density of defect states than the CAAC-OS.

<a-like OS>

An a-like OS has a structure between the structure of an nc-OS and the structure of an amorphous oxide semiconductor.

In a high-resolution TEM image of the a-like OS, a void may be observed. Furthermore, the high-resolution TEM image has a region in which a crystal part is clearly observed and a region in which a crystal part is not observed.

The a-like OS has an unstable structure including a void. To verify that an a-like OS has an unstable structure as compared with a CAAC-OS and an nc-OS, a change in structure by electron irradiation will be described below.

An a-like OS (sample A), an nc-OS (sample B), and a CAAC-OS (sample C) are prepared as samples subjected to electron irradiation. Each sample is an In—Ga—Zn oxide.

First, a high-resolution cross-sectional TEM image of each sample is obtained. The high-resolution cross-sectional TEM images show that all the samples have crystal parts.

Note that which part is regarded as a crystal part may be determined as follows. It is known that a unit cell of the InGaZnO$_4$ crystal has a structure in which nine layers consisting of three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion in which the spacing between lattice fringes is greater than or equal to 0.28 nm and less than or equal to 0.30 nm can be regarded as a crystal part of InGaZnO$_4$. Each lattice fringe corresponds to the a-b plane of the InGaZnO$_4$ crystal.

Figure 30:
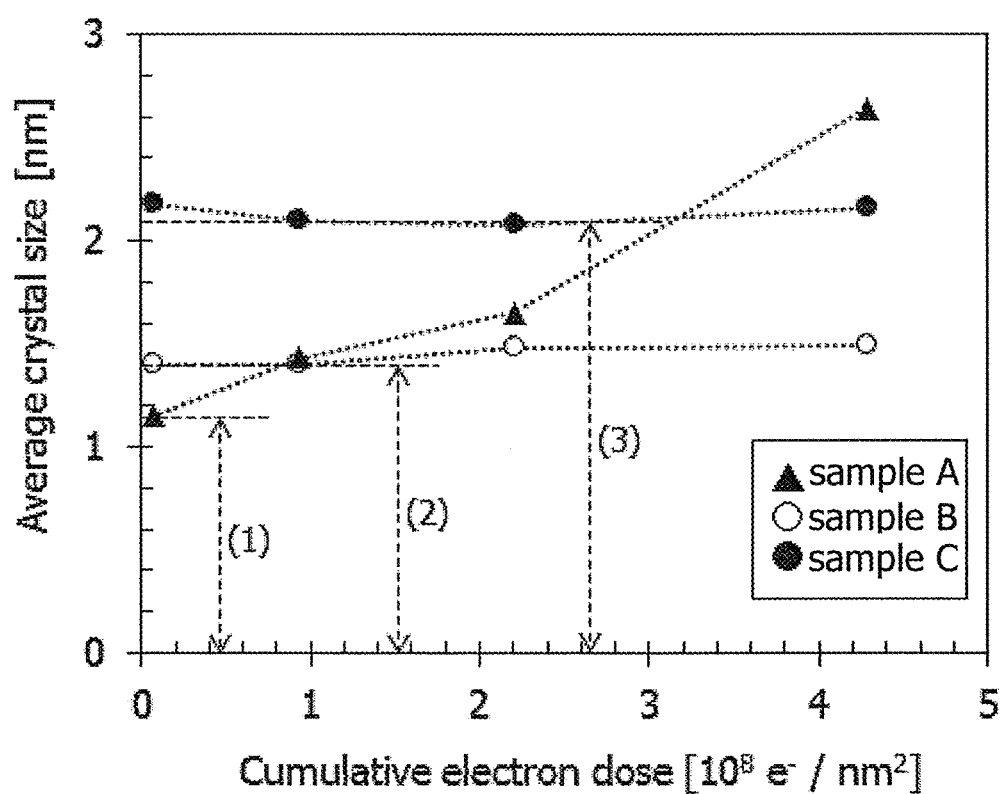
FIG. 30 shows a change in crystal part of an In—Ga—Zn oxide induced by electron irradiation.

FIG. 30 shows change in the average size of crystal parts (at 22 points to 45 points) in each sample. Note that the crystal part size corresponds to the length of a lattice fringe. FIG. 30 indicates that the crystal part size in the a-like OS increases with an increase in cumulative electron dose. Specifically, as shown by (1) in FIG. 30, a crystal part of approximately 1.2 nm (also referred to as an initial nucleus) at the start of TEM observation grows to a size of approximately 2.6 nm at a cumulative electron dose of $4.2 \times 10^8$ e$^-$/nm$^2$. In contrast, the crystal part size in the nc-OS and the CAAC-OS shows little change from the start of electron irradiation to a cumulative electron dose of $4.2 \times 10^8$ e$^-$/nm$^2$. Specifically, as shown by (2) and (3) in FIG. 30, the average crystal size in the nc-OS and that in the CAAC-OS are approximately 1.4 nm and approximately 2.1 nm, respectively, regardless of the cumulative electron dose.

In this manner, growth of the crystal part in the a-like OS may be induced by electron irradiation. In contrast, in the nc-OS and the CAAC-OS, growth of the crystal part is hardly induced by electron irradiation. That is, the a-like OS has an unstable structure as compared with the nc-OS and the CAAC-OS.

The a-like OS has a lower density than the nc-OS and the CAAC-OS because it includes a void. Specifically, the density of the a-like OS is higher than or equal to 78.6% and lower than 92.3% of the density of the single crystal oxide semiconductor having the same composition. The density of the nc-OS and the density of the CAAC-OS are each higher than or equal to 92.3% and lower than 100% of the density of the single crystal oxide semiconductor having the same composition. It is difficult to deposit an oxide semiconductor having a density lower than 78% of the density of the single crystal oxide semiconductor.

For example, in the case of an oxide semiconductor having an atomic ratio of In:Ga:Zn=1:1:1, the density of single crystal InGaZnO$_4$ with a rhombohedral crystal structure is 6.357 g/cm$^3$. Accordingly, in the case of the oxide semiconductor having an atomic ratio of In:Ga:Zn=1:1:1, the density of the a-like OS is higher than or equal to 5.0 g/cm$^3$ and lower than 5.9 g/cm$^3$. For example, in the case of the oxide semiconductor having an atomic ratio of In:Ga:Zn=1:1:1, the density of the nc-OS and the density of the CAAC-OS are each higher than or equal to 5.9 g/cm$^3$ and lower than 6.3 g/cm$^3$.

Note that there is a possibility that an oxide semiconductor having a certain composition cannot exist in a single crystal state. In this case, single crystal oxide semiconductors with different compositions are combined at an adequate ratio, which makes it possible to calculate the density equivalent to that of a single crystal oxide semiconductor with the desired composition. The density of a single crystal oxide semiconductor having the desired composition can be calculated using a weighted average with respect to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked film including two or more of an amorphous oxide semiconductor, an a-like OS, an nc-OS, and a CAAC-OS, for example.

<Method for Depositing CAAC-OS>

Figure 31:
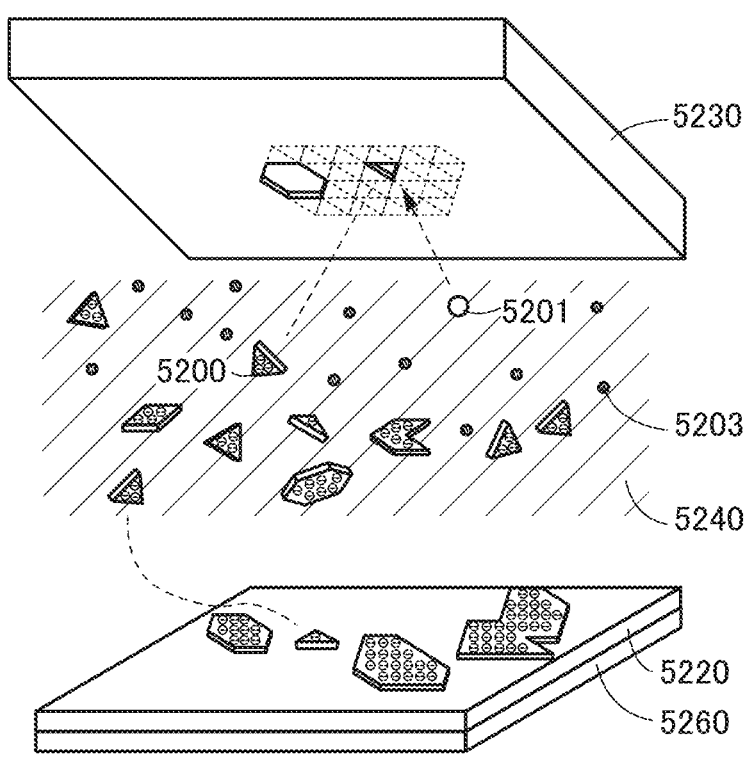
FIG. 31 illustrates a method for depositing a CAAC-OS.

An example of a method for depositing a CAAC-OS will be described below. FIG. 31 schematically illustrates the inside of a deposition chamber. The CAAC-OS can be deposited by a sputtering method.

As illustrated in FIG. 31, a substrate 5220 and a target 5230 are arranged to face each other. Plasma 5240 is generated between the substrate 5220 and the target 5230. A heating mechanism 5260 is under the substrate 5220. The target 5230 is attached to a backing plate (not illustrated). A plurality of magnets is arranged to face the target 5230 with the backing plate positioned therebetween. A sputtering method in which the deposition rate is increased by utilizing a magnetic field of a magnet is referred to as a magnetron sputtering method.

The distance d between the substrate 5220 and the target 5230 (also referred to as a target-substrate distance (T-S distance)) is greater than or equal to 0.01 m and less than or equal to 1 m, preferably greater than or equal to 0.02 m and less than or equal to 0.5 m. The deposition chamber is mostly filled with a deposition gas (e.g., an oxygen gas, an argon gas, or a mixed gas containing oxygen at 5 vol % or higher), and the pressure in the deposition chamber is controlled to be higher than or equal to 0.01 Pa and lower than or equal to 100 Pa, preferably higher than or equal to 0.1 Pa and lower than or equal to 10 Pa. Here, discharge starts with application of a certain voltage or higher to the target 5230, and the plasma 5240 is observed. The magnetic field forms a high-density plasma region in the vicinity of the target 5230. The deposition gas is ionized in the high-density plasma region, so that an ion 5201 is generated. Examples of the ion 5201 include an oxygen cation ($O^+$) and an argon cation ($Ar^+$).

Figure 32A:
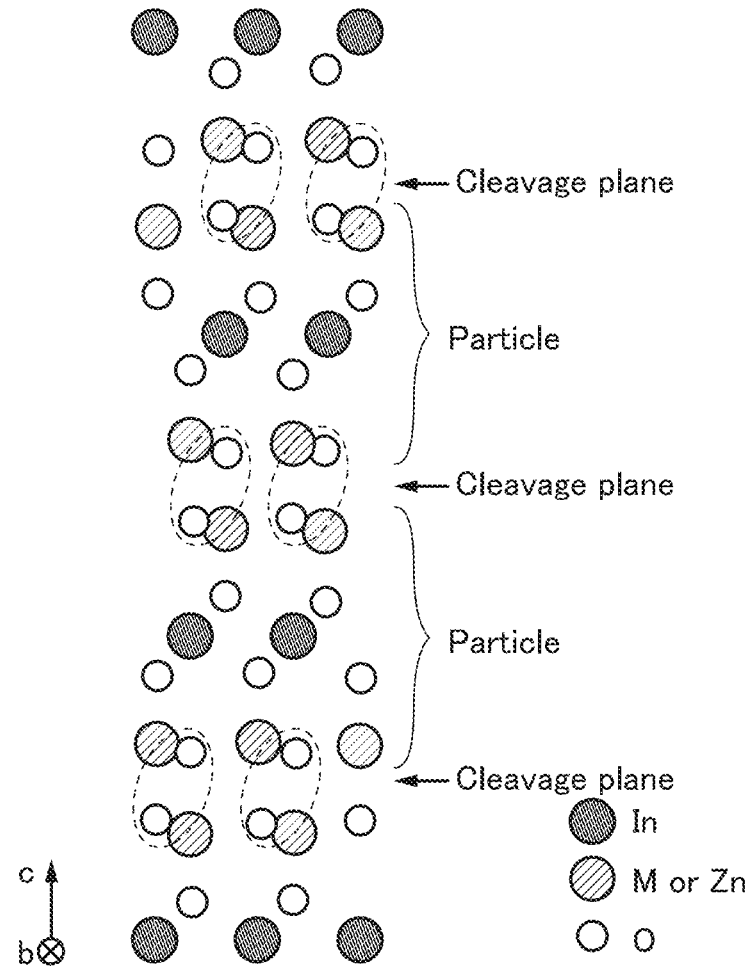
FIGS. 32A to 32C illustrate an $InMZnO_4$ crystal.
Figure 32B:
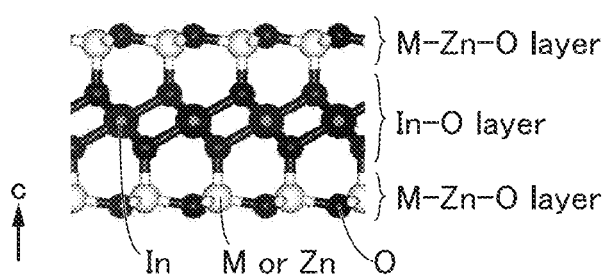
Figure 32C:
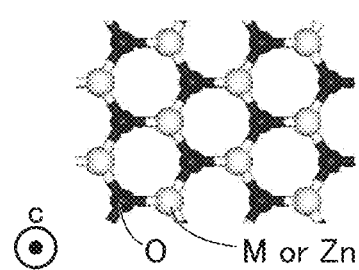

The target 5230 has a polycrystalline structure including a plurality of crystal grains, any of which includes a cleavage plane. FIGS. 32A to 32C illustrate an example of the crystal structure of $InMZnO_4$ (the element M is Al, Ga, Y, or Sn, for example) included in the target 5230. Note that FIG. 32A illustrates the crystal structure of $InMZnO_4$ observed in the direction parallel to the b-axis. In the $InMZnO_4$ crystal, oxygen atoms are negatively charged, whereby repulsive force is generated between two adjacent M-Zn—O layers. Thus, the $InMZnO_4$ crystal has a cleavage plane between two adjacent M-Zn—O layers.

The ion 5201 generated in the high-density plasma region is accelerated to the target 5230 side by an electric field, and then collides with the target 5230. At this time, a pellet 5200 which is a flat-plate-like or pellet-like sputtered particle is separated from the cleavage plane (see FIG. 31). The pellet 5200 corresponds to a portion between the two cleavage planes in FIG. 32A. Thus, the cross section of the pellet 5200 is as illustrated in FIG. 32B, and the top view thereof is as illustrated in FIG. 32C. Note that the structure of the pellet 5200 may be distorted by an impact of collision of the ion 5201.

The pellet 5200 is a flat-plate-like or pellet-like sputtered particle having a triangle plane, for example, a regular triangle plane. Alternatively, the pellet 5200 is a flat-plate-like or pellet-like sputtered particle having a hexagon plane, for example, a regular hexagon plane. However, the planar shape of the pellet 5200 is not limited to a triangle or a hexagon. For example, the plane may have a shape formed by combining two or more triangles. For example, a quadrangle (e.g., rhombus) may be formed by combining two triangles (e.g., regular triangles).

The thickness of the pellet 5200 is determined depending on the kind of the deposition gas and the like. For example, the thickness of the pellet 5200 is greater than or equal to 0.4 nm and less than or equal to 1 nm, preferably greater than or equal to 0.6 nm and less than or equal to 0.8 nm. The width of the pellet 5200 is, for example, greater than or equal to 1 nm and less than or equal to 100 nm, preferably greater than or equal to 2 nm and less than or equal to 50 nm, further preferably greater than or equal to 3 nm and less than or equal to 30 nm. For example, the ion 5201 collides with the target 5230 including the In-M-Zn oxide. As a result, the pellet 5200 including three layers, namely, an M-Zn—O layer, an In—O layer, and an M-Zn—O layer is separated. Along with the separation of the pellet 5200, a particle 5203 is also sputtered from the target 5230. The particle 5203 has an atom or an aggregate of several atoms. Therefore, the particle 5203 can also be referred to as an atomic particle.

A surface of the pellet 5200 may be negatively or positively charged when passing through the plasma 5240. For example, the pellet 5200 receives a negative charge from $O^{2-}$ in the plasma 5240. As a result, oxygen atoms on the surface of the pellet 5200 may be negatively charged. In addition, when passing through the plasma 5240, the pellet 5200 is sometimes bonded to indium, the element M, zinc, oxygen, or the like in the plasma 5240 to grow up.

The pellet 5200 and the particle 5203 which have passed through the plasma 5240 reach a surface of the substrate 5220. Note that some of the particles 5203 might be discharged to the outside by a vacuum pump or the like because they are small in mass.

Next, deposition of the pellets 5200 and the particles 5203 on the surface of the substrate 5220 will be described with reference to FIGS. 33A to 33F.

Firstly, a first pellet 5200 is deposited on the substrate 5220. The pellet 5200 having a flat-plate-like shape is deposited such that its flat plane faces the surface of the substrate 5220. Here, a charge on the surface of the pellet 5200 on the substrate 5220 side is lost through the substrate 5220.

Next, a second pellet 5200 reaches the substrate 5220. Since a surface of the first pellet 5200 and a surface of the second pellet 5200 are charged, they repel each other. As a result, the second pellet 5200 avoids being deposited on the first pellet 5200 and is deposited at a position a little distance away from the first pellet 5200 with its flat plane facing the surface of the substrate 5220. With repetition of this, millions of pellets 5200 are deposited on the surface of the substrate 5220 to a thickness of one layer. A region in which no pellet 5200 is deposited is formed between adjacent pellets 5200 (see FIG. 33A).

Then, the particles 5203 that have received energy from plasma reach the surface of the substrate 5220. The particles 5203 cannot be deposited on active regions such as the surface of the pellet 5200. For this reason, the particles 5203 move to regions in which no pellet 5200 is deposited and are attached to side surfaces of the pellets 5200. Available bonds of the particles 5203 are activated by energy received from plasma, so that the particles 5203 are chemically bonded to the pellets 5200 to form lateral growth portions 5202 (see FIG. 33B).

Figure 33A:
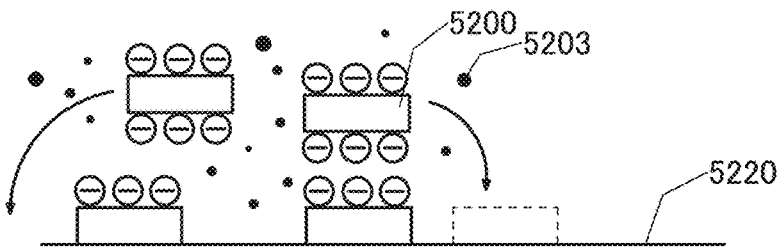
FIGS. 33A to 33F illustrate a method for depositing a CAAC-OS.
Figure 33B:
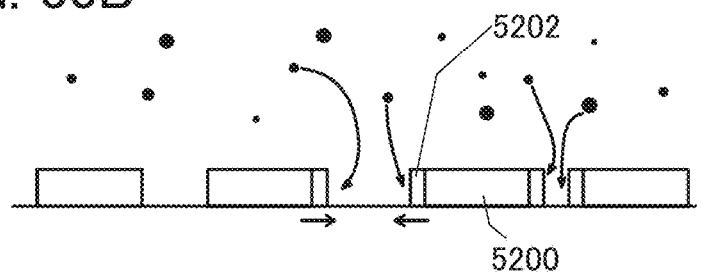
Figure 33C:
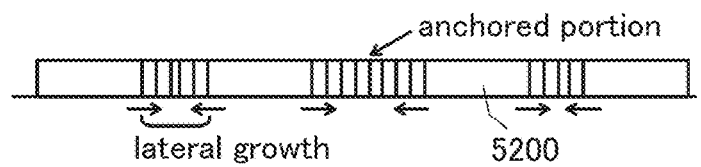

The lateral growth portions 5202 further grow laterally, so that the pellets 5200 are anchored to each other (see FIG. 33C). In this manner, the lateral growth portions 5202 are formed until regions in which no pellet 5200 is deposited are filled. This mechanism is similar to the deposition mechanism of an atomic layer deposition (ALD) method.

Even when the deposited pellets 5200 are oriented in different directions, the particles 5203 cause a lateral growth to fill gaps between the pellets 5200; thus, no clear grain boundary is formed. In addition, as the particles 5203 make a smooth connection between the pellets 5200, a crystal structure different from a single crystal structure and a polycrystalline structure is formed. In other words, a crystal structure including distortion between minute crystal regions (pellets 5200) is formed. The regions filling the gaps between the crystal regions are distorted crystal regions, and thus, it is probably not appropriate to say that the regions have an amorphous structure.

Figure 33D:
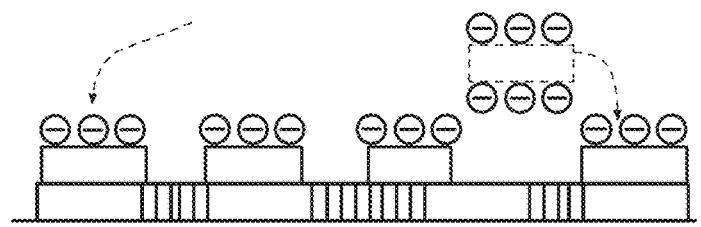
Figure 33E:
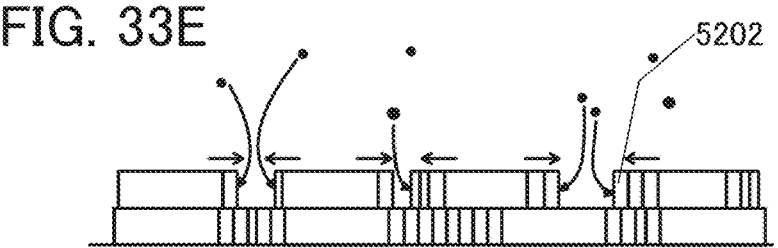
Figure 33F:
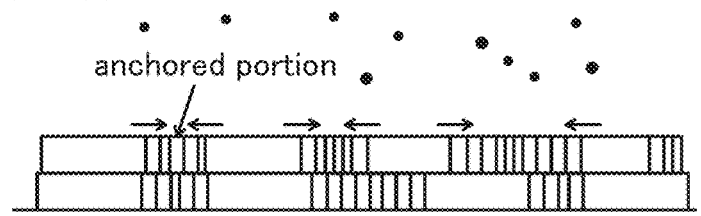

Next, new pellets 5200 are deposited with their flat planes facing the surface of the substrate 5220 (see FIG. 33D). Then, the particles 5203 are deposited to fill regions in which no pellet 5200 is deposited, thereby forming the lateral growth portions 5202 (see FIG. 33E). In this manner, the particles 5203 are attached to side surfaces of the pellets 5200 and the lateral growth of the lateral growth portions 5202 proceeds, so that the pellets 5200 in the second layer are anchored to each other (see FIG. 33F). The deposition continues until an m-th layer (m is an integer of two or greater) is formed; as a result, a stacked-layer thin film structure is formed.

A deposition way of the pellets 5200 changes depending on the surface temperature of the substrate 5220 or the like. For example, if the surface temperature of the substrate 5220 is high, migration of the pellets 5200 occurs over the surface of the substrate 5220. As a result, the proportion of the pellets 5200 that are directly connected to each other without the particles 5203 increases, whereby a CAAC-OS with higher orientation is formed. The surface temperature of the substrate 5220 at which the CAAC-OS is deposited is higher than or equal to room temperature and lower than 340° C., preferably higher than or equal to room temperature and lower than or equal to 300° C., further preferably higher than or equal to 100° C. and lower than or equal to 250° C., still further preferably higher than or equal to 100° C. and lower than or equal to 200° C. Therefore, even when a large substrate of the 8th generation or a larger substrate is used as the substrate 5220, a warp or the like due to the deposition of the CAAC-OS hardly occurs.

On the other hand, if the surface temperature of the substrate 5220 is low, the migration of the pellets 5200 over the surface of the substrate 5220 does not easily occur. As a result, the pellets 5200 are stacked to form, for example, an nc-OS with low orientation. In the nc-OS, the pellets 5200 are possibly deposited with certain gaps when the pellets 5200 are negatively charged. Therefore, the nc-OS has low orientation but some regularity, and thus, it has a denser structure than an amorphous oxide semiconductor.

In a CAAC-OS, pellets positioned very close to one another may form a large pellet. The inside of the large pellet has a single crystal structure. For example, the size of the pellet may be greater than or equal to 10 nm and less than or equal to 200 nm, greater than or equal to 15 nm and less than or equal to 100 nm, or greater than or equal to 20 nm and less than or equal to 50 nm, when seen from the above.

As shown in such a deposition model, the pellets are considered to be deposited on the surface of the substrate. A CAAC-OS can be deposited even when a formation surface does not have a crystal structure. This indicates that the above-described deposition model, which is a growth mechanism different from an epitaxial growth, has high validity. In addition, according to the above-described deposition model, a uniform CAAC-OS or nc-OS can be deposited even on a large glass substrate or the like. For example, a CAAC-OS can be deposited even on a surface of a substrate (formation surface) having an amorphous structure (e.g., amorphous silicon oxide).

In addition, even when the surface of the substrate (formation surface) has an uneven shape, the pellets are aligned along the shape.

The above-described deposition model suggests that a CAAC-OS with high crystallinity can be deposited in the following manner: deposition is performed in a high vacuum to obtain a long mean free path, plasma energy is weakened to reduce damage around a substrate, and thermal energy is applied to a formation surface to repair damage due to plasma during deposition.

The above-described deposition model applies not only in the case where a target has a polycrystalline structure of a composite oxide (e.g., an In-M-Zn oxide) with a plurality of crystal grains, any of which has a cleavage plane, but also in the case where, for example, a target of a mixture containing indium oxide, an oxide of the element M, and zinc oxide is used.

Since there is no cleavage plane in a target of a mixture, atomic particles are separated from the target by sputtering. During deposition, a high electric field region of plasma is formed around the target. Because of the high electric field region of plasma, the atomic particles separated from the target are bonded to each other to cause a lateral growth. For example, the lateral growth occurs first in such a manner that the atomic particles of indium are bonded to each other to be a nanocrystal formed of an In—O layer. Then, M-Zn—O layers are complementarily bonded to the top and bottom surfaces of the nanocrystalline In—O layer. In this manner, a pellet can be formed even when a target of a mixture is used. Accordingly, the above-described deposition model also applies in case where a target of a mixture is used. In the case where no high electric field region of plasma is formed around a target, only atomic particles separated from the target are deposited on a substrate surface. In this case, a lateral growth of the atomic particles might occur on the substrate surface. However, since the atomic particles are not uniformly oriented, the crystal orientation in the resulting thin film is not uniform. As a result, an nc-OS or the like is obtained.

Embodiment 10

In this embodiment, transistors having structures which are different from the structure of the transistor described in Embodiment 6 will be described with reference to FIGS. 34A to 34C, FIGS. 35A to 35D, FIGS. 36A and 36B, and FIGS. 37A and 37B.

Structural Example 1 of Transistor

Figure 34A:
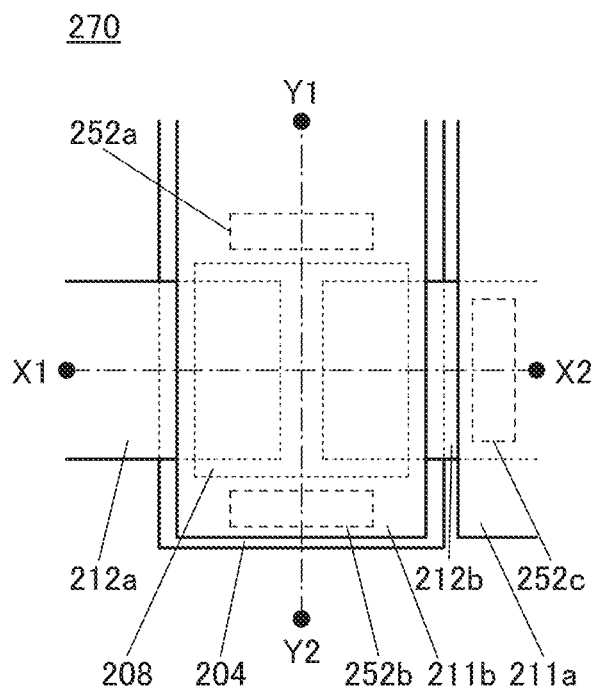
FIGS. 34A to 34C are a top view and cross-sectional views which illustrate an example of a transistor.
Figure 34B:
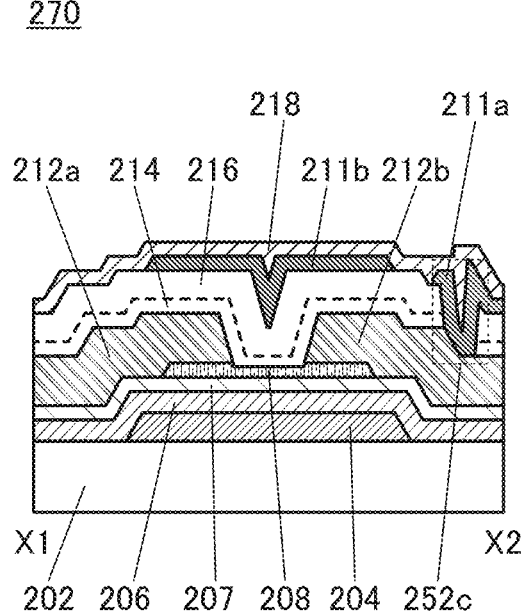
Figure 34C:
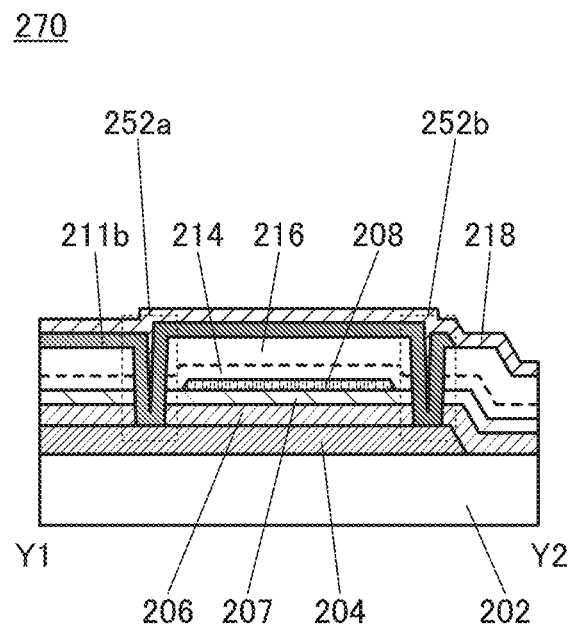

FIG. 34A shows a top view of a transistor 270. FIG. 34B illustrates a cross section taken along dashed-dotted line X1-X2 in FIG. 34A, and FIG. 34C illustrates a cross section taken along dashed-dotted line Y1-Y2 in FIG. 34A. The direction of dashed dotted line X1-X2 may be referred to as a channel length direction, and the direction of dashed dotted line Y1-Y2 may be referred to as a channel width direction.

The transistor 270 includes a conductive film 204 which is over a substrate 202 and functions as a first gate electrode, an insulating film 206 over the substrate 202 and the conductive film 204, an insulating film 207 over the insulating film 206, an oxide semiconductor film 208 over the insulating film 207, a conductive film 212a which is electrically connected to the oxide semiconductor film 208 and functions as a source electrode, a conductive film 212b which is electrically connected to the oxide semiconductor film 208 and functions as a drain electrode, insulating films 214 and 216 over the oxide semiconductor film 208 and the conductive films 212a and 212b, and an oxide semiconductor film 211b over the insulating film 216. In addition, an insulating film 218 is provided over the oxide semiconductor film 211b.

In the transistor 270, the insulating film 214 and the insulating film 216 function as second gate insulating films of the transistor 270. An oxide semiconductor film 211a is connected to the conductive film 212b through an opening 252c provided in the insulating film 214 and the insulating film 216. The oxide semiconductor film 211a functions as, for example, a pixel electrode used for a display device. The oxide semiconductor film 211b functions as a second gate electrode (also referred to as a back gate electrode) of the transistor 270.

As illustrated in FIG. 34C, the oxide semiconductor film 211b is connected to the conductive film 204 functioning as a first gate electrode through openings 252a and 252b provided in the insulating films 206, 207, 214, and 216. Accordingly, the conductive film 204 and the oxide semiconductor film 211b are supplied with the same potential.

One embodiment of the present invention is not limited to the structure described in this embodiment, in which the oxide semiconductor film 211b and the conductive film 204 are connected to each other through the openings 252a and 252b. For example, only one of the openings 252a and 252b may be formed so that the oxide semiconductor film 211b and the conductive film 204 are connected to each other, or the openings 252a and 252b for connecting the oxide semiconductor film 211b to the conductive film 204 are not necessarily provided. In the case where the oxide semiconductor film 211b and the conductive film 204 are not connected to each other, it is possible to supply different potentials to the oxide semiconductor film 211b and the conductive film 204.

As illustrated in FIG. 34B, the oxide semiconductor film 208 is positioned between the conductive film 204 functioning as a first gate electrode and the oxide semiconductor film 211b functioning as a second gate electrode, that is, between the two conductive films functioning as gate electrodes. The length in the channel length direction and the length in the channel width direction of the oxide semiconductor film 211b functioning as a second gate electrode are longer than the length in the channel length direction and the length in the channel width direction of the oxide semiconductor film 208. The whole oxide semiconductor film 208 is covered with the oxide semiconductor film 211b with the insulating films 214 and 216 positioned therebetween. Since the oxide semiconductor film 211b functioning as a second gate electrode is connected to the conductive film 204 functioning as a first gate electrode through the openings 252a and 252b provided in the insulating films 206, 207, 214, and 216, side surfaces of the oxide semiconductor film 208 in the channel width direction face the oxide semiconductor film 211b functioning as a second gate electrode with the insulating films 214 and 216 positioned therebetween.

In other words, in the channel width direction of the transistor 270, the conductive film 204 functioning as a first gate electrode and the oxide semiconductor film 211b functioning as a second gate electrode are connected to each other through the openings provided in the insulating films 206 and 207 functioning as first gate insulating films and the insulating films 214 and 216 functioning as second gate insulating films, and the conductive film 204 and the oxide semiconductor film 211b surround the oxide semiconductor film 208 with the insulating films 206 and 207 functioning as first gate insulating films and the insulating films 214 and 216 functioning as second gate insulating films positioned therebetween.

Such a structure enables the oxide semiconductor film 208 included in the transistor 270 to be electrically surrounded by electric fields of the conductive film 204 functioning as a first gate electrode and the oxide semiconductor film 211b functioning as a second gate electrode. A device structure of a transistor, like that of the transistor 270, in which electric fields of a first gate electrode and a second gate electrode electrically surround an oxide semiconductor film in which a channel region is formed, can be referred to as a surrounded channel (s-channel) structure.

Since the transistor 270 has the s-channel structure, an electric field for inducing a channel can be effectively applied to the oxide semiconductor film 208 by the conductive film 204 functioning as a first gate electrode; therefore, the current drive capability of the transistor 270 can be improved and high on-state current characteristics can be obtained. Since the on-state current can be increased, it is possible to reduce the size of the transistor 270. In addition, since the oxide semiconductor film 208 is surrounded by the conductive film 204 functioning as a first gate electrode and the oxide semiconductor film 211b functioning as a second gate electrode, the mechanical strength of the transistor 270 can be increased.

Structural Example 2 of Transistor

Next, structural examples which are different from the structural example of the transistor 270 in FIGS. 34A to 34C will be described with reference to FIGS. 35A to 35D.

Figure 35A:
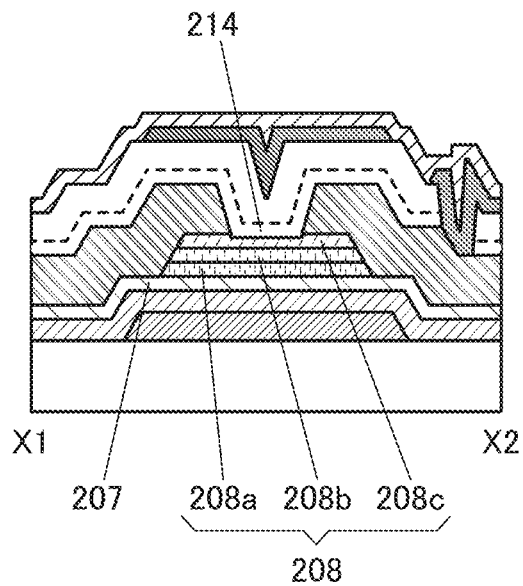
FIGS. 35A to 35D are cross-sectional views illustrating examples of a transistor.
Figure 35B:
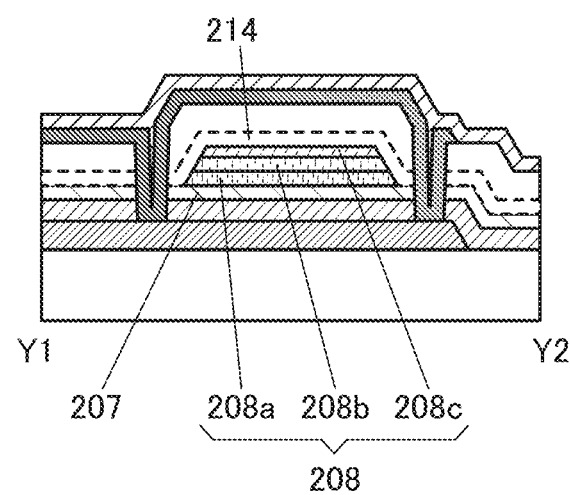
Figure 35C:
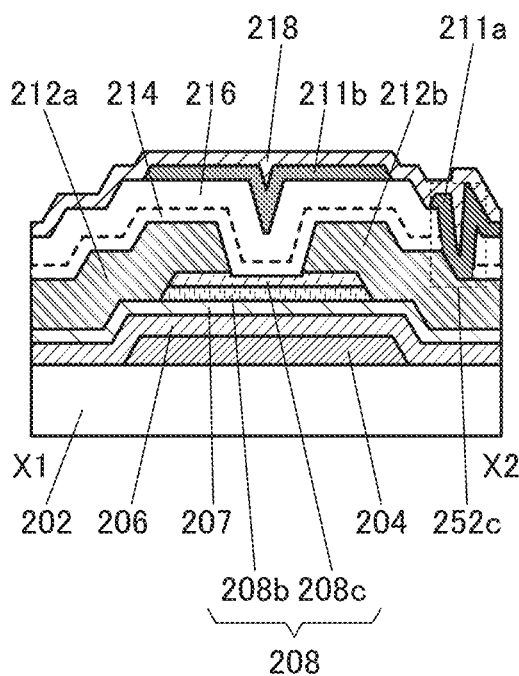
Figure 35D:
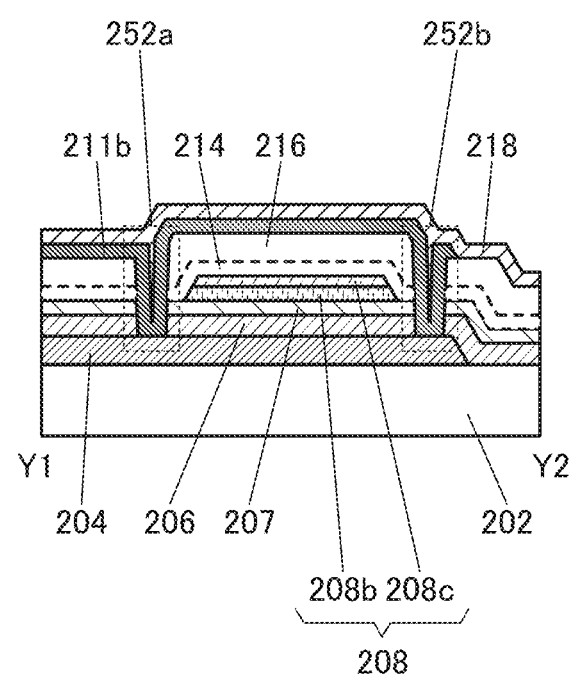

FIGS. 35A and 35B show cross-sectional views illustrating a modification example of the transistor 270 in FIGS. 34B and 34C. FIGS. 35C and 35D show cross-sectional views illustrating a modification example of the transistor 270 in FIGS. 34B and 34C.

A transistor 270A in FIGS. 35A and 35B has the same structure as the transistor 270 in FIGS. 34B and 34C except that the oxide semiconductor film 208 has a three-layer structure. Specifically, the oxide semiconductor film 208 of the transistor 270A includes an oxide semiconductor film 208a, an oxide semiconductor film 208b, and an oxide semiconductor film 208c.

A transistor 270B in FIGS. 35C and 35D has the same structure as the transistor 270 in FIGS. 34B and 34C except that the oxide semiconductor film 208 has a two-layer structure. Specifically, the oxide semiconductor film 208 of the transistor 270B includes the oxide semiconductor film 208b and the oxide semiconductor film 208c.

The description of the structure of the semiconductor device in Embodiment 6 can be referred to for the structures of the transistors 270, 270A, and 270B described in this embodiment. Thus, the description of the substrate 102 can be referred to for the material and formation method of the substrate 202. The description of the gate electrode 104 can be referred to for the material and formation method of the conductive film 204. The description of the insulating film 106 and the insulating film 107 can be referred to for the materials and formation methods of the insulating film 206 and the insulating film 207, respectively. The description of the first oxide semiconductor film 110 can be referred to for the material and formation method of the oxide semiconductor film 208. The description of the second oxide semiconductor film 111 can be referred to for the material and formation method of the oxide semiconductor film 211a and the oxide semiconductor film 211b. The description of the source electrode 112a and the drain electrode 112b can be referred to for the material and formation method of the conductive film 212a and the conductive film 212b. The description of the insulating film 114, the insulating film 116, and the insulating film 118 can be referred to for the materials and formation methods of the insulating film 214, the insulating film 216, and the insulating film 218, respectively.

Here, the band structure of a region including the oxide semiconductor films and the insulating films in contact with the oxide semiconductor films will be described with reference to FIGS. 36A and 36B.

Figure 36A:
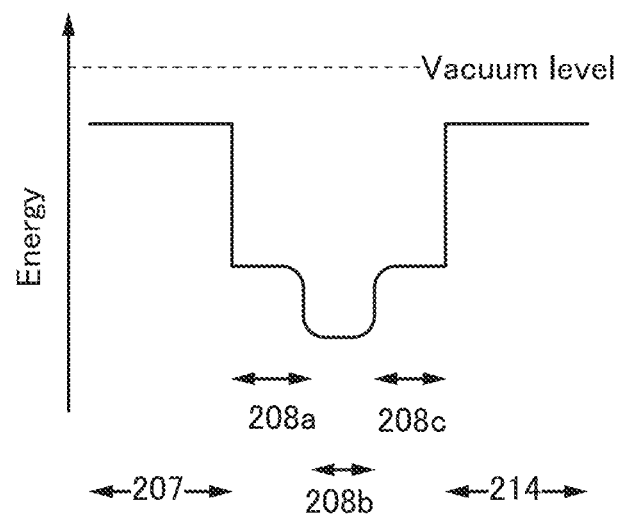
FIGS. 36A and 36B illustrate band structures.

FIG. 36A illustrates an example of the band structure in the thickness direction of a stacked-layer structure including the insulating film 207, the oxide semiconductor films 208a, 208b, and 208c, and the insulating film 214. FIG. 36B illustrates an example of the band structure in the thickness direction of a stacked-layer structure including the insulating film 207, the oxide semiconductor films 208b and 208c, and the insulating film 214. For easy understanding, the band structures show the energy levels of the conduction band minimum (Ec) of the insulating film 207, the oxide semiconductor films 208a, 208b, and 208c, and the insulating film 214.

FIG. 36A shows the band diagram of a structure in which a silicon oxide film is used as each of the insulating films 207 and 214, an oxide semiconductor film formed using a metal oxide target having an atomic ratio of metal elements of In:Ga:Zn=1:1:1.2 is used as each of the oxide semiconductor films 208a and 208c, and an oxide semiconductor film formed using a metal oxide target having an atomic ratio of metal elements of In:Ga:Zn=4:2:4.1 is used as the oxide semiconductor film 208b.

Figure 36B:
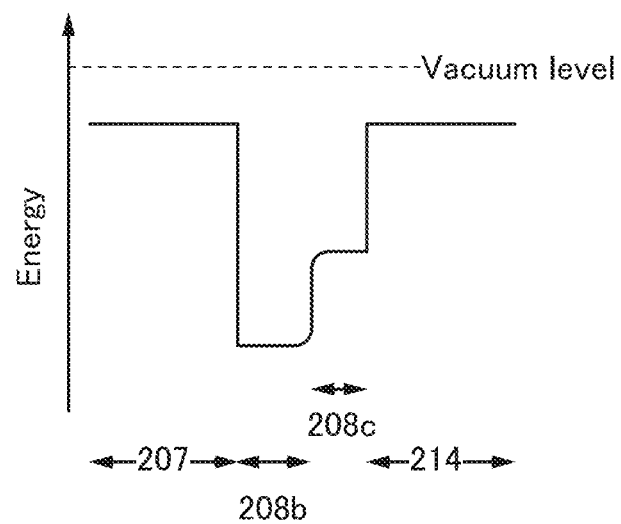

FIG. 36B shows the band diagram of a structure in which a silicon oxide film is used as each of the insulating films 207 and 214, an oxide semiconductor film formed using a metal oxide target having an atomic ratio of metal elements of In:Ga:Zn=4:2:4.1 is used as the oxide semiconductor film 208b, and an oxide semiconductor film formed using a metal oxide target having an atomic ratio of metal elements of In:Ga:Zn=1:1:1.2 is used as the oxide semiconductor film 208c.

As illustrated in FIGS. 36A and 36B, the energy level of the conduction band minimum gradually changes between the oxide semiconductor film 208a and the oxide semiconductor film 208b and between the oxide semiconductor film 208b and the oxide semiconductor film 208c. In other words, the energy level of the conduction band minimum continuously changes or a continuous junction is formed. Such a band structure requires no impurity which forms a defect state such as a trap center or a recombination center to exist at the interface between the oxide semiconductor film 208a and the oxide semiconductor film 208b or the interface between the oxide semiconductor film 208b and the oxide semiconductor film 208c.

To form a continuous junction between the oxide semiconductor film 208a and the oxide semiconductor film 208b and between the oxide semiconductor film 208b and the oxide semiconductor film 208c, the films need to be successively stacked without exposure to the air by using a multi-chamber deposition apparatus (sputtering apparatus) provided with a load lock chamber.

In the transistor with the above stacked-layer structure in FIG. 36A or FIG. 36B, a channel region is formed in the oxide semiconductor film 208b serving as a well.

By providing the oxide semiconductor films 208a and 208c, the oxide semiconductor film 208b can be distanced away from trap states.

If the trap states are more distant from the vacuum level than the energy level of the conduction band minimum (Ec) of the oxide semiconductor film 208b functioning as a channel region, electrons are likely to be accumulated in the trap states. The electrons accumulated in the trap states become negative fixed electric charge, so that the threshold voltage of the transistor shifts in the positive direction. Therefore, it is preferable that the trap states be closer to the vacuum level than the energy level of the conduction band minimum (Ec) of the oxide semiconductor film 208b. Such a structure inhibits accumulation of electrons in the trap states. As a result, the on-state current and the field-effect mobility of the transistor can be increased.

The energy level of the conduction band minimum of each of the oxide semiconductor films 208a and 208c is closer to the vacuum level than that of the oxide semiconductor film 208b. Typically, the difference between the energy level of the conduction band minimum of the oxide semiconductor film 208b and that of each of the oxide semiconductor films 208a and 208c is 0.15 eV or more or 0.5 eV or more, and 2 eV or less or 1 eV or less. That is, the difference between the electron affinity of each of the oxide semiconductor films 208a and 208c and that of the oxide semiconductor film 208b is 0.15 eV or more or 0.5 eV or more, and 2 eV or less or 1 eV or less.

In such a structure, the oxide semiconductor film 208b serves as a main current path. In other words, the oxide semiconductor film 208b functions as a channel region, and the oxide semiconductor films 208a and 208c function as oxide insulating films. In addition, since the oxide semiconductor films 208a and 208c contain one or more metal elements contained in the oxide semiconductor film 208b in which a channel region is formed, interface scattering is less likely to occur at the interface between the oxide semiconductor film 208a and the oxide semiconductor film 208b or the interface between the oxide semiconductor film 208b and the oxide semiconductor film 208c. Thus, the transistor can have high field-effect mobility because the movement of carriers is not hindered at the interface.

To prevent the oxide semiconductor films 208a and 208c from functioning as part of the channel region, a material having sufficiently low conductivity is used for the oxide semiconductor films 208a and 208c. Considering their properties and/or functions, the oxide semiconductor films 208a and 208c can also be referred to as oxide insulating films. A material used for the oxide semiconductor films 208a and 208c has a lower electron affinity (a difference between the vacuum level and the energy level of the conduction band minimum) than the material of the oxide semiconductor film 208b and is selected such that a difference (band offset) exists between the energy level of the conduction band minimum of each of the oxide semiconductor films 208a and 208c and that of the oxide semiconductor film 208b. Furthermore, to prevent the threshold voltage from varying depending on the drain voltage, the oxide semiconductor films 208a and 208c is preferably formed using a material whose energy level of the conduction band minimum is closer to the vacuum level than that of the material of the oxide semiconductor film 208b by 0.2 eV or more, further preferably 0.5 eV or more.

It is preferable that neither of the oxide semiconductor films 208a and 208c have a spinel crystal structure for the following reason. If the oxide semiconductor film 208a or 208c has a spinel crystal structure, constituent elements of the conductive films 212a and 212b might diffuse into the oxide semiconductor film 208b through the interface between the spinel crystal structure and another region. Note that each of the oxide semiconductor films 208a and 208c is preferably a CAAC-OS film, in which case a higher blocking property against constituent elements of the conductive films 212a and 212b, for example, copper, is obtained.

Each of the oxide semiconductor films 208a and 208c has a thickness with which diffusion of the constituent elements of the conductive films 212a and 212b into the oxide semiconductor film 208b can inhibited and oxygen supply from the insulating film 214 to the oxide semiconductor film 208b is not hindered. For example, when the thickness of each of the oxide semiconductor films 208a and 208c is greater than or equal to 10 nm, diffusion of the constituent elements of the conductive films 212a and 212b into the oxide semiconductor film 208b can be inhibited. When the thickness of each of the oxide semiconductor films 208a and 208c is less than or equal to 100 nm, oxygen can be effectively supplied from the insulating film 214 to the oxide semiconductor film 208b.

One embodiment of the present invention is not limited to the example described in this embodiment, in which an oxide semiconductor film formed using a metal oxide target having an atomic ratio of metal elements of In:Ga:Zn=1:1:1.2 is used as each of the oxide semiconductor films 208a and 208c. For example, an oxide semiconductor film formed using a metal oxide target having an atomic ratio of In:Ga:Zn=1:1:1, 1:3:2, 1:3:4, or 1:3:6 may be used as each of the oxide semiconductor films 208a and 208c.

When the oxide semiconductor films 208a and 208c are formed using a metal oxide target having an atomic ratio of In:Ga:Zn=1:1:1, the oxide semiconductor films 208a and 208c have an atomic ratio of In:Ga:Zn=$\beta1$ (0<$\beta1$≤2):$\beta2$ (0<$\beta2$≤3) in some cases. When the oxide semiconductor films 208a and 208c are formed using a metal oxide target having an atomic ratio of In:Ga:Zn=1:3:4, the oxide semiconductor films 208a and 208c have an atomic ratio of In:Ga:Zn=1:$\beta3$ (1≤$\beta3$≤5):$\beta4$ (2≤$\beta4$≤6) in some cases. When the oxide semiconductor films 208a and 208c are formed using a metal oxide target having an atomic ratio of In:Ga:Zn=1:3:6, the oxide semiconductor films 208a and 208c have an atomic ratio of In:Ga:Zn=1:/35 (1≤$\beta5$≤5):$\beta6$ (4≤$\ominus\beta6$≤8) in some cases.

Figure 37A:
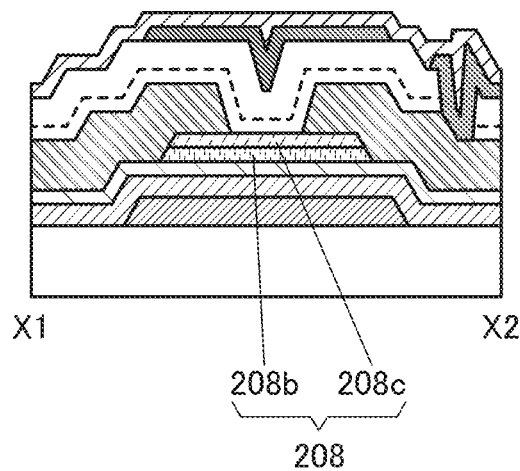
FIGS. 37A and 37B are cross-sectional views illustrating an example of a transistor.
Figure 37B:
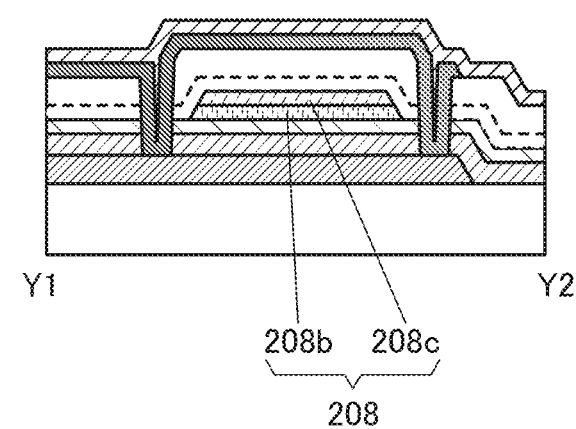

The drawings illustrate an example in which the oxide semiconductor film 208 included in the transistor 270 and the oxide semiconductor film 208c included in the transistors 270A and 270B have a small thickness in a region which overlaps with neither the conductive film 212a nor the conductive film 212b, that is, an example in which part of the oxide semiconductor film has a depressed portion. However, one embodiment of the present invention is not limited thereto, and the oxide semiconductor film does not necessarily have a depressed portion in a region which overlaps with neither the conductive film 212a nor the conductive film 212b. FIGS. 37A and 37B illustrate an example of this case. FIGS. 37A and 37B are cross-sectional views illustrating an example of the transistor. The transistor 270B in FIGS. 37A and 37B has the same structure as that described above except that the oxide semiconductor film 208 does not have a depressed portion.

The structures of the transistors of this embodiment can be freely combined with each other.

The structures and the methods described in this embodiment can be combined as appropriate with any of the structures and the methods described in the other embodiments.

Embodiment 11

In this embodiment, an example of a display device which includes the transistor described in the above embodiment will be described below with reference to FIG. 38 and FIG. 39.

<Outline>

Figure 38:
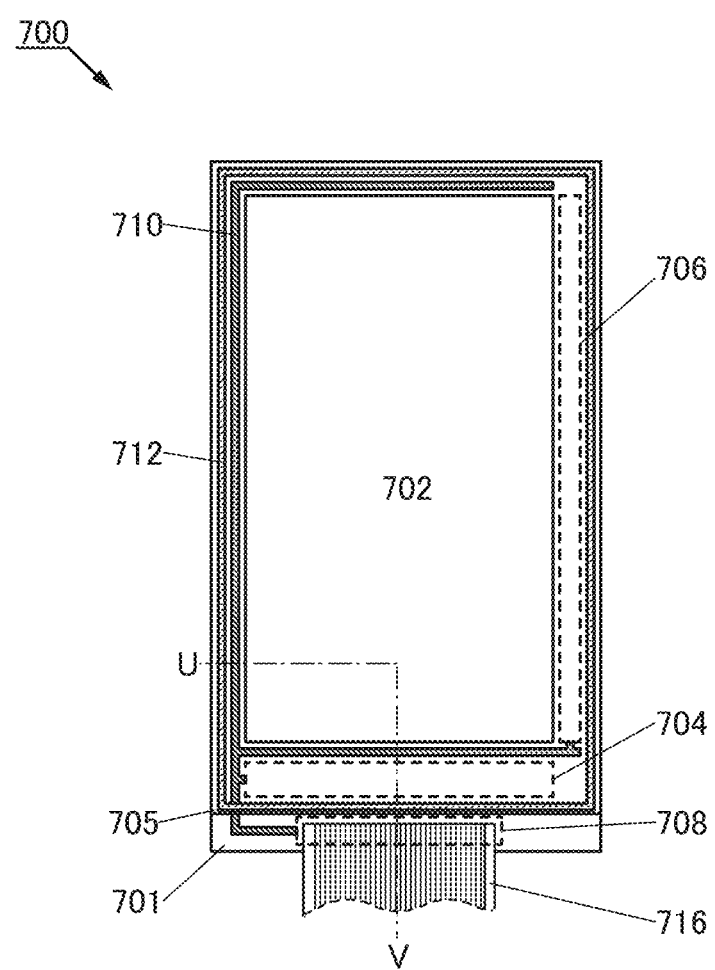
FIG. 38 is a top view illustrating one embodiment of a display device.

FIG. 38 is a top view illustrating an example of a display device. A display device 700 in FIG. 38 includes a pixel portion 702 provided over a first substrate 701, a source driver circuit portion 704 and a gate driver circuit portion 706 which are provided over the first substrate 701, a sealant 712 provided to surround the pixel portion 702, the source driver circuit portion 704, and the gate driver circuit portion 706, and a second substrate 705 provided to face the first substrate 701. The first substrate 701 and the second substrate 705 are sealed with the sealant 712. That is, the pixel portion 702, the source driver circuit portion 704, and the gate driver circuit portion 706 are enclosed by the first substrate 701, the sealant 712, and the second substrate 705. Although not illustrated in FIG. 38, a display element is provided between the first substrate 701 and the second substrate 705.

In the display device 700, a flexible printed circuit (FPC) terminal portion 708 which is electrically connected to the pixel portion 702, the source driver circuit portion 704, and the gate driver circuit portion 706 is provided in a region different from the region which is over the first substrate 701 and surrounded by the sealant 712. Furthermore, an FPC 716 is connected to the FPC terminal portion 708, and a variety of signals and the like are supplied from the FPC 716 to the pixel portion 702, the source driver circuit portion 704, and the gate driver circuit portion 706. Furthermore, a wiring 710 is connected to the pixel portion 702, the source driver circuit portion 704, the gate driver circuit portion 706, and the FPC terminal portion 708. Through the wiring 710, a variety of signals and the like are supplied from the FPC 716 to the pixel portion 702, the source driver circuit portion 704, the gate driver circuit portion 706, and the FPC terminal portion 708.

A plurality of gate driver circuit portions 706 may be provided in the display device 700. In the display device 700 shown as an example, the source driver circuit portion 704 and the gate driver circuit portion 706 as well as the pixel portion 702 are formed over the first substrate 701; however, the structure is not limited thereto. For example, only the gate driver circuit portion 706 may be formed over the first substrate 701 or only the source driver circuit portion 704 may be formed over the first substrate 701. In this case, a substrate over which a source driver circuit, a gate driver circuit, or the like is formed (e.g., a driver circuit board formed using a single crystal semiconductor film or a polycrystalline semiconductor film) may be mounted on the first substrate 701. Note that there is no particular limitation on the method for connecting the separately prepared driver circuit board, and a chip on glass (COG) method, a wire bonding method, or the like can be used.

The structure of the semiconductor device described in Embodiment 6 can be applied to a plurality of transistors and capacitors included in the pixel portion 702 of the display device 700. In addition, the structure of the semiconductor device described in Embodiment 7 can be applied to a plurality of transistors and wiring contact portions included in the source driver circuit portion 704 and the gate driver circuit portion 706.

<Display Element>

The display device 700 can employ various modes and include various display elements. Examples of the display element include a liquid crystal element, an electroluminescence (EL) element (an EL element including organic and inorganic materials, an organic EL element, or an inorganic EL element) including an LED (e.g., a white LED, a red LED, a green LED, or a blue LED), a transistor (a transistor that emits light depending on current), an electron emitter, an electrophoretic element, a display element using micro electro mechanical systems (MEMS), such as a grating light valve (GLV), a digital micromirror device (DMD), a digital micro shutter (DMS) element, a MIRASOL (registered trademark) display, an interferometric modulator display (IMOD) element, or a piezoelectric ceramic display, and an electrowetting element. Besides, a display medium whose contrast, luminance, reflectivity, transmittance, or the like is changed by electrical or magnetic effect may be included. Alternatively, quantum dots may be used as the display element. An example of a display device including a liquid crystal element is a liquid crystal display (a transmissive liquid crystal display, a transflective liquid crystal display, a reflective liquid crystal display, a direct-view liquid crystal display, or a projection liquid crystal display). An example of a display device including an EL element is an EL display. Examples of a display device including an electron emitter include a field emission display (FED) and an SED-type flat panel display (SED: surface-conduction electron-emitter display). An example of a display device including quantum dots is a quantum dot display. An example of a display device including electronic ink or an electrophoretic element is electronic paper. In a transflective liquid crystal display or a reflective liquid crystal display, some or all of pixel electrodes may function as reflective electrodes. For example, some or all of pixel electrodes may contain aluminum, silver, or the like. In this case, a memory circuit such as an SRAM can be provided under the reflective electrodes, leading to lower power consumption.

<Display System>

As a display system of the display device 700, a progressive system, an interlace system, or the like can be employed. Furthermore, color elements controlled in pixels at the time of color display are not limited to three colors: R, G, and B (R, G, and B correspond to red, green, and blue, respectively). For example, four pixels of an R pixel, a G pixel, a B pixel, and a W (white) pixel may be used. Alternatively, a color element may be composed of two colors of R, G, and B as in PenTile layout. The two colors may differ between color elements. Alternatively, one or more colors of yellow, cyan, magenta, and the like may be added to RGB. Note that the size of a display region may differ between dots of color elements. Embodiments of the disclosed invention are not limited to a color display device; the disclosed invention can also be applied to a monochrome display device.

<Color Display Method>

A color film (also referred to as a color filter) may be used to obtain a full-color display device in which white light (W) is used for a backlight (e.g., an organic EL element, an inorganic EL element, an LED, or a fluorescent lamp). For example, a red (R) color film, a green (G) color film, a blue (B) color film, and a yellow (Y) color film may be combined as appropriate. With the use of the color film, high color reproducibility can be obtained as compared with the case without the color film. Here, by providing a region with a color film and a region without a color film, white light in the region without the color film may be directly utilized for display. By partly providing the region without a color film, a decrease in the luminance of a bright image due to the color film can be suppressed, and approximately 20% to 30% of power consumption can be reduced in some cases. In the case where full-color display is performed using a self-luminous element such as an organic EL element or an inorganic EL element, elements may emit light in their respective colors R, B, Y, and W. By using a self-luminous element, power consumption may be further reduced as compared with the case of using a color film.

<Structure>

In this embodiment, the structure of a display device including a liquid crystal element as a display element will be described with reference to FIG. 39.

Figure 39:
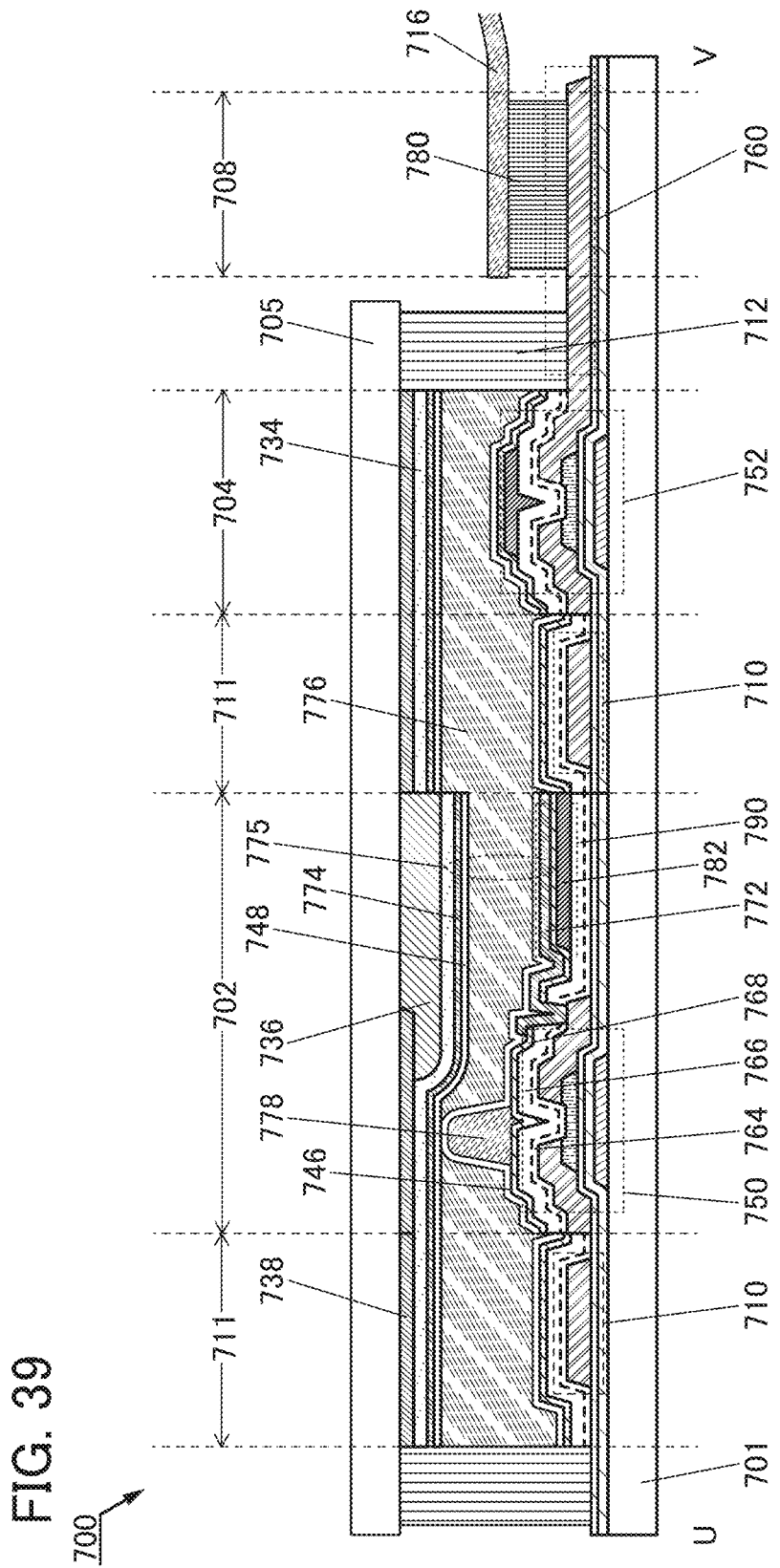
FIG. 39 is a cross-sectional view illustrating one embodiment of a display device.

FIG. 39 is a cross-sectional view taken along dashed dotted line U-V in FIG. 38. The display device 700 in FIG. 39 includes a lead wiring portion 711, the pixel portion 702, the source driver circuit portion 704, and the FPC terminal portion 708. The lead wiring portion 711 includes the wiring 710. The pixel portion 702 includes a transistor 750 and a capacitor 790. The source driver circuit portion 704 includes a transistor 752.

For example, the transistor 150 described in Embodiment 7 can be used as the transistor 750. The transistor 151 described in Embodiment 8 can be used as the transistor 752.

The transistor used in this embodiment includes an oxide semiconductor film which is highly purified and in which formation of an oxygen vacancy is suppressed. The transistor can have low current in the off state (off-state current). Accordingly, an electrical signal such as an image signal can be held for a long time, and a long writing interval can be set in the on state. Accordingly, the frequency of refresh operation can be reduced, which suppresses power consumption.

In addition, the transistor used in this embodiment can have relatively high field-effect mobility and thus is capable of high-speed operation. For example, in a liquid crystal display device which includes such a transistor capable of high-speed operation, a switching transistor in a pixel portion and a driver transistor in a driver circuit portion can be formed over one substrate. That is, no additional semiconductor device formed using a silicon wafer or the like is needed as a driver circuit; therefore, the number of components of the semiconductor device can be reduced. In addition, the transistor capable of high-speed operation can also be used in the pixel portion, whereby a high-quality image can be provided.

The capacitor 160 described in Embodiment 6 can be used as the capacitor 790. Since the capacitor 790 transmits light, the capacitor 790 can be formed large (in a large area) in a pixel included in the pixel portion 702. Accordingly, the display device can have a large capacitance as well as a high aperture ratio.

In FIG. 39, insulating films 764, 766, and 768 are provided over the transistor 750.

The insulating films 764, 766, and 768 can be formed using materials and methods similar to those of the insulating films 114, 116, and 118, respectively, which are described in Embodiment 7. A planarization film may be provided over the insulating film 768. The planarization film can be formed using a material and a method similar to those of the insulating film 119 described in Embodiment 8.

The wiring 710 is formed in the same process as conductive films functioning as source electrodes and drain electrodes of the transistors 750 and 752. As the wiring 710, a conductive film formed in a process different from that of the source electrodes and the drain electrodes of the transistors 750 and 752, for example, a conductive film formed in the same process as a conductive film functioning as a gate electrode may be used. In the case where the wiring 710 is formed using a material containing copper, signal delay or the like due to wiring resistance is reduced, which enables display on a large screen.

The FPC terminal portion 708 includes a connection electrode 760, an anisotropic conductive film 780, and the FPC 716. Note that the connection electrode 760 is formed in the same process as the conductive films functioning as source electrodes and drain electrodes of the transistors 750 and 752. The connection electrode 760 is electrically connected to a terminal included in the FPC 716 through the anisotropic conductive film 780.

For example, glass substrates can be used as the first substrate 701 and the second substrate 705. The first substrate 701 and the second substrate 705 can be formed using a material similar to that of the substrate 102 described in Embodiment 7.

A light-blocking film 738 functioning as a black matrix, a color film 736 functioning as a color filter, and an insulating film 734 in contact with the light-blocking film 738 and the color film 736 are provided on the second substrate 705 side.

A structure 778 is provided between the first substrate 701 and the second substrate 705. The structure 778 is a columnar spacer obtained by selective etching of an insulating film and is provided to control the distance (cell gap) between the first substrate 701 and the second substrate 705. Alternatively, a spherical spacer may be used as the structure 778.

One embodiment of the present invention is not limited to the structure described in this embodiment, in which the structure 778 is provided on the first substrate 701 side. For example, the structure 778 may be provided on the second substrate 705 side, or both of the first substrate 701 and the second substrate 705 may be provided with the structure 778.

The display device 700 includes a liquid crystal element 775. The liquid crystal element 775 includes a conductive film 772, a conductive film 774, and a liquid crystal layer 776. The conductive film 774 is provided on the side of the second substrate 705 facing the first substrate 701 and functions as a counter electrode. The display device 700 can display an image in such a manner that transmission or non-transmission of light is controlled by the alignment state in the liquid crystal layer 776 which is changed depending on the voltage applied to between the conductive film 772 and the conductive film 774.

The conductive film 772 is connected to the conductive film functioning as a source electrode or a drain electrode of the transistor 750. The conductive film 772 is formed over the insulating film 768 and functions as a pixel electrode, that is, one electrode of the display element. The display device 700 is a transmissive color liquid crystal display device in which a backlight, a side light, or the like is provided on the first substrate 701 side to perform display through the liquid crystal element 775 and the color film 736.

An oxide semiconductor film 782 is provided under the conductive film 772 with the insulating film 768 positioned therebetween and serves as the other electrode of the capacitor 790.

A conductive film that transmits visible light or a conductive film that reflects visible light can be used as each of the conductive films 772 and 774. For example, a material containing an element selected from indium (In), zinc (Zn), and tin (Sn) may be used for the conductive film that transmits visible light. The conductive film 772 and the conductive film 774 can be formed using a material similar to that of the conductive film 120 described in Embodiment 6. The oxide semiconductor film 782 can be formed using a material similar to that of the second oxide semiconductor film 111 described in Embodiment 6.

For example, the display device 700 in FIG. 38 and FIG. 39 may be, but not limited to, a transmissive color liquid crystal display device in which a conductive film that transmits visible light is used as the conductive film 772, a reflective color liquid crystal display device in which a conductive film that reflects visible light is used as the conductive film 772, or a transflective color liquid crystal display device in which a reflective film and a transmissive film are used in combination.

Although not illustrated in FIG. 39, an optical member (optical substrate) or the like, such as a polarizing member, a retardation member, or an anti-reflection member, may be provided as appropriate. For example, circular polarization may be obtained by using a polarizing substrate and a retardation substrate.

Figure 41:
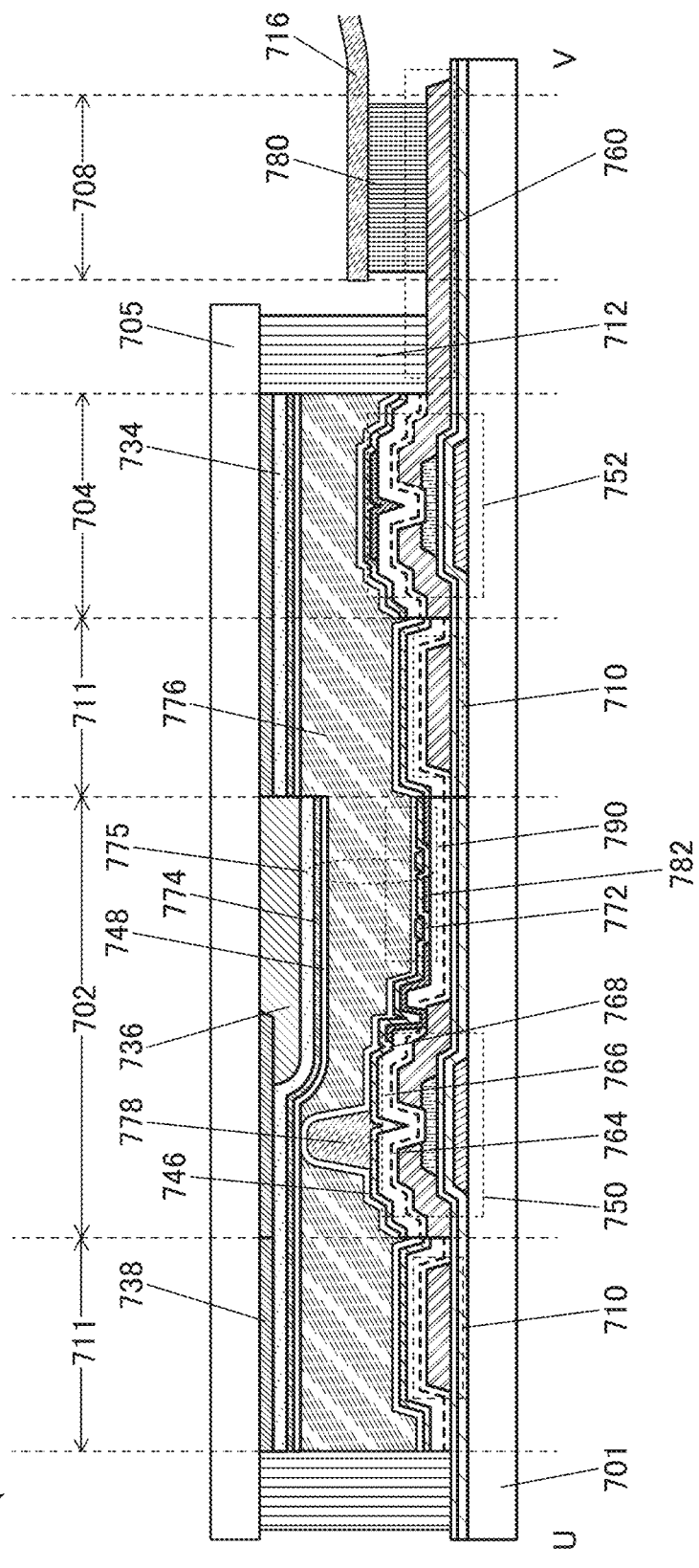
FIG. 41 is a cross-sectional view illustrating one embodiment of a display device.

In the method employed in FIG. 39, an image is displayed in such a manner that the alignment state in the liquid crystal layer 776 is changed by the voltage applied between the conductive film 772 and the conductive film 774 to control transmission or non-transmission of light; however, the following method may also be employed: an image is displayed in such a manner that the alignment state in the liquid crystal layer 776 is changed by a horizontal electric field (an electric field that is substantially parallel to the first substrate 701) generated between the conductive film 772 and the oxide semiconductor film 782 to control transmission or non-transmission of light (see FIG. 41). In the latter method, although the alignment state in the liquid crystal layer can be changed simply with the conductive film 772 and the oxide semiconductor film 782, alignment disorder in the liquid crystal layer 776 can be suppressed by supplying a potential to the conductive film 774 provided on the second substrate 705 side.

Here, the above-mentioned horizontal electric field and the alignment disorder in the liquid crystal layer will be described with reference to FIG. 1, FIG. 41, and FIG. 42.

Figure 42:
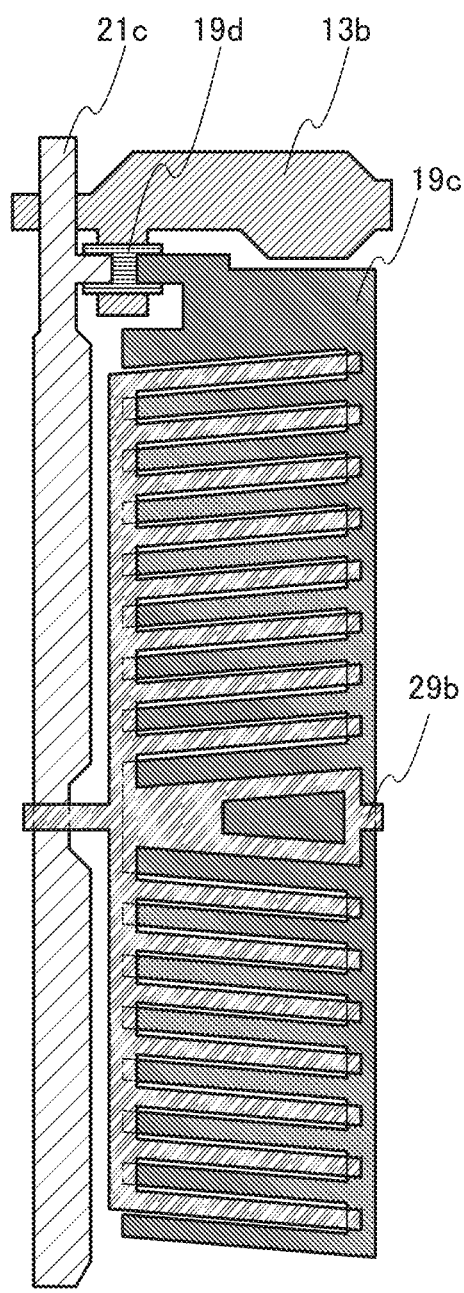
FIG. 42 is a top view illustrating one embodiment of a pixel of a display device.

For example, in the electrode layout in FIG. 1 of Embodiment 1, alignment disorder in the liquid crystal layer 776 is likely to be caused by an electric field from the conductive film 21a to the oxide semiconductor film 19b, and in the electrode layout in FIG. 42, alignment disorder is likely to be caused by an electric field from a conductive film 21c to an oxide semiconductor film 19c. However, by supplying a potential to the conductive film 774 provided on the second substrate 705 side, the extension of the electric field from the conductive film 21a or the conductive film 21c can be suppressed; thus, light leakage due to the alignment disorder in the liquid crystal layer 776 is reduced, which leads to an improvement in the display quality of the display device. Note that the oxide semiconductor film 19c and a conductive film 29b in FIG. 42 function as a pixel electrode and a common electrode, respectively. In addition, a conductive film 13b functions as a scan line, and a channel region is formed in an oxide semiconductor film 19d.

Figure 40:
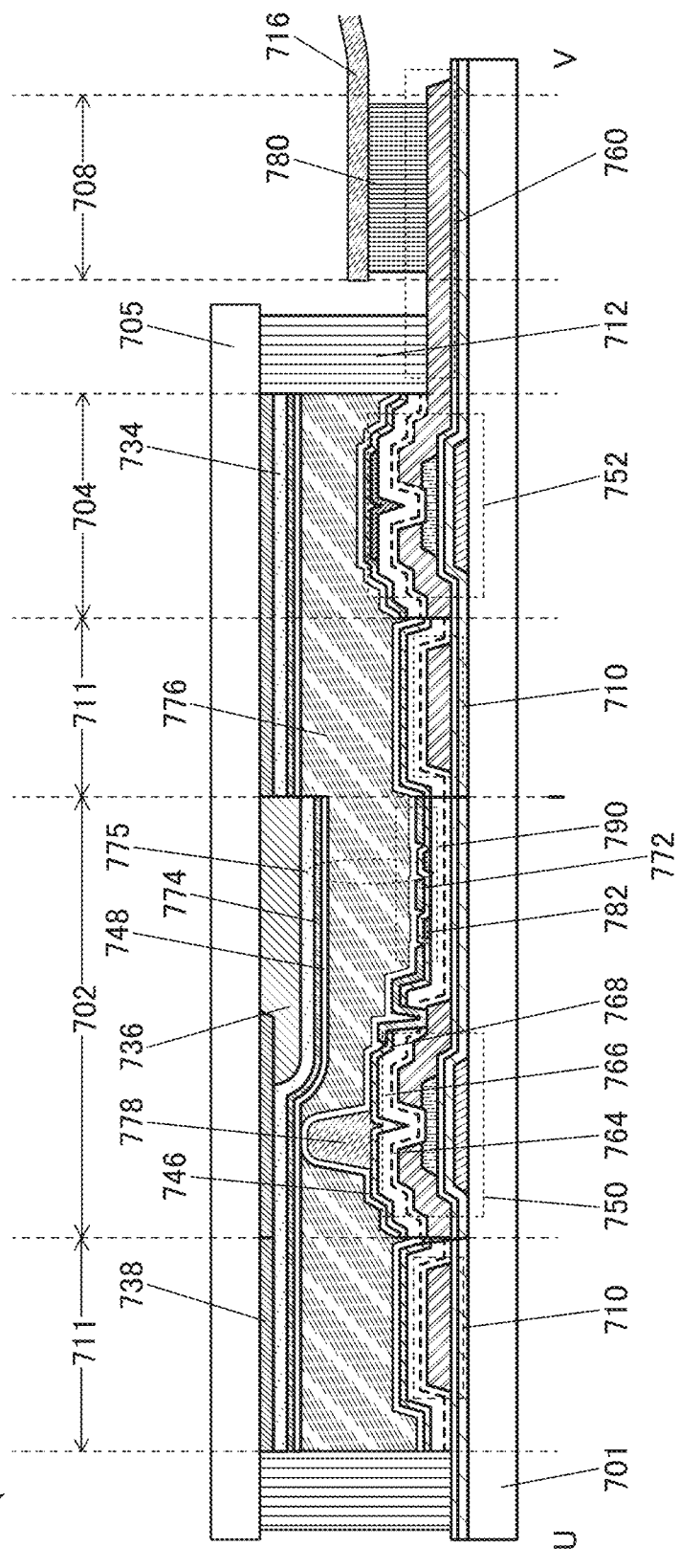
FIG. 40 is a cross-sectional view illustrating one embodiment of a display device.

In FIG. 41, the conductive film 772 is formed over the oxide semiconductor film 782 with the insulating film 768 positioned therebetween. Although FIG. 41 illustrates an example in which the conductive film 772 and the oxide semiconductor film 782 function as a common electrode and a pixel electrode, respectively, the oxide semiconductor film 782 and the conductive film 772 may function as a common electrode and a pixel electrode, respectively (see FIG. 40).

<Outer Protective Film>

Figure 43:
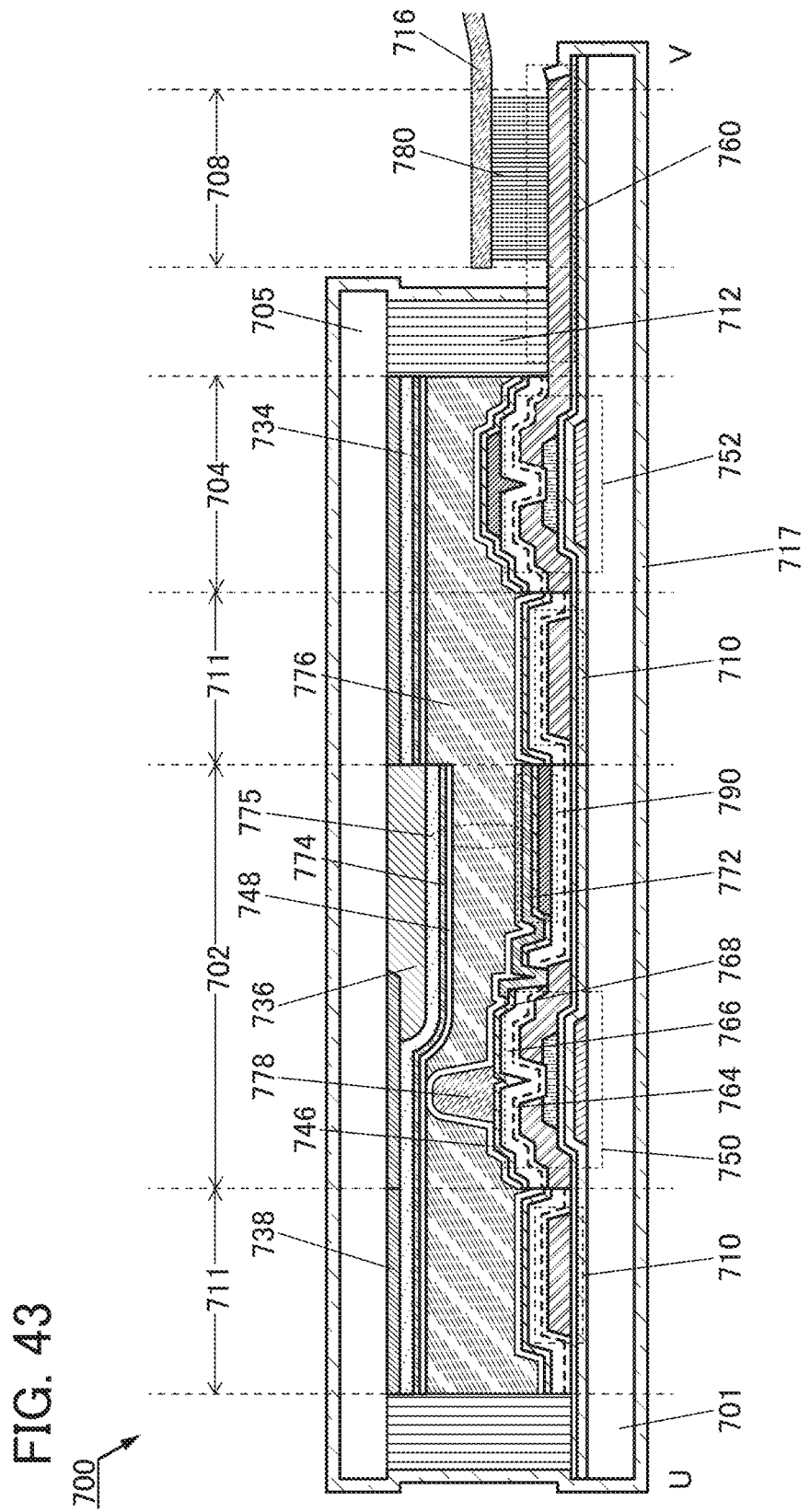
FIG. 43 is a cross-sectional view illustrating one embodiment of a display device.

As illustrated in FIG. 43, a protective film 717 may be formed on the outer surface of the display device 700. The protective film 717 is preferably deposited by an atomic layer deposition method (hereinafter referred to as an ALD method), for example.

An ALD method enables a film to be deposited extremely uniformly on a deposition surface. By an ALD method, for example, aluminum oxide, hafnium oxide, zirconium oxide, titanium oxide, zinc oxide, indium oxide, tin oxide, indium tin oxide (ITO), tantalum oxide, silicon oxide, manganese oxide, nickel oxide, erbium oxide, cobalt oxide, tellurium oxide, barium titanate, titanium nitride, tantalum nitride, aluminum nitride, tungsten nitride, cobalt nitride, manganese nitride, or hafnium nitride can be deposited as the protection film. Furthermore, the protective film is not limited to an insulating film, and a conductive film may also be deposited. For example, ruthenium, platinum, nickel, cobalt, manganese, or copper can be deposited.

Furthermore, a portion for electrical connection, such as the FPC terminal portion 708, is preferably masked so that the protective film 717 is not deposited on the portion. For the masking, an organic film, an inorganic film, a metal, or the like can be used. For example, an oxide insulating film containing silicon oxide, silicon oxynitride, gallium oxide, gallium oxynitride, yttrium oxide, yttrium oxynitride, hafnium oxide, hafnium oxynitride, or the like, a nitride insulating film containing silicon nitride, aluminum nitride, or the like, or an organic material such as a photoresist, a polyimide resin, an acrylic resin, a polyimide amide resin, a benzocyclobutene resin, a polyamide resin, or an epoxy resin can be used. A mask formed using a film containing any of these materials can be removed after the deposition of the protective film.

Alternatively, a region on which the protective film is to be deposited by an ALD method can also be masked with a metal mask. The metal mask can be formed using a metal element selected from iron, chromium, nickel, cobalt, tungsten, molybdenum, aluminum, copper, tantalum, and titanium, an alloy containing the metal element as its component, an alloy containing the metal elements in combination, or the like. The metal mask can be positioned close to or in contact with the display panel.

A film formed by an ALD method can be extremely uniform and dense. When the protective film 717 is formed on the side surface portion of the display panel by an ALD method, entry of an external component such as moisture can be inhibited. As a result, a change in transistor characteristics can be suppressed and a peripheral circuit can operate stably. Moreover, the frame size can be reduced, the pixel region can be enlarged, and the resolution of the display device can be increased.

The description of the liquid crystal used for the liquid crystal element 51 in Embodiment 1 can be referred to for liquid crystal used for the liquid crystal layer 776.

In addition, any of driving methods described in Embodiments 6 and 13 can be used as a driving method of the display device including the liquid crystal element.

The structures described in this embodiment can be combined as appropriate with any of the structures described in the other embodiments.

Embodiment 12

<Top-Gate Transistor>

In this embodiment, other structural examples of a display device that can be used as the transmissive display device described in the above embodiment will be described.

Figure 44A:
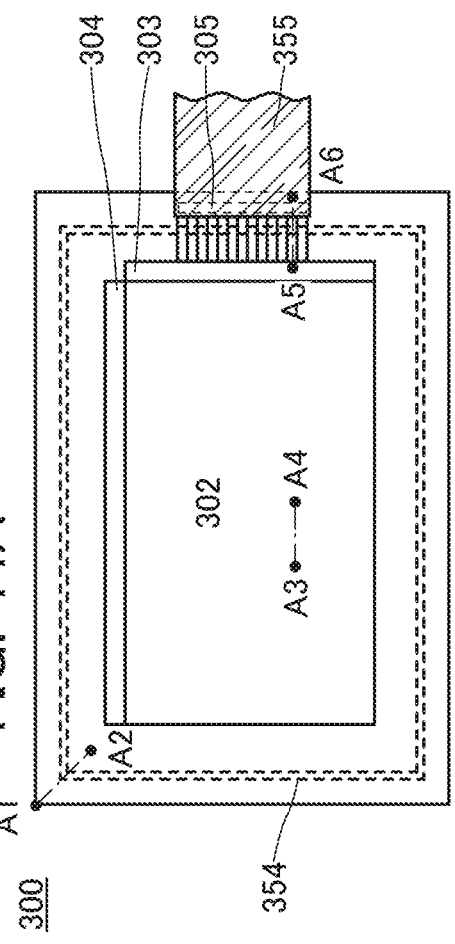
FIGS. 44A and 44B are a top view and a cross-sectional view, respectively, which illustrate one embodiment of a display device.
Figure 44B:
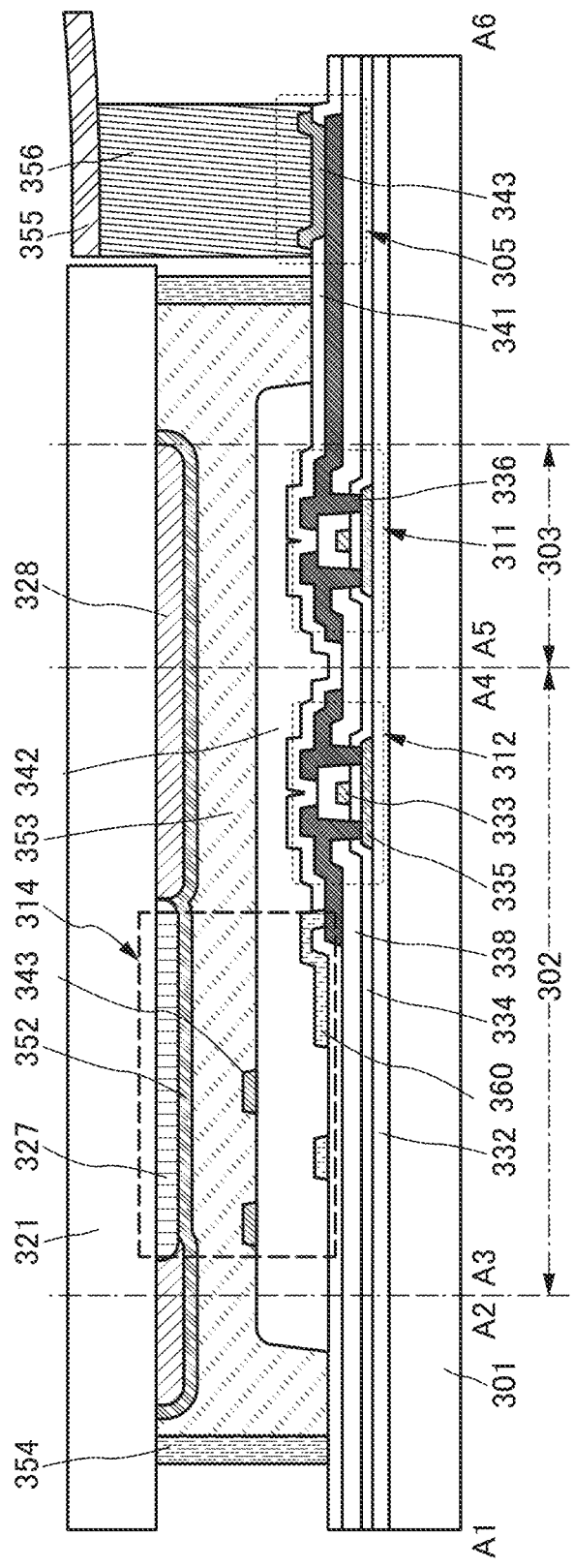

FIG. 44A shows a schematic top view of a display device 300. FIG. 44B shows schematic cross-sectional views taken along lines A1-A2, A3-A4, and A5-A6 in FIG. 44A. Note that FIG. 44A does not illustrate some components for clarity.

The display device 300 includes, over a top surface of a substrate 301, a display portion 302, a signal line driver circuit 303, a scan line driver circuit 304, and an external connection terminal 305.

The display portion 302 includes a liquid crystal element 314. In the liquid crystal element 314, the alignment of liquid crystal is controlled by an electric field generated in the direction parallel to the substrate surface.

The display device 300 includes an insulating layer 332, an insulating layer 334, an insulating layer 338, an insulating layer 341, an insulating layer 342, a transistor 311, a transistor 312, the liquid crystal element 314, an electrode 343, an electrode 352, an electrode 360, liquid crystal 353, a color filter 327, a light-blocking layer 328, and the like.

A pixel includes at least one switching transistor 312 and a storage capacitor formed of the electrode 343 and the electrode 360. The electrode 343 is electrically connected to one of a source electrode and a drain electrode of the transistor 312.

The electrode 352 is provided on the color filter 327.

Either a light-transmitting conductive material or a reflective conductive material may be used for the electrode 343.

The color filter 327 is provided to overlap with the electrode 343, the electrode 352, and the electrode 360. The light-blocking layer 328 is provided to cover a side surface of the color filter 327. Although being provided on the substrate 321 in FIG. 44B, the color filter 327 is not necessarily located in this position.

The liquid crystal 353 is provided between the substrate 301 and the substrate 321. An image can be displayed in the following manner: voltage is applied between the electrode 343 and the electrode 360 to generate an electric field, the alignment of the liquid crystal 353 is controlled by the electric field, and polarization of light is controlled in each pixel. In the case where the electrode 343 is a reflective electrode, an image can be displayed while the amount of incident light that is reflected is controlled.

Alignment films for controlling the alignment of the liquid crystal 353 are preferably provided on surfaces in contact with the liquid crystal 353. A light-transmitting material is used for the alignment films. Although not illustrated here, polarizing plates are provided on surfaces of the substrate 321 and the substrate 301 which do not face the liquid crystal element 314.

As the liquid crystal 353, thermotropic liquid crystal, low-molecular liquid crystal, high-molecular liquid crystal, ferroelectric liquid crystal, anti-ferroelectric liquid crystal, or the like can be used. Moreover, liquid crystal exhibiting a blue phase is preferably used because an alignment film is not needed and a wide viewing angle is obtained.

In the case where an image is displayed using the liquid crystal element 314, the electrode 352, which may be provided as needed, improves the alignment of the liquid crystal in some cases. FIG. 44B illustrates the case where the electrode 352 is provided. In this case, a light-transmitting conductive material is preferably used for the electrode 352 because the aperture ratio of the pixel can be increased.

A low-viscosity and high-fluidity material is preferably used for the liquid crystal 353.

Note that the liquid crystal element of this structural example can operate in a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an anti-ferroelectric liquid crystal (AFLC) mode, or the like.

The transistors (e.g., the transistor 311 and the transistor 312) provided in the display device 300 are top-gate transistors. Each of the transistors includes a semiconductor layer 335, the insulating layer 334 functioning as a gate insulating layer, and a gate electrode 333. In addition, the insulating layer 338 is provided to cover the gate electrode 333. A pair of electrodes 336 is provided in contact with the semiconductor layer 335 through openings in the insulating layer 334 and the insulating layer 338.

Here, an oxide semiconductor is preferably used for the semiconductor layer 335. As the oxide semiconductor, for example, the oxide semiconductor described in the above embodiment can be used.

The semiconductor layer 335 may include a region functioning as a source region or a drain region which has lower resistance than a region functioning as a channel. For example, the source region and the drain region can be provided such that they are in contact with the pair of electrodes 336 or that the region functioning as a channel is positioned between the source region and the drain region. For example, the source region and the drain region may be regions whose resistivity is controlled by the method described in the above embodiment.

By using an oxide semiconductor for the semiconductor layer 335, transistors with little variation can be formed at a low temperature in a large area, as compared with the case of using polycrystalline silicon, for example.

An oxide semiconductor may also be used for the electrode 360.

In one embodiment of the present invention, an active matrix display device in which a pixel includes an active element or a passive matrix display device in which a pixel includes no active element can be employed.

As an active element (a non-linear element) in an active matrix display device, not only a transistor but also various active elements (non-linear elements) can be used. For example, a metal insulator metal (MIM) or a thin film diode (TFD) can also be used. Since such an element can be manufactured with a small number of steps, manufacturing cost can be reduced or yield can be improved. Since the size of the element is small, the aperture ratio can be improved, so that power consumption can be reduced or higher luminance can be achieved.

Besides the active matrix display device, a passive matrix display device in which no active element (non-linear element) is used may be employed. Since no active element (non-linear element) is used, the number of manufacturing steps is small, so that manufacturing cost can be reduced or yield can be improved. Since no active element (non-linear element) is used, the aperture ratio can be improved, so that power consumption can be reduced or higher luminance can be achieved, for example.

Note that this embodiment can be combined as appropriate with any of the other embodiments in this specification.

Embodiment 13

In this embodiment, a display device of one embodiment of the present invention and a method for driving the display device will be described with reference to FIGS. 45A and 45B, FIGS. 46A and 46B, FIGS. 47A to 47E, and FIGS. 48A to 48E.

Note that the display device of one embodiment of the present invention may include an information processing portion, an arithmetic portion, a memory portion, a display portion, an input portion, and the like.

The power consumption of the display device of one embodiment of the present invention can be reduced by reducing the number of times of writing signals of the same image (still image) that is displayed continuously (also referred to as refresh operations). Note that the frequency of refresh operations is referred to as a refresh rate (or scan frequency or vertical synchronization frequency). A display device in which the refresh rate is reduced and which causes little eye fatigue will be described below.

The eye fatigue is classified into two categories: nervous fatigue and muscle fatigue. The nervous fatigue is caused by prolonged looking at light emitted from a display device or blinking images, whose brightness stimulates and fatigues the retina and nerve of the eye and the brain. The muscle fatigue is caused by overuse of a ciliary muscle which works for adjusting the focus.

Figure 45A:
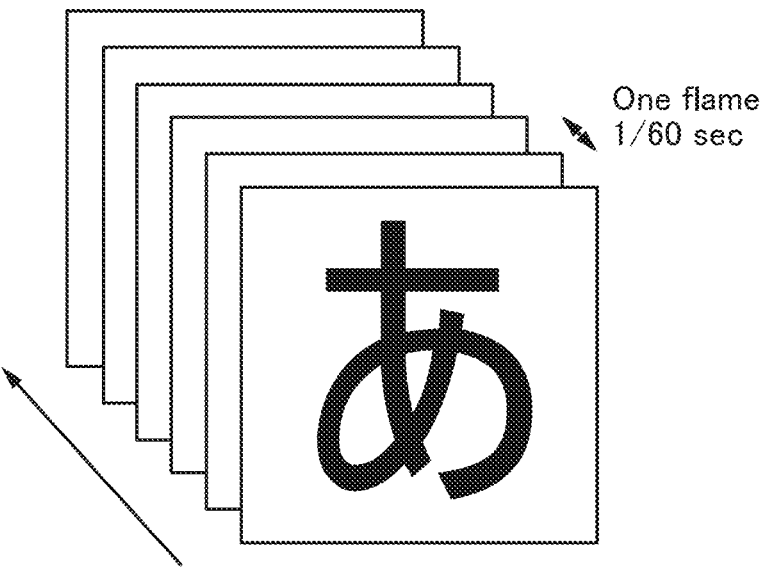
FIGS. 45A and 45B illustrate display on a display device.

FIG. 45A schematically illustrates a display method of a conventional display device. As illustrated in FIG. 45A, in the conventional display device, image rewriting is performed 60 times per second. A prolonged looking at such a screen might stimulate the retina, the optic nerve, and the brain of the user and lead to eye fatigue.

In the display device of one embodiment of the present invention, a transistor including an oxide semiconductor, for example, a transistor including a CAAC-OS is used for a pixel portion. The off-state current of the transistor is extremely low. Thus, the luminance of the display device can be maintained even when the refresh rate is lowered.

Figure 45B:
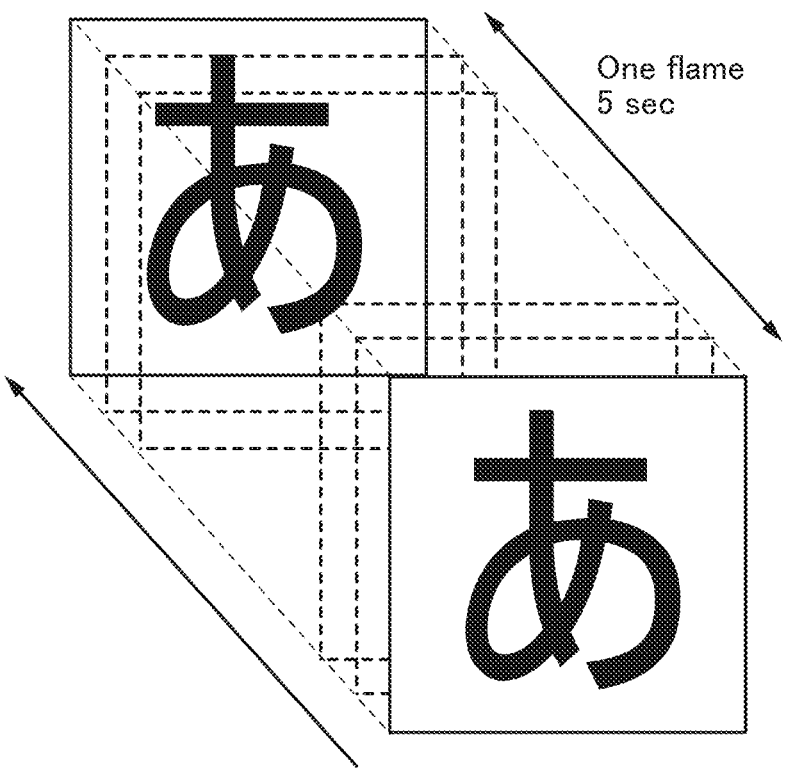

Thus, for example, the number of times of image rewriting can be reduced to once every five seconds as illustrated in FIG. 45B. This enables the user to see the same one image as long as possible, so that flickers on the screen perceived by the user are reduced. Consequently, a stimulus to the retina, the optic nerve, and the brain of the user is reduced, resulting in less nervous fatigue.

Figure 46A:
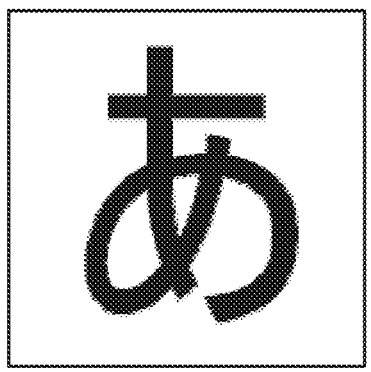
FIGS. 46A and 46B illustrate display on a display device.

In the case where the size of each pixel is large (e.g., the resolution is lower than 150 ppi), a blurred character is displayed on the display device as illustrated in FIG. 46A. When the user looks at the blurred character displayed on the display device for a long time, the ciliary muscle keeps working to adjust the focus with difficulty, which might lead to eye strain.

Figure 46B:
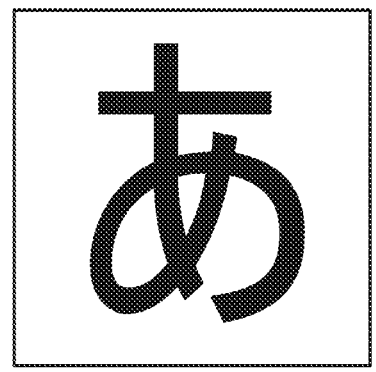

In contrast, as illustrated in FIG. 46B, the display device of one embodiment of the present invention is capable of high-resolution display because the size of each pixel is small; thus, precise and smooth display can be achieved. In this case, the ciliary muscle can easily adjust the focus, so that the muscle fatigue of the user is reduced. When the resolution of the display device is 150 ppi or higher, preferably 200 ppi or higher, further preferably 300 ppi or higher, the muscle fatigue of the user can be effectively reduced.

Methods for quantifying eye fatigue have been studied. For example, critical flicker (fusion) frequency (CFF) is known as an indicator for evaluating nervous fatigue. Furthermore, accommodation time, near point distance, and the like are known as indicators for evaluating muscle fatigue.

Other methods for evaluating eye fatigue include electroencephalography, thermography, counting the number of times of blinking, measuring the amount of tears, measuring the speed of contractile response of the pupil, and questionnaires for surveying subjective symptoms.

For example, the method for driving the display device of one embodiment of the present invention can be examined by any of the variety of methods above.

<Method for Driving Display Device>

A method for driving the display device of one embodiment of the present invention will be described with reference to FIGS. 47A to 47E.

[Display Example of Image Information]

An example in which two images including different image information are displayed while being moved will be described below.

Figure 47A:
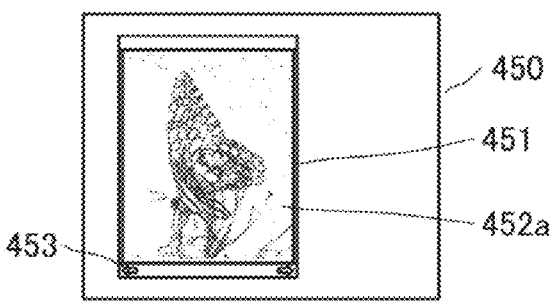
FIGS. 47A to 47E illustrate an example of a method for displaying images on a display device.

In an example illustrated in FIG. 47A, a window 451 and a first image 452a which is a still image displayed in the window 451 are displayed on a display portion 450.

At this time, display is preferably performed at a first refresh rate. Note that the first refresh rate can be higher than or equal to $1.16 \times 10^{-5}$ Hz (about once a day) and lower than or equal to 1 Hz, higher than or equal to $2.78 \times 10^{-4}$ Hz (about once an hour) and lower than or equal to 0.5 Hz, or higher than or equal to $1.67 \times 10^{-2}$ Hz (about once a minute) and lower than or equal to 0.1 Hz.

When the frequency of rewriting the screen is reduced by setting the first refresh rate to an extremely small value, display with substantially no flicker can be achieved, and eye fatigue of the user can be more effectively reduced.

The window 451 is displayed by, for example, executing application software for image display and includes a display region in which an image is displayed.

Furthermore, in a lower part of the window 451, a button 453 for switching displayed image information from one to another. When the user selects the button 453, an instruction for moving an image can be supplied to the information processing portion of the display device.

Note that the way the user operates the display device may be determined in accordance with an input unit. For example, in the case where a touch panel provided to overlap with the display portion 450 is used as an input unit, it is possible to perform a touch operation of the button 453 with a finger, a stylus, or the like or an input operation by a gesture to slide an image. In the case where the input operation is performed by a gesture or sound, the button 453 is not necessarily displayed.

Figure 47B:
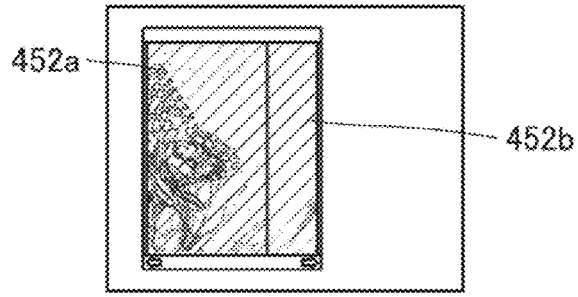

When the information processing portion of the display device receives the instruction for moving an image, movement of the image displayed in the window 451 starts (FIG. 47B).

In the case where display is performed at the first refresh rate in the state in FIG. 47A, the refresh rate is preferably changed to the second refresh rate before the image is moved. The second refresh rate is a value necessary for displaying a moving image. For example, the second refresh rate can be higher than or equal to 30 Hz and lower than or equal to 960 Hz, preferably higher than or equal to 60 Hz and lower than or equal to 960 Hz, further preferably higher than or equal to 75 Hz and lower than or equal to 960 Hz, still further preferably higher than or equal to 120 Hz and lower than or equal to 960 Hz, yet still further preferably higher than or equal to 240 Hz and lower than or equal to 960 Hz.

When the second refresh rate is set to a value larger than that of the first refresh rate, a moving image can be displayed more smoothly and naturally. In addition, a flicker which accompanies rewriting is less likely to be recognized by the user, so that eye fatigue of the user can be reduced.

At this time, an image in which the first image 452a and a second image 452b that is to be displayed next are combined is displayed in the window 451. Part of the combined image is displayed in the window 451 while being moved in one direction (leftward in this case).

As the combined image is moved, the luminance of the image displayed in the window 451 is gradually decreased from the initial luminance (the luminance in the state in FIG. 47A).

Figure 47C:
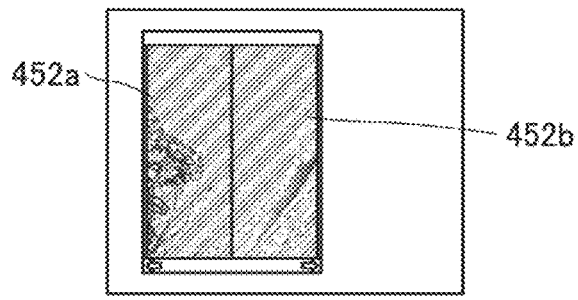

FIG. 47C illustrates a state in which the image displayed in the window 451 reaches predetermined coordinates. Thus, the luminance of the image displayed in the window 451 is lowest at this time.

The predetermined coordinates in FIG. 47C are set to, but not limited to, coordinates where half of the first image 452a and half of the second image 452b are displayed; it is preferable that the user be able to set the predetermined coordinates freely.

For example, the predetermined coordinates may be set such that the ratio of the distance from the initial coordinates of the image to the distance between the initial coordinates and the final coordinates is higher than 0 and lower than 1.

It is also preferable that the user be able to freely set the luminance at the time when the image reaches the predetermined coordinates. For example, the ratio of the luminance at the time when the image reaches the predetermined coordinates to the initial luminance may be higher than or equal to 0 and lower than 1, preferably higher than or equal to 0 and lower than or equal to 0.8, further preferably higher than or equal to 0 and lower than or equal to 0.5.

Figure 47D:
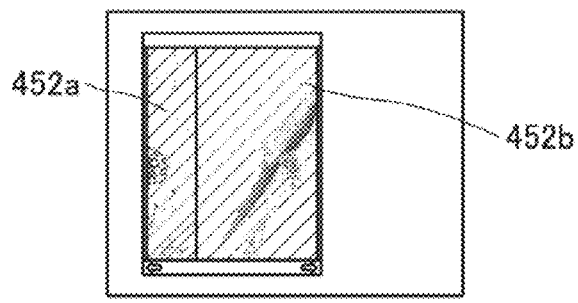

Next, the combined image displayed in the window 451 is moved while the luminance is gradually increased (FIG. 47D)

Figure 47E:
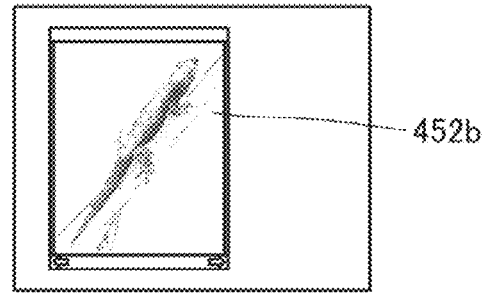

FIG. 47E illustrates a state in which the combined image reaches the final coordinates. In the window 451, only the second image 452b is displayed at a luminance equal to the initial luminance.

After the movement of the image is completed, the refresh rate is preferably changed from the second refresh rate to the first refresh rate.

Since the luminance of an image is lowered in this display mode, the user's eyes are less likely to suffer from fatigue even when following the movement of the image. Thus, such a driving method can achieve eye-friendly display.

[Display Example of Document Information]

Next, an example in which document information whose dimension is larger than that of a display window is displayed while being scrolled will be described below.

Figure 48A:
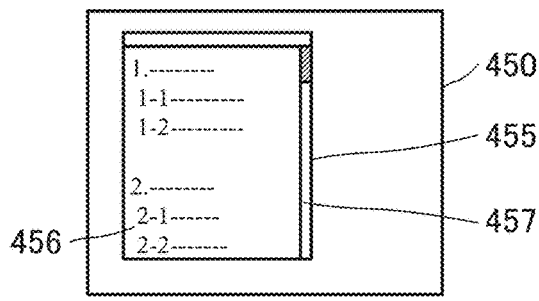
FIGS. 48A to 48E illustrate an example of a method for displaying images on a display device.

In an example illustrated in FIG. 48A, a window 455 and part of document information 456 which is a still image displayed in the window 455 are displayed on the display portion 450.

At this time, display is preferably performed at the first refresh rate.

The window 455 is displayed by, for example, executing application software for document display, application software for document preparation, or the like and includes a display region in which document information is displayed.

The dimension of an image of the document information 456 is larger than that of the display region of the window 455 in the longitudinal direction. Therefore, only part of the document information 456 is displayed in the window 455. As illustrated in FIG. 48A, the window 455 may be further provided with a scroll bar 457 indicating which part of the document information 456 is displayed.

Figure 48B:
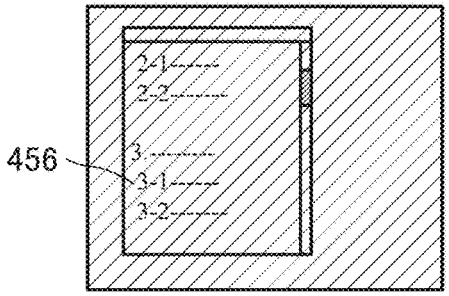

When an instruction for moving an image (here, also referred to as a scroll instruction) is supplied from the input portion to the display device, movement of the document information 456 starts (FIG. 48B). In addition, the luminance of the displayed image is gradually lowered.

In the case where display is performed at the first refresh rate in the state in FIG. 48A, the refresh rate is preferably changed to the second refresh rate before the document information 456 is moved.

In this state, not only the luminance of the image displayed in the window 455 but also the luminance of the whole image displayed on the display portion 450 is lowered.

Figure 48C:
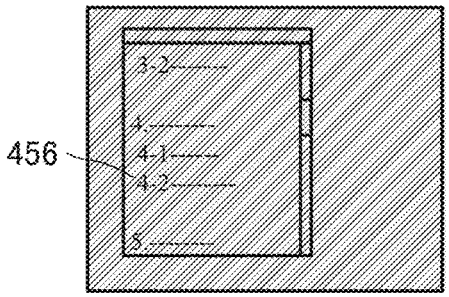

FIG. 48C illustrates a state in which the document information 456 reaches predetermined coordinates. At this time, the luminance of the whole image displayed on the display portion 450 is lowest.

Figure 48D:
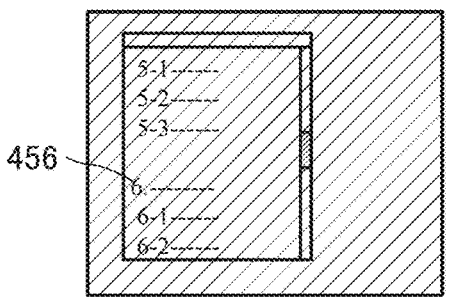

Next, the document information 456 is displayed in the window 455 while being moved (FIG. 48D). Under this condition, the luminance of the whole image displayed on the display portion 450 is gradually increased.

Figure 48E:
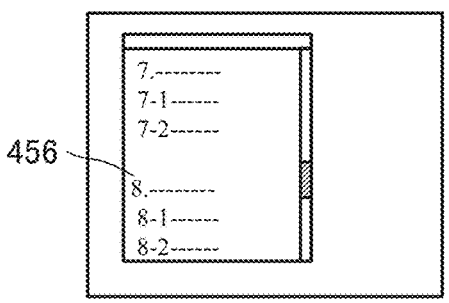

FIG. 48E illustrates a state in which the document information 456 reaches the final coordinates. In the window 455, a region of the document information 456, which is different from the region displayed in the initial state, is displayed at a luminance equal to the initial luminance.

After the movement of the document information 456 is completed, the refresh rate is preferably changed to the first refresh rate.

Since the luminance of an image is lowered in this display mode, the user's eyes are less likely to suffer from fatigue even when following the movement of the image. Thus, such a driving method can achieve eye-friendly display.

In particular, display of document information or the like, which has high contrast, can cause serious eye fatigue of the user; thus, it is preferable to apply such a driving method to the display of document information.

This embodiment can be implemented in an appropriate combination with any of the other embodiments described in this specification.

Embodiment 14

In this embodiment, a display module and electronic devices, each of which includes the semiconductor device of one embodiment of the present invention, will be described with reference to FIG. 49 and FIGS. 50A to 50G.

Figure 49:
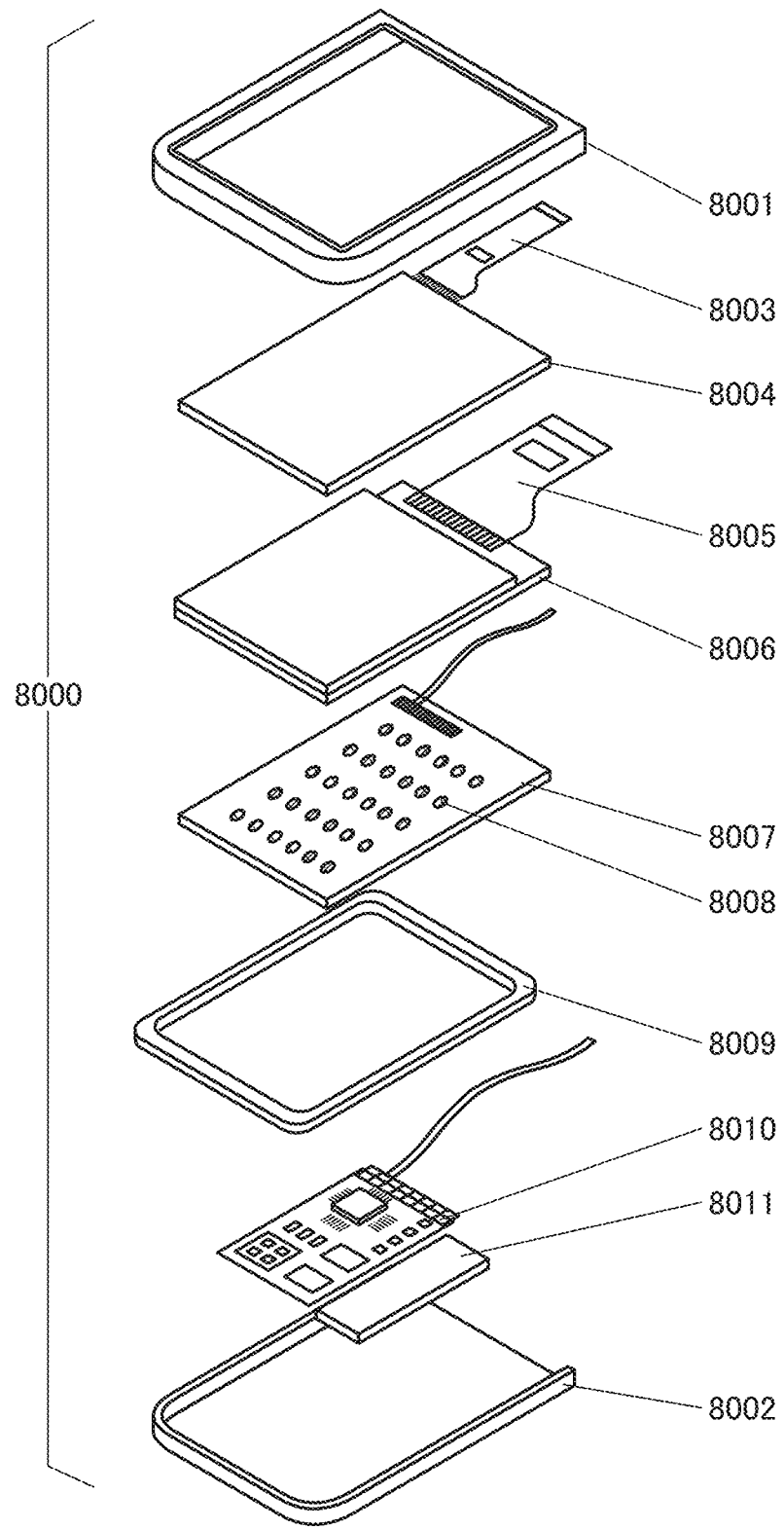
FIG. 49 illustrates a display module.

In a display module 8000 illustrated in FIG. 49, a touch panel 8004 connected to an FPC 8003, a display panel 8006 connected to an FPC 8005, a backlight 8007, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and overlap with the display panel 8006. Alternatively, a counter substrate (sealing substrate) of the display panel 8006 can have a touch panel function. Alternatively, a photosensor may be provided in each pixel of the display panel 8006 to form an optical touch panel.

The backlight 8007 includes a light source 8008. One embodiment of the present invention is not limited to the structure in FIG. 49, in which the light source 8008 is provided over the backlight 8007. For example, a structure in which the light source 8008 is provided at an end portion of the backlight 8007 and a light diffusion plate is further provided may be employed. Note that the backlight 8007 need not be provided in the case where a self-luminous light-emitting element such as an organic EL element is used or in the case where a reflective panel or the like is employed.

The frame 8009 protects the display panel 8006 and functions as an electromagnetic shield for blocking electromagnetic waves generated by the operation of the printed board 8010. The frame 8009 may also function as a radiator plate.

The printed board 8010 includes a power supply circuit and a signal processing circuit for outputting a video signal and a clock signal. As a power source for supplying power to the power supply circuit, an external commercial power source or the separate battery 8011 may be used. The battery 8011 can be omitted in the case where a commercial power source is used.

The display module 8000 may be additionally provided with a member such as a polarizing plate, a retardation plate, or a prism sheet.

FIGS. 50A to 50G illustrate electronic devices. These electronic devices can include a housing 5000, a display portion 5001, a speaker 5003, an LED lamp 5004, an operation key 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 50A:
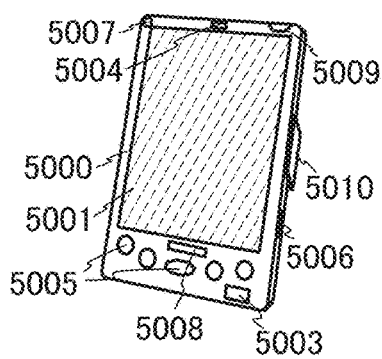
FIGS. 50A to 50G illustrate electronic devices.
Figure 50B:
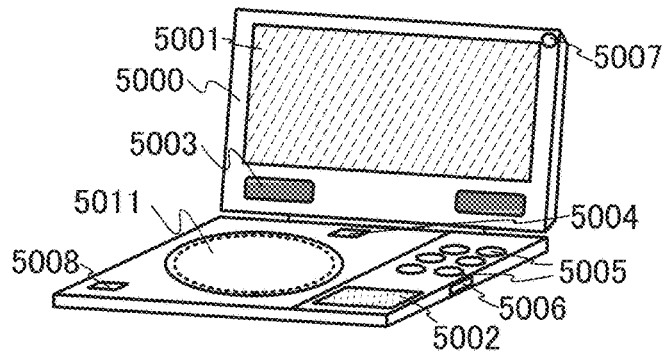
Figure 50C:
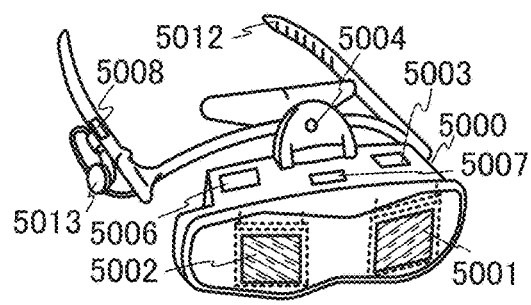
Figure 50D:
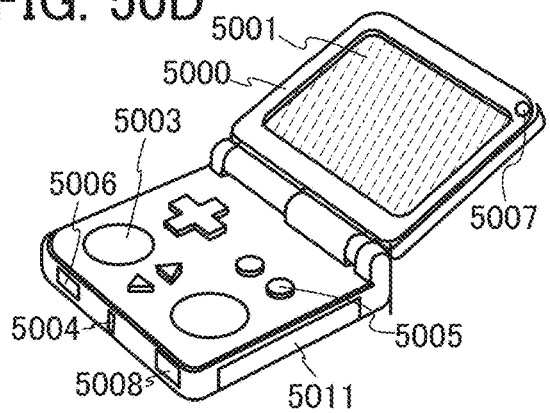
Figure 50E:
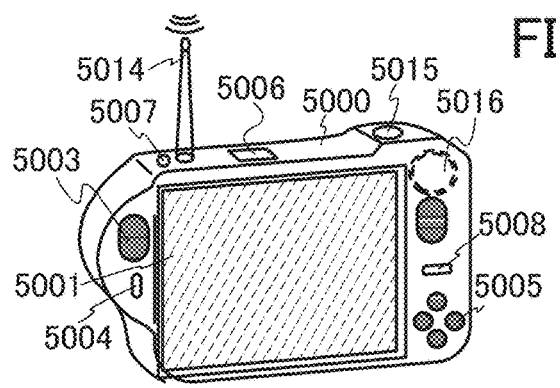
Figure 50F:
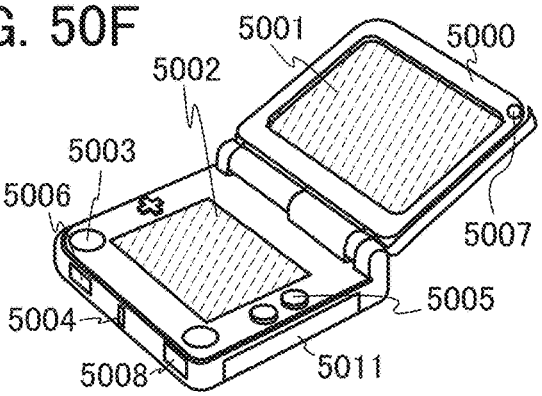
Figure 50G:
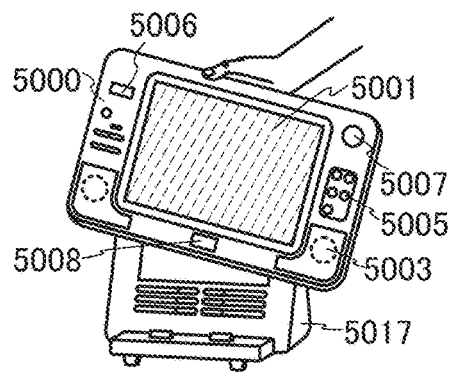

FIG. 50A illustrates a mobile computer which can include a switch 5009, an infrared port 5010, and the like in addition to the above components. FIG. 50B illustrates a portable image reproducing device which is provided with a recording medium (e.g., a DVD reproducing device) and can include a second display portion 5002, a recording medium reading portion 5011, and the like in addition to the above components. FIG. 50C illustrates a goggle-type display which can include the second display portion 5002, a support 5012, an earphone 5013, and the like in addition to the above components. FIG. 50D illustrates a portable game console which can include the recording medium reading portion 5011 and the like in addition to the above components. FIG. 50E illustrates a digital camera which has a television reception function and can include an antenna 5014, a shutter button 5015, an image receiving portion 5016, and the like in addition to the above components. FIG. 50F illustrates a portable game console which can include the second display portion 5002, the recording medium reading portion 5011, and the like in addition to the above components. FIG. 50G illustrates a portable television receiver which can include a charger 5017 capable of transmitting and receiving signals, and the like in addition to the above components.

The electronic devices in FIGS. 50A to 50G can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image information mainly on one display portion while displaying text information mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in a camera), a function of displaying a shot image on the display portion, or the like. Note that functions of the electronic devices in FIGS. 50A to 50G are not limited thereto, and the electronic devices can have a variety of functions.

Electronic devices described in this embodiment are each characterized by a display portion for displaying some sort of information. The display device described in any of the other embodiments can be used for the display portion.

Example 1

In this example, the alignment state of liquid crystal in a liquid crystal element included in a pixel of one embodiment of the present invention was calculated. FIGS. 51A to 51D and FIGS. 52A and 52B show the results.

FIGS. 51A to 51D show the calculation results of a pixel with the electrode structure schematically illustrated in FIG. 1 and a pixel with a comparative electrode structure. For the calculation, a liquid crystal alignment simulator, LCD Master, manufactured by SHINTECH, Inc. was used. The calculation conditions in this example are as follows: a pixel region is 174 μm×55.5 μm, the thickness of a liquid crystal layer is 3.2 μm, the optical anisotropy $\Delta_n$ of the liquid crystal is 0.0998, the dielectric constant anisotropy $\Delta_\epsilon$ is −3.0, the common electrode width and the pixel electrode width are each 3.0 μm, the liquid crystal in the initial state is aligned in the direction parallel to a scan line, and substrates over and under the liquid crystal layer are subjected to alignment treatment for anti-parallel alignment. Table 1 shows potentials supplied to the electrodes.

TABLE 1

|  | Black display | White display |
| --- | --- | --- |
| Scan line potential |  | −5 V |
| Signal line potential |  | 6 V |
| Pixel electrode potential | 0 V | 6 V |
| Common electrode potential |  | 0 V |

Figure 51D:
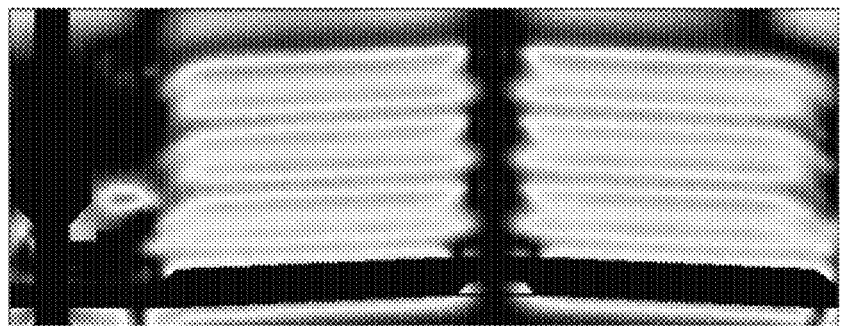
FIGS. 51A to 51D show calculation results in Example 1.
Figure 51C:
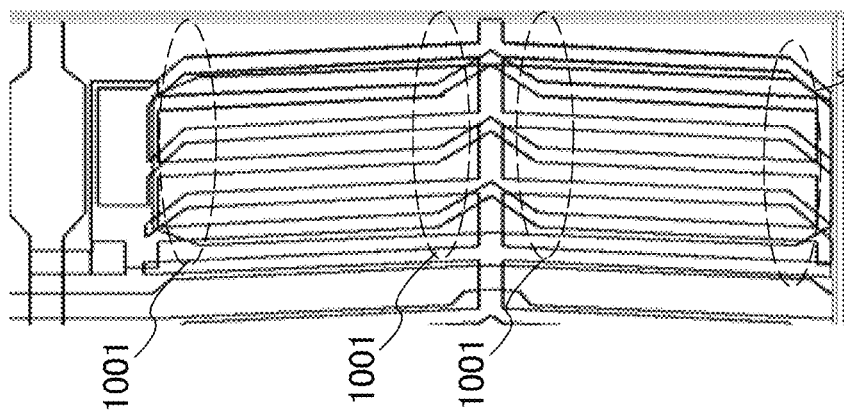
Figure 51B:
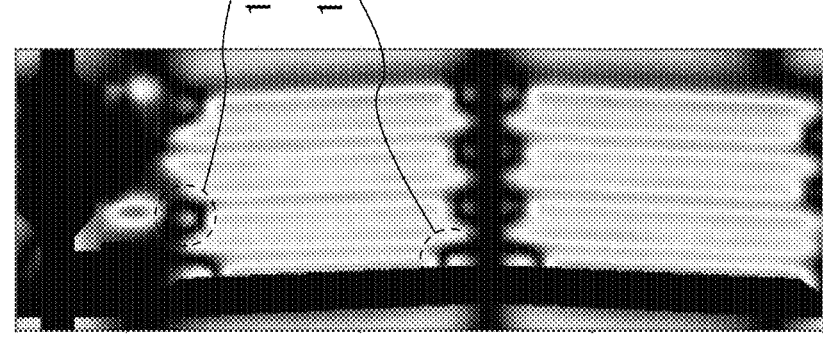
Figure 51A:
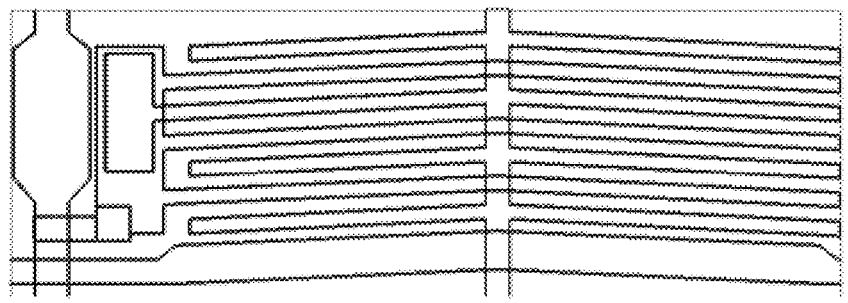

FIGS. 51A to 51D show schematic top views of the pixels used for the calculation and calculated two-dimensional distribution of light transmitted through the liquid crystal over the pixel electrode. FIG. 51A is a schematic top view of the pixel in which the electrodes have no bent portion, and FIG. 51B shows the two-dimensional distribution of light transmitted through the liquid crystal in the electrode structure in FIG. 51A. FIG. 51C is a schematic top view of the pixel in which the electrodes have bent portions 1001, and FIG. 51D shows the two-dimensional distribution of light transmitted through the liquid crystal in the electrode structure in FIG. 51C. In the two-dimensional distributions of light transmitted through the liquid crystal, the brightness is expressed by gray levels from white to black; thus, the deeper the whiteness is, the more intense the brightness is, that is, the higher the transmittance is.

Alignment defect portions 1003 are observed in FIG. 51B, whereas the alignment defect portions are shrunk or disappear in FIG. 51D, in which the electrodes have the bent portions 1001. The results confirm that the bent portions of the electrodes enable alignment defects of the liquid crystal to be reduced and the distribution of transmitted light to be improved.

Figure 52B:
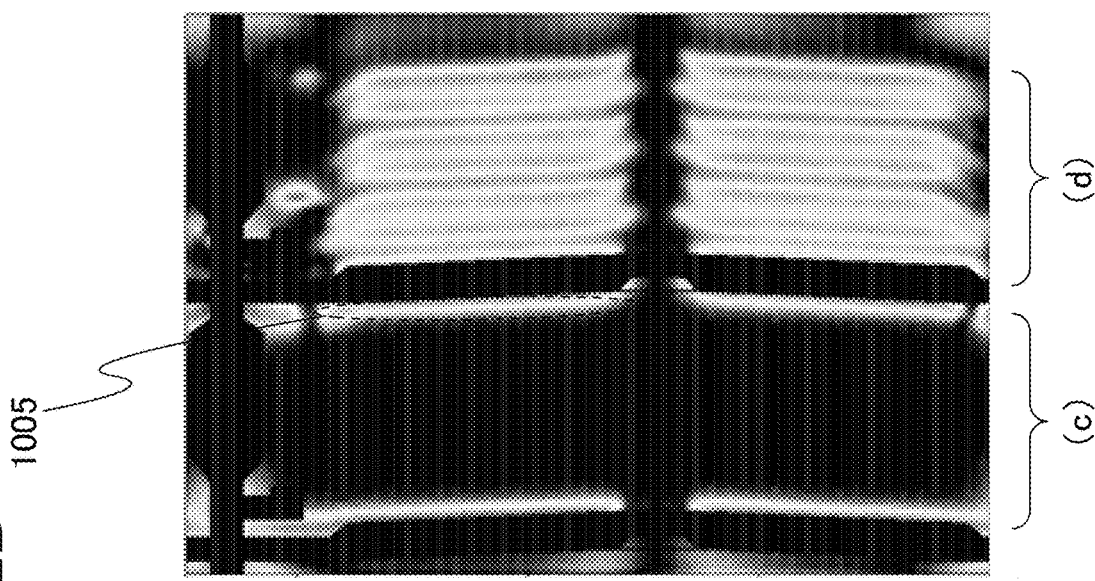
FIGS. 52A and 52B show calculation results in Example 1.
Figure 52A:
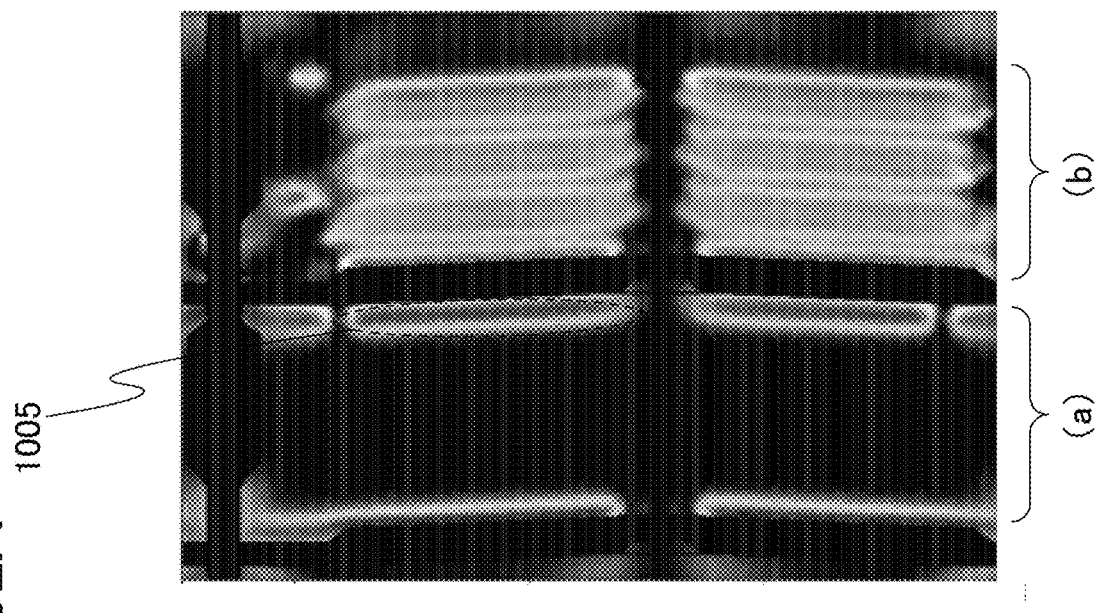

When the signal line potential affects the pixel, the liquid crystal alignment is disordered and the transmittance distribution is changed. To examine the change, calculation was performed in two cases which are different in distance between the signal line and the common electrode. FIGS. 52A and 52B show the results.

FIG. 52A shows the two-dimensional distribution of light transmitted through the liquid crystal in the case where the distance between the signal line and the common electrode is 6 μm. In FIG. 52A, a region (a) shows the calculation result of a pixel supplied with an electrode potential for black display, and a region (b) shows the calculation result of a pixel supplied with an electrode potential for white display. FIG. 52B shows the two-dimensional distribution of light transmitted through the liquid crystal in the case where the distance between the signal line and the common electrode is 1 μm. In FIG. 52B, a region (c) shows the calculation result of a pixel supplied with an electrode potential for black display, and a region (d) shows the calculation result of a pixel supplied with an electrode potential for white display.

As shown in the region (a) in FIG. 52A and the region (c) in FIG. 52B, a light leakage portion 1005 is smaller in the structure with a smaller distance between the signal line and the common electrode.

The results confirm that a reduction in the distance between the signal line and the common electrode can suppress light leakage due to alignment disorder of the liquid crystal. This is because an electric field of the common electrode blocks an electric field of the signal line to reduce an influence of the latter electric field on the pixel.

Example 2

In this example, the alignment state of liquid crystal in a liquid crystal element included in a pixel of one embodiment of the present invention was calculated. FIGS. 53A to 53D show the results.

The calculation was performed on the pixel electrode schematically illustrated in FIG. 42. For the calculation, a liquid crystal alignment simulator, LCD Master, manufactured by SHINTECH, Inc. was used. The calculation conditions in this example are as follows: a pixel region is 174 μm and 58 μm, the thickness of a liquid crystal layer is 4.0 μm, the optical anisotropy $\Delta_n$ of the liquid crystal is 0.0998, the dielectric constant anisotropy $\Delta_\epsilon$ is −3.0, the pixel electrode width and the common electrode width are each 3.0 μm, the distance between adjacent two comb-shaped portions of the pixel electrode and the distance between adjacent two comb-shaped portions of the common electrode are each 5.0 μm, the liquid crystal in the initial state is aligned at a tilt angle of 5° with respect to a scan line, and substrates over and under the liquid crystal layer are subjected to alignment treatment for anti-parallel alignment.

Table 2 shows potentials supplied to the electrodes.

TABLE 2

|  | Black display | White display |
| --- | --- | --- |
| Scan line potential |  | −5 V |
| Signal line potential |  | 0 V or 6 V |
| Pixel electrode potential |  | 0 V to 6 V |
| Common electrode potential |  | 0 V |

Figure 53A:
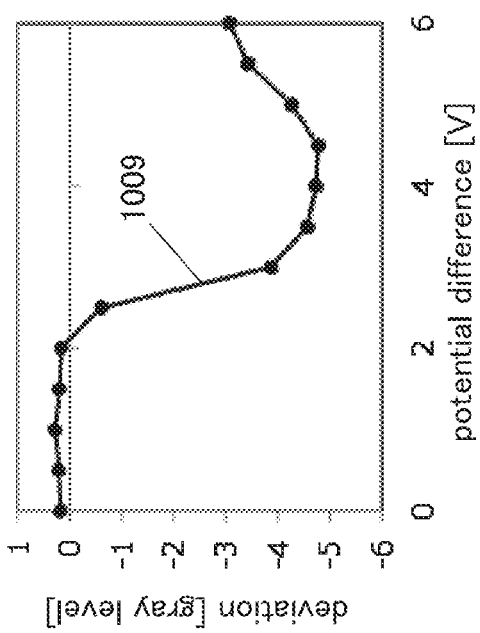
FIGS. 53A to 53D show calculation results in Example 2.

The relation between the transmittance of the pixel and the voltage applied between the pixel electrode and the common electrode (hereinafter referred to as VT characteristics) was calculated. In this example, the transmittance as a function of the signal line potential was also examined. FIGS. 53A and 53B show the results. The normalized intensity of transmitted light, which is represented by the vertical axis in FIGS. 53A and 53B, will be described. The normalized intensity of transmitted light is a value obtained by Equation (2) under the following conditions. In the equation, X denotes the amount of light transmitted through a structure in which a liquid crystal element is positioned between a pair of polarizing plates arranged such that their polarization directions are orthogonal to each other as in an actual display device, and Y denotes the amount of light transmitted through a structure in which a pair of polarizing plates is arranged such that their light transmission axes or light absorption axes are parallel to each other (parallel Nicols) and in which the liquid crystal element is not positioned between the pair of polarizing plates.

[Formula 2]

$$\text{Normalized intensity of transmitted light [\%]} = X/Y \times 100 \quad (2)$$

The pixel potential, which is represented by the horizontal axis, refers to a difference between a potential supplied to the pixel electrode and a potential supplied to the common electrode. The unit of the difference between the potential supplied to the pixel electrode and the potential supplied to the common electrode is V (volt).

For comparison, a structure including a counter electrode was evaluated under the condition that no potential is supplied to the counter electrode (FIG. 53A) and the condition that a potential is supplied to the counter electrode (FIG. 53B).

The case where no potential is supplied to the counter electrode is compared with the case where a potential is supplied to the counter electrode. In the latter case, no deviation occurs between VT characteristics (a dashed line 1012 in FIG. 53B) at a signal line potential of 0 V and VT characteristics (a solid line 1013 in FIG. 53B) at a signal line potential of 6 V (in FIG. 53B, the dashed line 1012 and the solid line 1013 overlap with each other). As shown in FIG. 53A, in contrast, in the case where no potential is supplied to the counter electrode, a deviation occurs between VT characteristics (a dashed line 1010 in the graph) at a signal line potential of 0 V and VT characteristics (a solid line 1011 in the graph) at a signal line potential of 6 V.

Figure 53C:
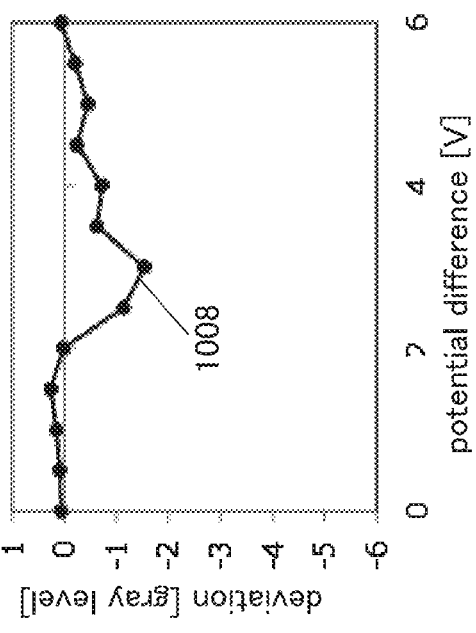
Figure 53B:
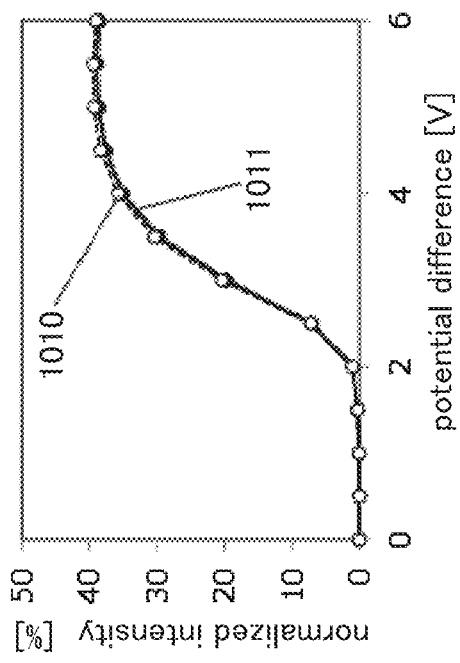
Figure 53D:
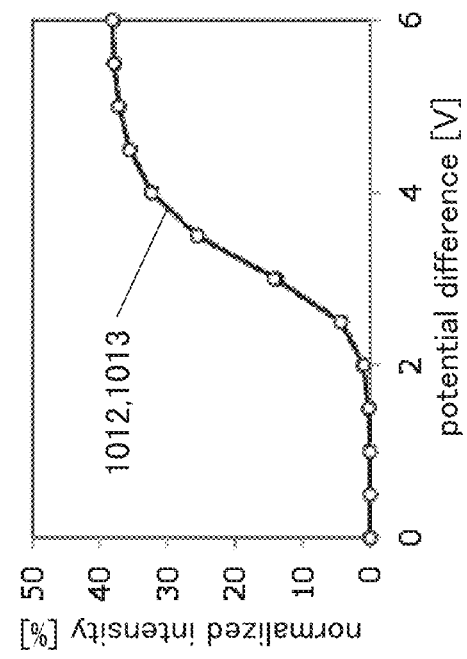

In FIGS. 53C and 53D, the vertical axis represents, as a deviation of gray level, a deviation between the intensity of transmitted light at a signal line potential of 0 V and the intensity of transmitted light at a signal line potential of 6 V. The pixel potential, which is represented by the horizontal axis, refers to a difference between a potential supplied to the pixel electrode and a potential supplied to the common electrode. In the case where a potential is supplied to the counter electrode, the amount of deviation of gray level indicated by a line 1008 is within 2 gray levels; in the case where no potential is supplied to the counter electrode, the amount of deviation of gray level indicated by a line 1009 covers 5 gray levels.

In general, the minimum amount of deviation of gray level that a user can perceive is approximately 2 gray levels; therefore, the user perceives no deviation of gray level as long as the amount of deviation is within 2 gray levels. If a deviation of gray level is repeated at regular time intervals in a display device, the user perceives it as flickers; therefore, the deviation of gray level needs to be reduced to the extent that the user does not perceive it.

This example suggests that the layout of the pixel electrode in FIG. 42 reduces display flickers.

Example 3

In this example, to support the calculation results of the liquid crystal alignment in Example 2, a display device in which a counter electrode was provided and a transistor including an oxide semiconductor was used was fabricated, and whether the deviation of gray level was suppressed was examined. Table 3 shows the specifications of the fabricated display device.

TABLE 3

| | |
|---|---|
| Panel size | 5.0 inches |
| Number of effective pixels | 640 × RGB (H) × 360 (V): HVGAW |
| Pixel size | 55.5 µm (H) × 174 µm (V) |
| Resolution | 146 ppi |
| LCD | Transmissive; horizontal electric field mode |
| Color system | Color filter system |
| Aperture ratio | 47.70% |
| Drive frequency | 60 Hz, 120 Hz |
| Video signal format | Analog line sequential |
| Gate driver | Integrated |
| Source driver | COF |

The pixel electrode pattern in FIG. 42 was employed. For the layout of the counter electrode in the display device, for example, the description of the layout of the conductive film 774 in FIG. 39, FIG. 40, and FIG. 41 in Embodiment 11 can be referred to.

Figure 54A:
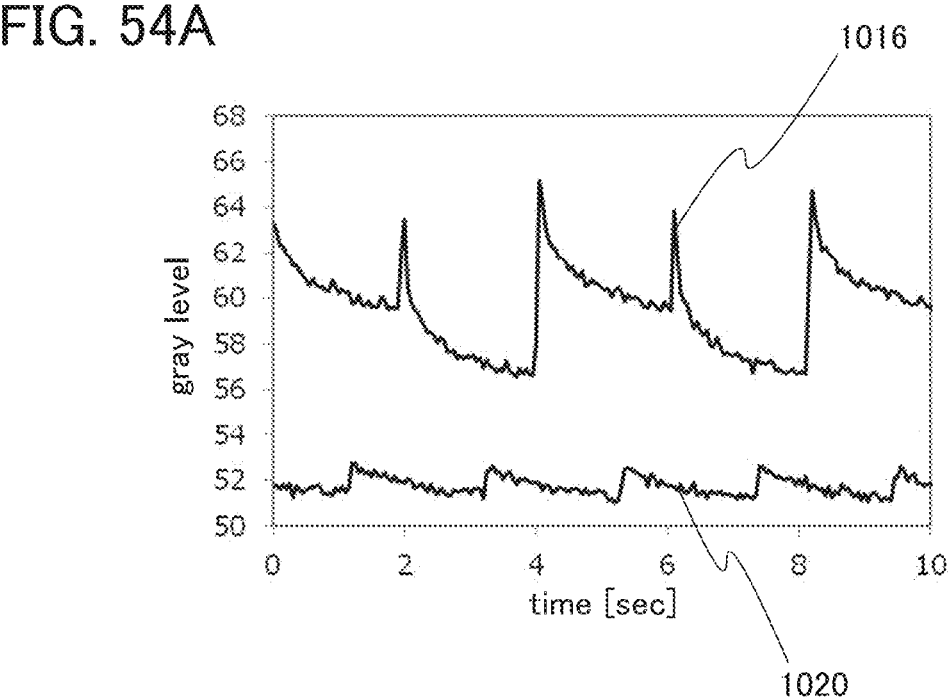
FIG. 54A shows a temporal change in gray level of a display device in Example 3.
Figure 54B:
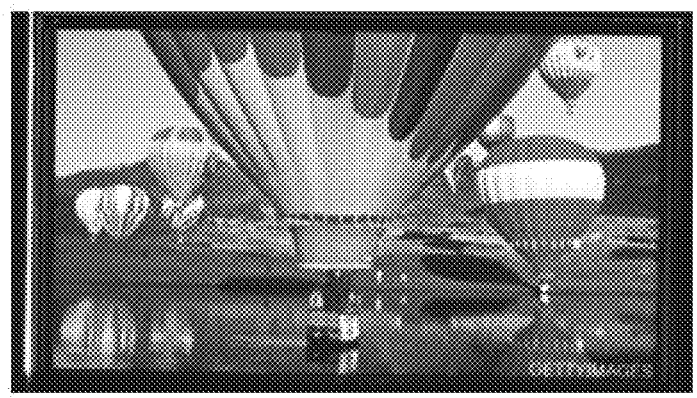
FIG. 54B shows an image displayed thereon.

FIGS. 54A and 54B show the results. FIG. 54A shows the characteristics of temporal change in gray level of the display device fabricated in this example. According to FIG. 54A, the deviation of gray level of the display device provided with the counter electrode, which is indicated by a characteristic curve 1020, is 2 gray levels at most, whereas the largest deviation of gray level of the display device without the counter electrode, which is indicated by a characteristic curve 1016, is approximately 10 gray levels.

The results in FIG. 54A suggests that the counter electrode suppresses the deviation of gray level. Furthermore, in the display device formed using a material with negative dielectric constant anisotropy, flickers due to a flexoelectric effect, which is attributed to polarization of liquid crystal molecules, were able to be reduced.

FIG. 54B shows a photograph of the fabricated display device displaying an image. By using one embodiment of the present invention, favorable display was able to be performed.

Figure 55:
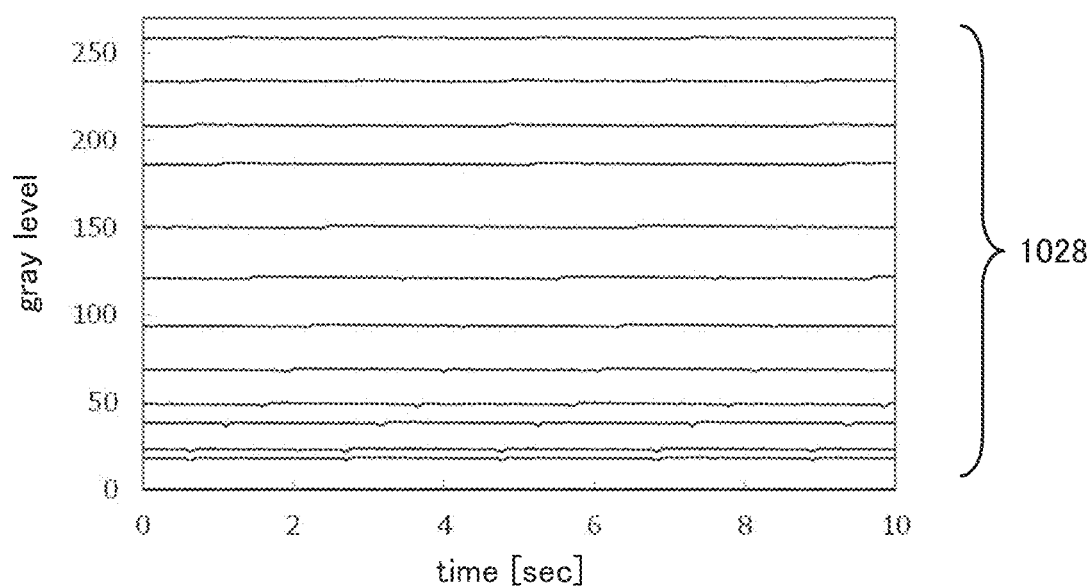
FIG. 55 shows a temporal change in gray level of a display device in Example 3.

In addition, it was examined whether a decrease in the frame frequency of the display device described in this example caused a change in gray level in one frame. FIG. 55 shows the initial characteristics. All lines 1028 in FIG. 55, which indicate temporal changes in the respective 256 gray levels, are almost constantly flat regardless of time elapsed. These results confirm that no significant temporal change is observed at any gray level.

The results of another examination will be shown. In structures with various thicknesses of an insulating film that insulates the conductive film 21c serving as a signal line from the oxide semiconductor film 19c serving as a pixel electrode, changes in the amount of deviation of the amount of transmitted light at the respective gray levels were examined. For the above insulating film, for example, refer to the description of the insulating films 23 and 25 in FIG. 2, which shows a schematic cross-sectional view of the pixel portion 71 of the display device 80 in Embodiment 1.

Figure 56A:
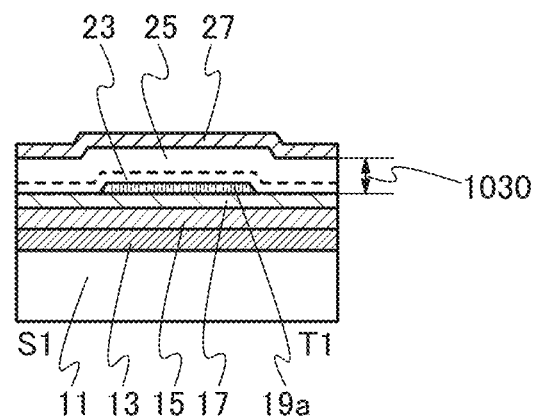
FIG. 56A is a schematic cross-sectional view of a pixel portion.

FIG. 56A corresponds to one of the schematic cross-sectional views of the pixel portion 71 of the display device 80 in FIG. 2, namely, the schematic cross-sectional view taken along dashed-dotted line S1-T1. A thickness 1030 refers to the thickness of the above insulating film.

Figure 56B:
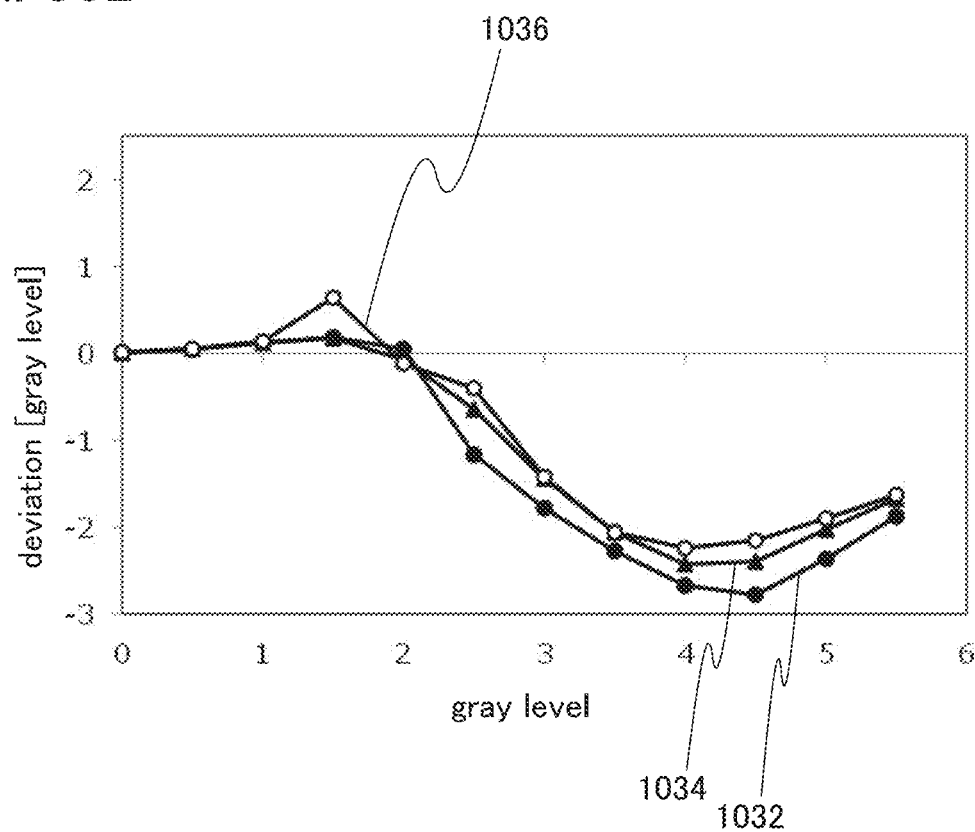
FIG. 56B shows the amount of deviation of gray level as a function of gray level of a display device in Example 3.

FIG. 56B shows the amount of deviation of the intensity of transmitted light as a function of the gray level in the case where the thickness 1030 is used as a parameter. The vertical axis in In FIG. 56B represents, as a deviation of gray level, a deviation between the intensity of transmitted light at a signal line potential of 0 V and the intensity of transmitted light at a signal line potential of 6 V. The horizontal axis represents the gray level. Compared with a line 1032 that connects values (filled circles) in the case where the thickness 1030 is 0.45 µm and a line 1034 that connects values (filled triangles) in the case where the thickness 1030 is 0.65 µm, a line 1036 that connects values (open circles) in the case where the thickness 1030 is 0.85 µm has a small deviation range of gray level.

This example confirms that an increase in the thickness 1030 can effectively suppress the deviation of gray level which is caused by an electric field from the conductive film 21c serving as a signal line to the oxide semiconductor film 19c serving as a pixel electrode.

This application is based on Japanese Patent Application serial No. 2015-065357 filed with Japan Patent Office on Mar. 26, 2015, the entire contents of which are hereby incorporated by reference.

What is claimed is:

1. A display device comprising:
a pixel comprising:
   a pixel electrode and a common electrode over a substrate;
   a liquid crystal driven by an electric field generated between the pixel electrode and the common electrode;
   a transistor;
   a scan line comprising a gate of the transistor; and
   a signal line,
wherein:
the common electrode comprises a region extending perpendicularly to the signal line,
the pixel electrode comprises a part having a line-symmetric structure with respect to the region of the common electrode,
a width of the signal line is smaller in a portion overlapping with the common electrode than in the other portion,
the region of the common electrode and the portion of the signal line with the smaller width overlap with each other, and
the pixel electrode is bent at the region of the common electrode when seen from above.

2. The display device according to claim 1, further comprising a second substrate provided with a conductive film, wherein:
the conductive film is on a side of the second substrate facing the substrate, and
the liquid crystal is driven by electric fields generated between the pixel electrode, the common electrode, and the conductive film.

3. The display device according to claim 1, wherein the transistor is electrically connected to one of the pixel electrode and the common electrode.

4. The display device according to claim 3, wherein the transistor is over the substrate.

5. The display device according to claim 3, wherein the transistor is a field-effect transistor.

6. The display device according to claim 3, wherein the transistor comprises an oxide semiconductor.

7. The display device according to claim 1, further comprising an insulating film between the pixel electrode and the common electrode.

8. An electronic device comprising:
the display device according to claim 1; and
at least one of a switch, a speaker, and a housing.

9. The display device according to claim 1,
wherein the pixel comprises a first region and a second region, and when seen from above, a distance between the pixel electrode and the common electrode is smaller in the second region than in the first region, and
wherein a light-blocking conductive material is used for a part of the common electrode.

10. A display device comprising:
a pixel comprising:
   a pixel electrode and a common electrode over a substrate;
   a liquid crystal driven by an electric field generated between the pixel electrode and the common electrode;
   a transistor;
   a scan line comprising a gate of the transistor; and
   a signal line,
wherein:
the common electrode comprises a region extending perpendicularly to the signal line,
the pixel electrode comprises a part having a line-symmetric structure with respect to the region of the common electrode,
a width of the signal line is smaller in a portion overlapping with the common electrode than in the other portion,
the region of the common electrode and the portion of the signal line with the smaller width overlap with each other, and
the pixel electrode is diagonal to the common electrode at the region of the common electrode when seen from above.

11. The display device according to claim 10, further comprising a second substrate provided with a conductive film,
wherein:
the conductive film is on a side of the second substrate facing the substrate, and
the liquid crystal is driven by electric fields generated between the pixel electrode, the common electrode, and the conductive film.

12. The display device according to claim 10, wherein the transistor is electrically connected to one of the pixel electrode and the common electrode.

13. The display device according to claim 10, further comprising an insulating film between the pixel electrode and the common electrode.

14. The display device according to claim 10,
wherein the pixel comprises a first region and a second region, and when seen from above, a distance between the pixel electrode and the common electrode is smaller in the second region than in the first region, and
wherein a light-blocking conductive material is used for a part of the common electrode.

15. A display device comprising:
a pixel comprising:
   a pixel electrode and a common electrode over a substrate;

a liquid crystal driven by an electric field generated between the pixel electrode and the common electrode;
a transistor;
a scan line comprising a gate of the transistor; and
a signal line,
wherein:
the common electrode comprises a region extending perpendicularly to the signal line,
the pixel electrode comprises a part having a line-symmetric structure with respect to the region of the common electrode,
a width of the signal line is smaller in a portion overlapping with the common electrode than in the other portion,
the region of the common electrode and the portion of the signal line with the smaller width overlap with each other, and
the pixel electrode crosses the common electrode at an acute angle at the region of the common electrode when seen from above.

16. The display device according to claim 15, further comprising a second substrate provided with a conductive film,
wherein:
the conductive film is on a side of the second substrate facing the substrate, and
the liquid crystal is driven by electric fields generated between the pixel electrode, the common electrode, and the conductive film.

17. The display device according to claim 15, wherein the transistor is electrically connected to one of the pixel electrode and the common electrode.

18. The display device according to claim 15, further comprising an insulating film between the pixel electrode and the common electrode.

19. The display device according to claim 15,
wherein the pixel comprises a first region and a second region, and when seen from above, a distance between the pixel electrode and the common electrode is smaller in the second region than in the first region, and
wherein a light-blocking conductive material is used for a part of the common electrode.

* * * * *